(12) United States Patent
Blakely et al.

(10) Patent No.: US 9,899,864 B2
(45) Date of Patent: Feb. 20, 2018

(54) BIDIRECTIONAL POWER CONVERTER

(71) Applicant: Enovate Medical, LLC, Murfreesboro, TN (US)

(72) Inventors: George Blakely, Murfreesboro, TN (US); Gordon Waid, Murfreesboro, TN (US)

(73) Assignee: Enovate Medical, LLC, Murfreesboro, TN (US)

( * ) Notice: Subject to any disclaimer, the term of this patent is extended or adjusted under 35 U.S.C. 154(b) by 6 days.

(21) Appl. No.: 15/096,204

(22) Filed: Apr. 11, 2016

(65) Prior Publication Data
US 2016/0373027 A1    Dec. 22, 2016

Related U.S. Application Data

(60) Provisional application No. 62/146,091, filed on Apr. 10, 2015.

(51) Int. Cl.
| | |
|---|---|
| H01F 27/42 | (2006.01) |
| H01F 37/00 | (2006.01) |
| H01F 38/00 | (2006.01) |
| H02J 7/02 | (2016.01) |
| H02M 7/797 | (2006.01) |
| H02M 7/70 | (2006.01) |
| H02J 50/80 | (2016.01) |
| H02J 50/10 | (2016.01) |
| H02J 7/04 | (2006.01) |
| H02M 1/08 | (2006.01) |
| H02M 7/5383 | (2007.01) |
| H02J 50/90 | (2016.01) |
| H02J 50/20 | (2016.01) |

(52) U.S. Cl.
CPC ............... *H02J 7/025* (2013.01); *H02J 7/04* (2013.01); *H02J 7/045* (2013.01); *H02J 7/047* (2013.01); *H02J 50/10* (2016.02); *H02J 50/20* (2016.02); *H02J 50/80* (2016.02); *H02J 50/90* (2016.02); *H02M 1/08* (2013.01); *H02M 7/5383* (2013.01); *H02M 7/70* (2013.01); *H02M 7/797* (2013.01)

(58) Field of Classification Search
USPC .................................................. 307/104, 108
See application file for complete search history.

(56) References Cited

U.S. PATENT DOCUMENTS

| | | | | |
|---|---|---|---|---|
| 9,768,622 B2* | 9/2017 | Hayashi | ............... | H02J 5/005 |
| 2011/0254379 A1* | 10/2011 | Madawala | ............ | H02J 5/005 |
| | | | | 307/104 |
| 2012/0187772 A1* | 7/2012 | Teggatz | ............... | H04B 5/0031 |
| | | | | 307/104 |
| 2013/0285463 A1* | 10/2013 | Covic | ............... | H01F 27/346 |
| | | | | 307/104 |
| 2014/0049886 A1 | 2/2014 | Lee et al. | | |

(Continued)

*Primary Examiner* — Adam Houston
(74) *Attorney, Agent, or Firm* — Waller Lansden Dortch & Davis LLP; Nathan J. Bailey; Mark A. Pitchford

(57) ABSTRACT

A bidirectional power converter circuit is controlled via a hysteresis loop such that the bidirectional power converter circuit can compensate in near real time for variations and even changes in transmit and receive coil locations without damaging components of the system. Because the bidirectional power converter is capable of both transmitting and receiving power (at different times), one circuit and board may be used as the main component in multiple wireless power converter designs.

19 Claims, 88 Drawing Sheets

(56) References Cited

U.S. PATENT DOCUMENTS

| | | | |
|---|---|---|---|
| 2014/0347008 A1 | 11/2014 | Chae et al. | |
| 2015/0001958 A1* | 1/2015 | Abe | H02J 5/005 307/104 |
| 2015/0084431 A1* | 3/2015 | Yeh | H02J 7/025 307/104 |
| 2015/0137750 A1* | 5/2015 | Kirby | H02J 5/005 320/108 |
| 2015/0214747 A1* | 7/2015 | Abe | H01F 38/14 307/104 |
| 2016/0089985 A1* | 3/2016 | Murayama | H02J 50/12 307/10.1 |
| 2016/0126750 A1* | 5/2016 | Yasuda | H02J 5/005 307/104 |
| 2016/0372957 A1* | 12/2016 | Blakely | H02J 50/80 |
| 2017/0077722 A1 | 3/2017 | Jung | |
| 2017/0222485 A1* | 8/2017 | Covic | H02J 50/12 |

\* cited by examiner

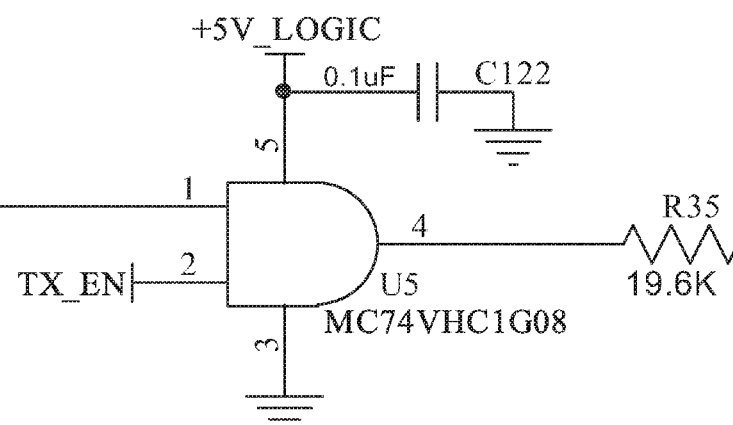
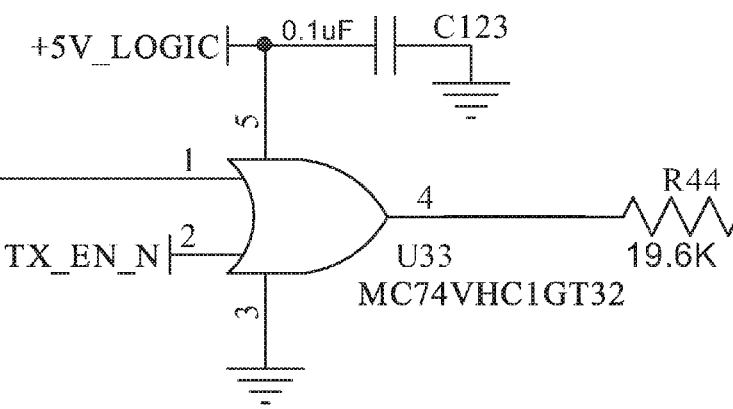
FIG. 2G

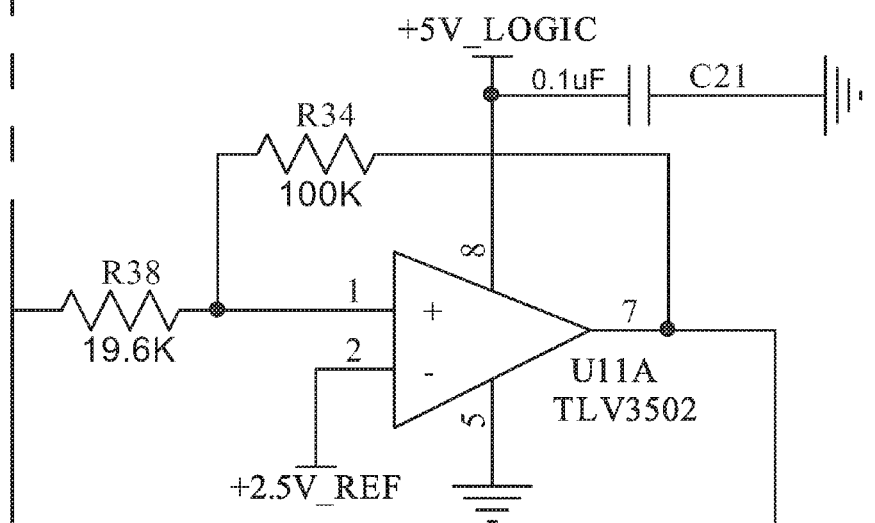
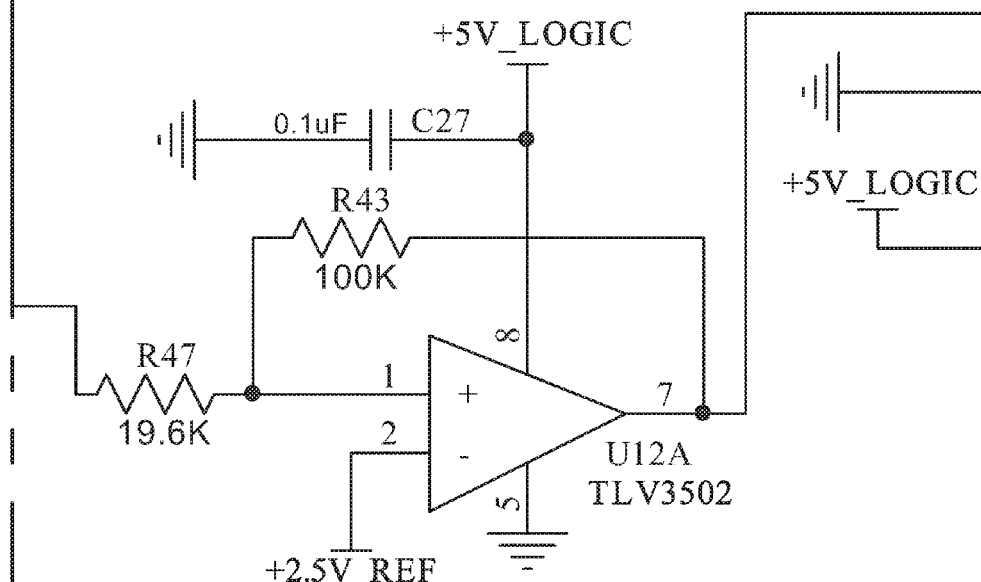
FIG. 2I

COIL PARAMETERS:

INDUCTANCE: 8.71uH
MIN INDUCTOR Q @ 100KHz: 122
K COUPLING REQUIRED: 0.2
MAX PEAK CURRENT: 60A
MAX PEAK VOLTAGE: 330V

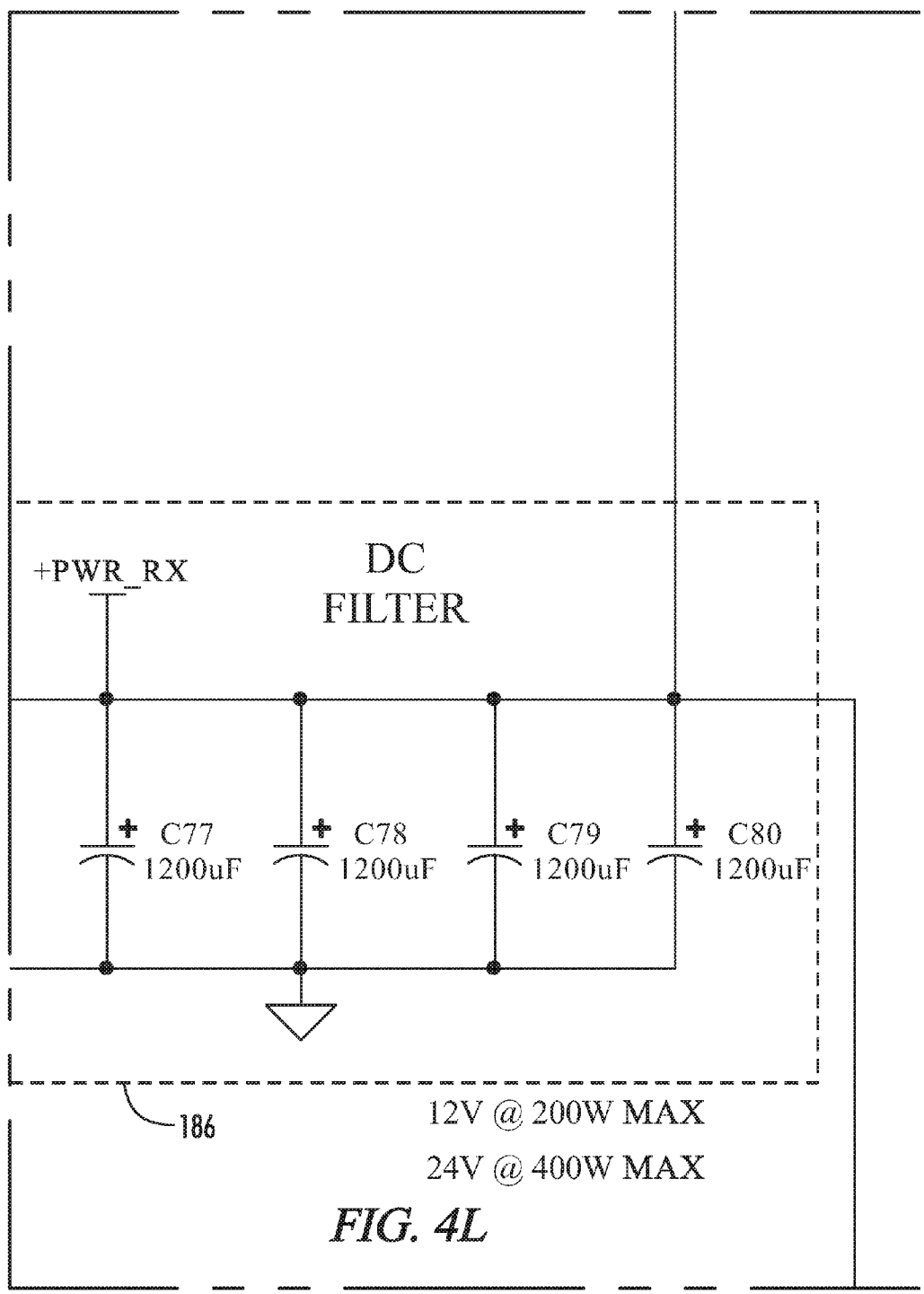

| FIG. 5A | FIG. 5B | FIG. 5C | FIG. 5D | FIG. 5E |
|---------|---------|---------|---------|---------|
| FIG. 5F | FIG. 5G | FIG. 5H | FIG. 5I | FIG. 5J |

*FIG. 5*

BIDIRECTIONAL POWER CONVERTER

CROSS-REFERENCES TO RELATED APPLICATIONS

This application claims priority to, and hereby incorporates by reference in its entirety, U.S. Provisional Patent Application Ser. No. 62/146,091 entitled "WIRELESS POWER SYSTEM" filed on Apr. 10, 2015.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to power converters. More particularly, this invention pertains to bidirectional power converters.

Designing circuits and laying out printed circuit boards is a time consuming and expensive process. Further, having multiple circuits and boards requires tracking multiple revisions of multiple circuits and printed circuit boards, which adds layers of complexity. However, in current power transfer circuit design techniques, circuit and board layouts are created for one specific purpose. Having multiple circuits and board layouts, each with multiple revisions is therefore heretofore unavoidable.

Wireless charging systems are limited by, inter alia, size, space, and transmitter/receiver orientation limitations. That is, wireless charging systems for batteries have wireless chargers, but the batteries directly physically contact the circuits of the device powered by the battery. The battery is not fully wireless which can be advantageous in wet or sterile environments. Further, wireless charging systems are currently limited by distance and/or orientation. That is, in some systems a transmitter coil must nearly be in contact with a receiver coil (e.g., laying a cell phone equipped with wireless charging capabilities on a wireless charging pad). In these systems, the Z directional differential between the transmitter coil and the receiver coil is therefore near zero while the X and Y directional variations are within a margin of error (e.g., the cell phone and its power receiving coil are within a specified diameter of a transmitting coil or antenna of the charging pad). In other systems, the Z directional differential between the transmitter coil and the receiver coil may be substantial, but the transmitter coil and the receiver coil must be located on the same axis (i.e., almost no variation in the X and Y directions between the coils and no variation in pitch). If the pitch or X-Y translation is not accurate, the transmitter may be damaged, requiring replacement of the transmitter circuit board. Thus, wireless charging systems that cannot compensate for variations in transmitter and receiver coil relative locations are difficult to manage and repair, and they are not practical for many uses in the field.

BRIEF SUMMARY OF THE INVENTION

Aspects of the present invention provide a bidirectional power converter circuit. The bidirectional power converter circuit is capable of both transmitting and receiving power, such that the bidirectional power converter circuit of the present invention may be used as the main component in multiple wireless power converter designs. The bidirectional power converter circuit is controlled via a hysteresis loop such that the bidirectional power converter circuit can compensate in near real time for variations and even changes in transmitter and receiver coil locations without damaging any components of the system.

In one aspect, the bidirectional power converter of the present invention is operable to provide an alternating current (AC) power to an AC terminal of the bidirectional power converter in a transmit mode of the bidirectional power converter and provide direct current (DC) power at a DC output terminal of the bidirectional power converter in a receive mode of the bidirectional power converter. The bidirectional power converter includes an oscillator, an amplifier, a modulator, a hysteretic receiver circuit, a transmit relay, a rectifier, a receive relay, and a hysteretic control circuit. The oscillator is configured to provide a drive signal at a base frequency when the bidirectional power converter is operating in the transmit mode. The amplifier is configured to receive power from a power source via a DC input terminal of the bidirectional power converter and provide an AC output signal to the AC terminal of the bidirectional power converter in response to receiving the drive signal when the bidirectional power converter is operating in the transmit mode. The modulator is configured to selectively provide the drive signal from the oscillator to the amplifier as a function of a hysteretic control signal when the bidirectional power converter is operating in the transmit mode. The hysteretic receiver circuit is configured to receive a transmitted control signal at the bidirectional power converter and provide the hysteretic control signal to the modulator as a function of the received, transmitted control signal when the bidirectional power converter is operating in the transmit mode. The transmit relay is configured to electrically connect the amplifier to the AC terminal of the bidirectional power converter when the bidirectional power converter is operating in the transmit mode and electrically disconnect the amplifier from the AC terminal of the bidirectional power converter when the bidirectional power converter is operating in the receive mode. The rectifier is configured to receive an alternating current power signal from the AC terminal of the bidirectional power converter and provide a DC output to the DC output terminal of the bidirectional power converter when the bidirectional power converter is operating in the receive mode. A receive relay is configured to enable the rectifier to provide DC output to the DC output terminal of the bidirectional power converter when the bidirectional power converter is operating in the receive mode and prevent the rectifier from providing the DC output to the DC output terminal when the bidirectional power converter is operating in the transmit mode. The hysteretic control circuit is configured to monitor the DC output and transmit the control signal as a function of the monitored DC output when the bidirectional power converter is operating in the receive mode.

BRIEF DESCRIPTION OF THE SEVERAL VIEWS OF THE DRAWINGS

FIG. 2G is a partial schematic diagram of the bidirectional power converter of FIG. 2.

FIG. 2I is a partial schematic diagram of the bidirectional power converter of FIG. 2.

FIG. 4L is a partial schematic diagram of the bidirectional power converter of FIG. 4.

FIG. 4O is a partial schematic diagram of the bidirectional power converter of FIG. 4.

FIG. 5 is a block diagram of how FIG. 5A to FIG. 5J fit together to form a partial schematic diagram of the bidirectional power converter of FIGS. 1-4.

DETAILED DESCRIPTION OF THE INVENTION

Figure 1:
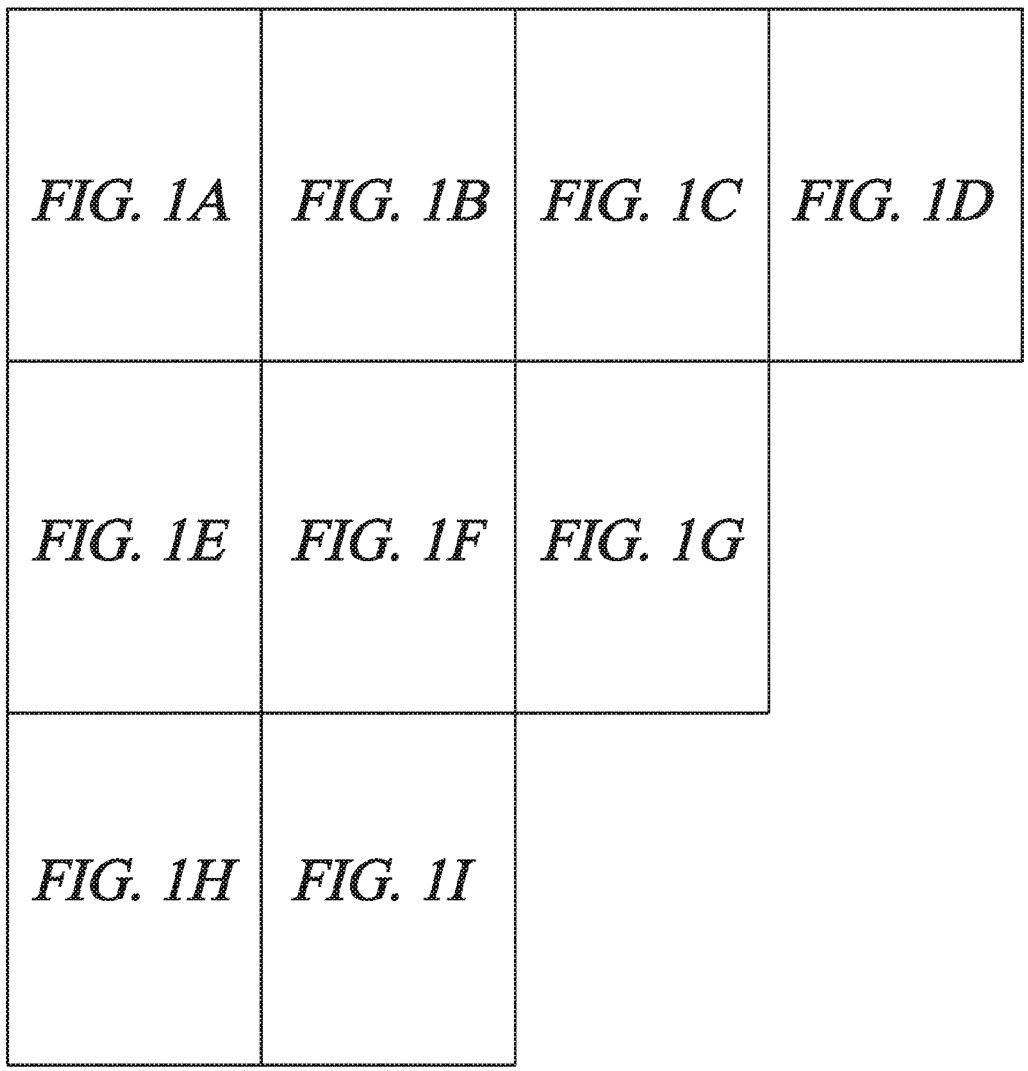
FIG. 1 is a block diagram of how FIGS. 1A to 1I fit together to form a block diagram of one embodiment of a bidirectional power converter.
Figure 1A:
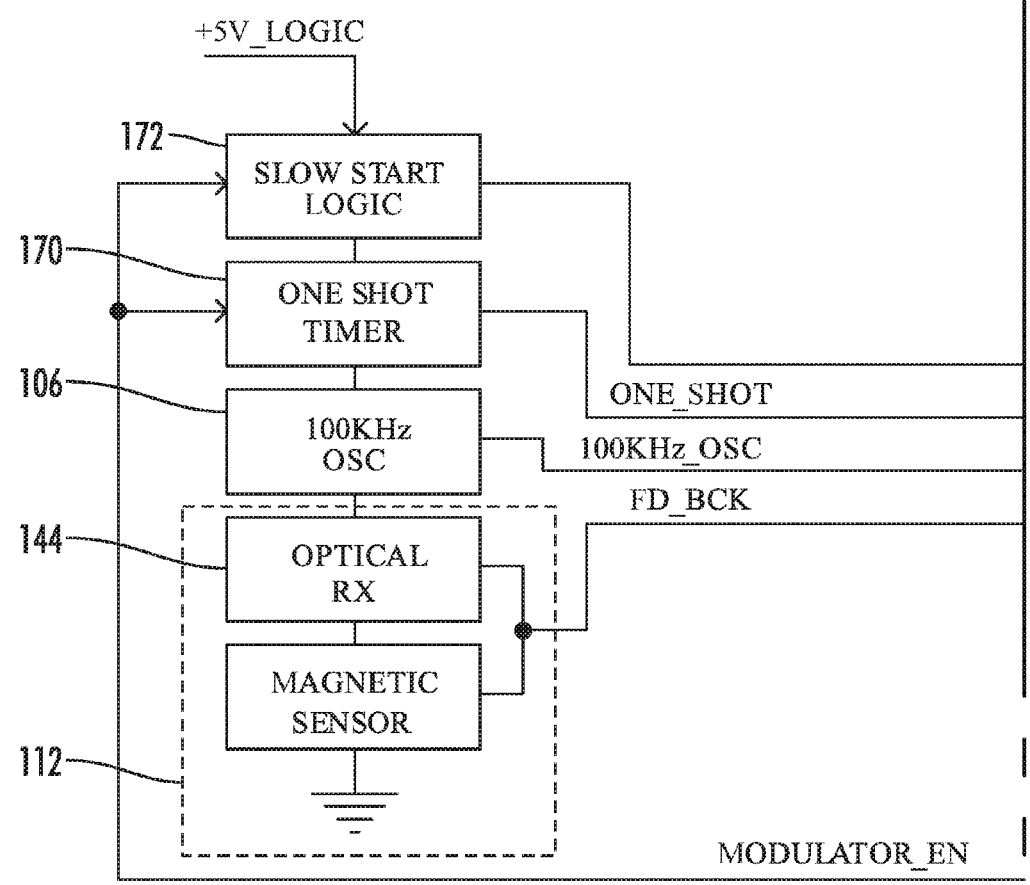
FIG. 1A is a partial block diagram of the block diagram of the bidirectional power converter of FIG. 1.
Figure 1B:
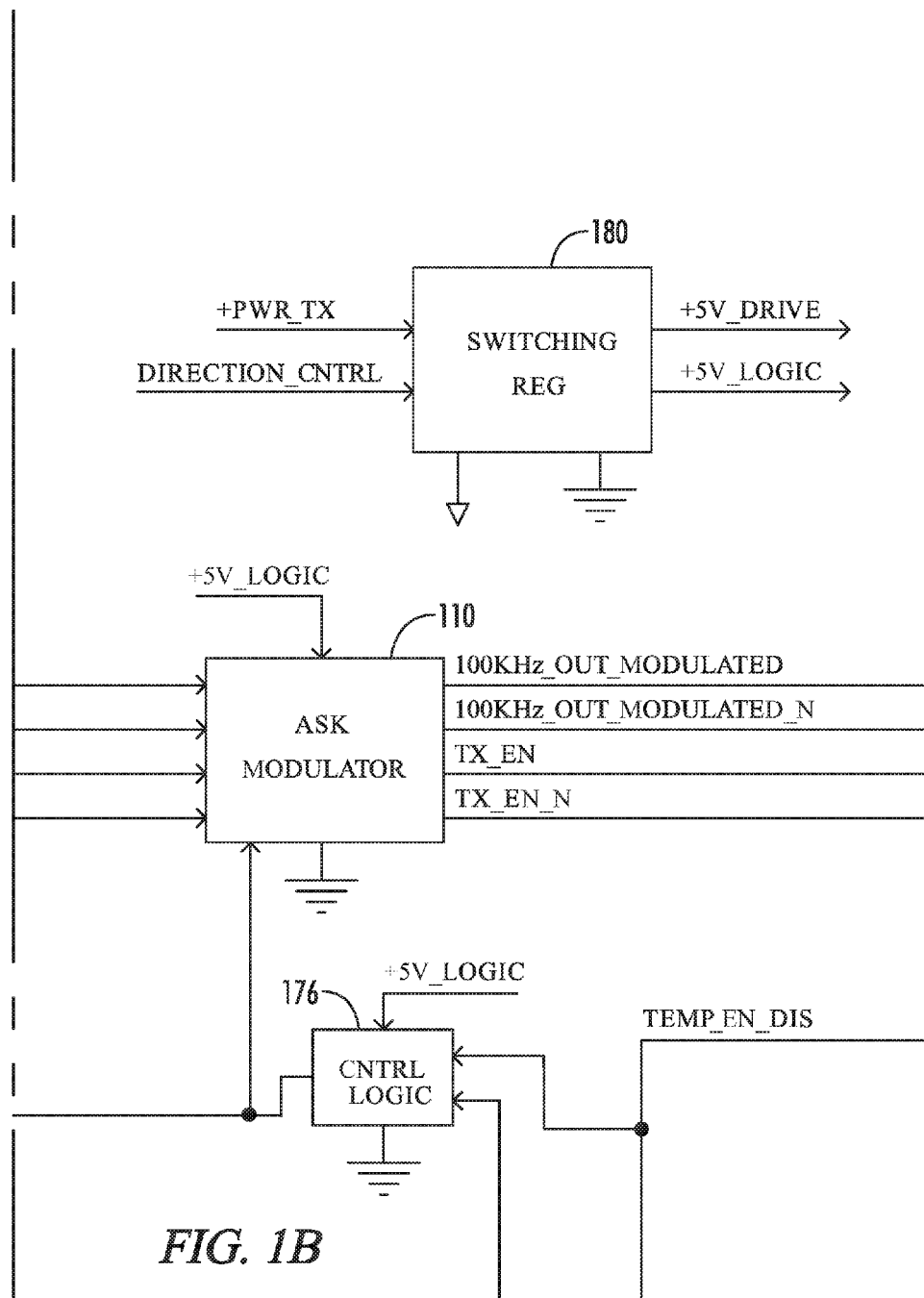
FIG. 1B is a partial block diagram of the block diagram of the bidirectional power converter of FIG. 1.
Figure 1C:
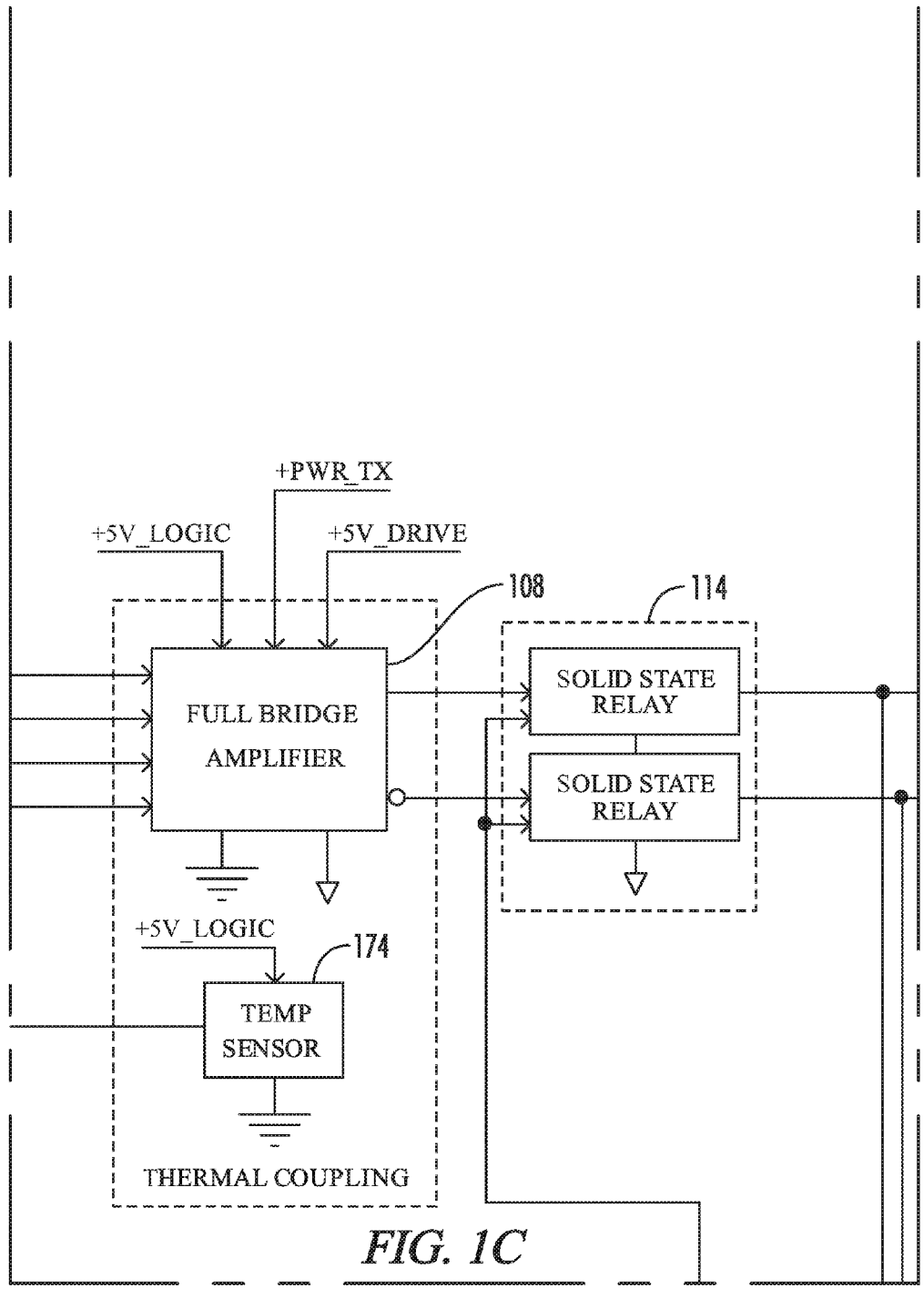
FIG. 1C is a partial block diagram of the block of diagram of the bidirectional power converter of FIG. 1.
Figure 1D:
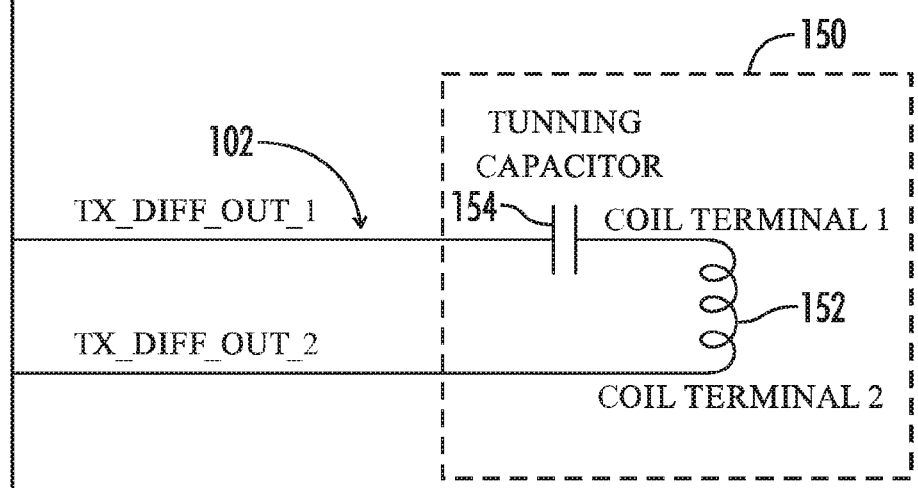
FIG. 1D is a partial block diagram of the block of diagram of the bidirectional power converter of FIG. 1.
Figure 1E:
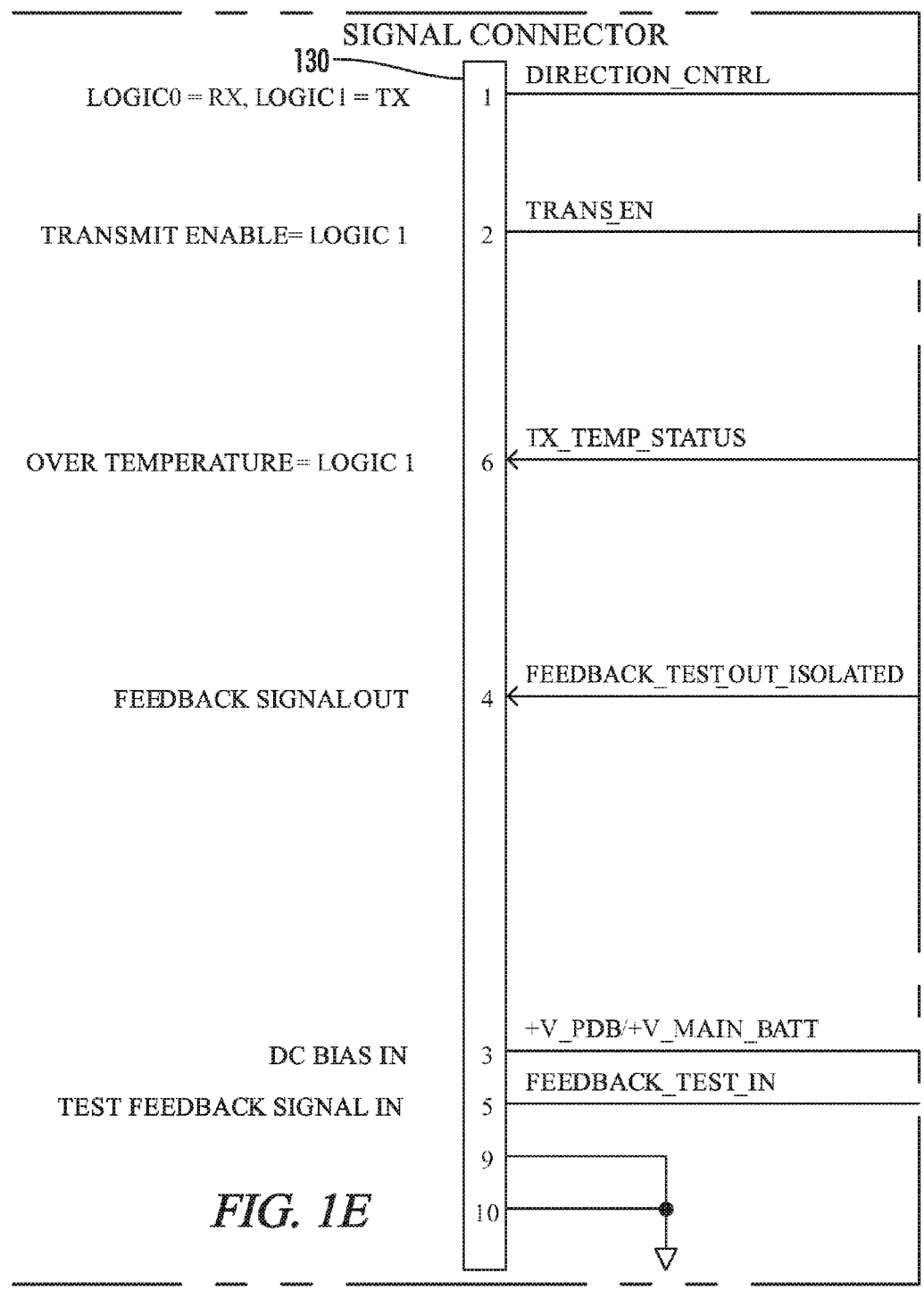
FIG. 1E is a partial block diagram of the block of diagram of the bidirectional power converter of FIG. 1.
Figure 1F:
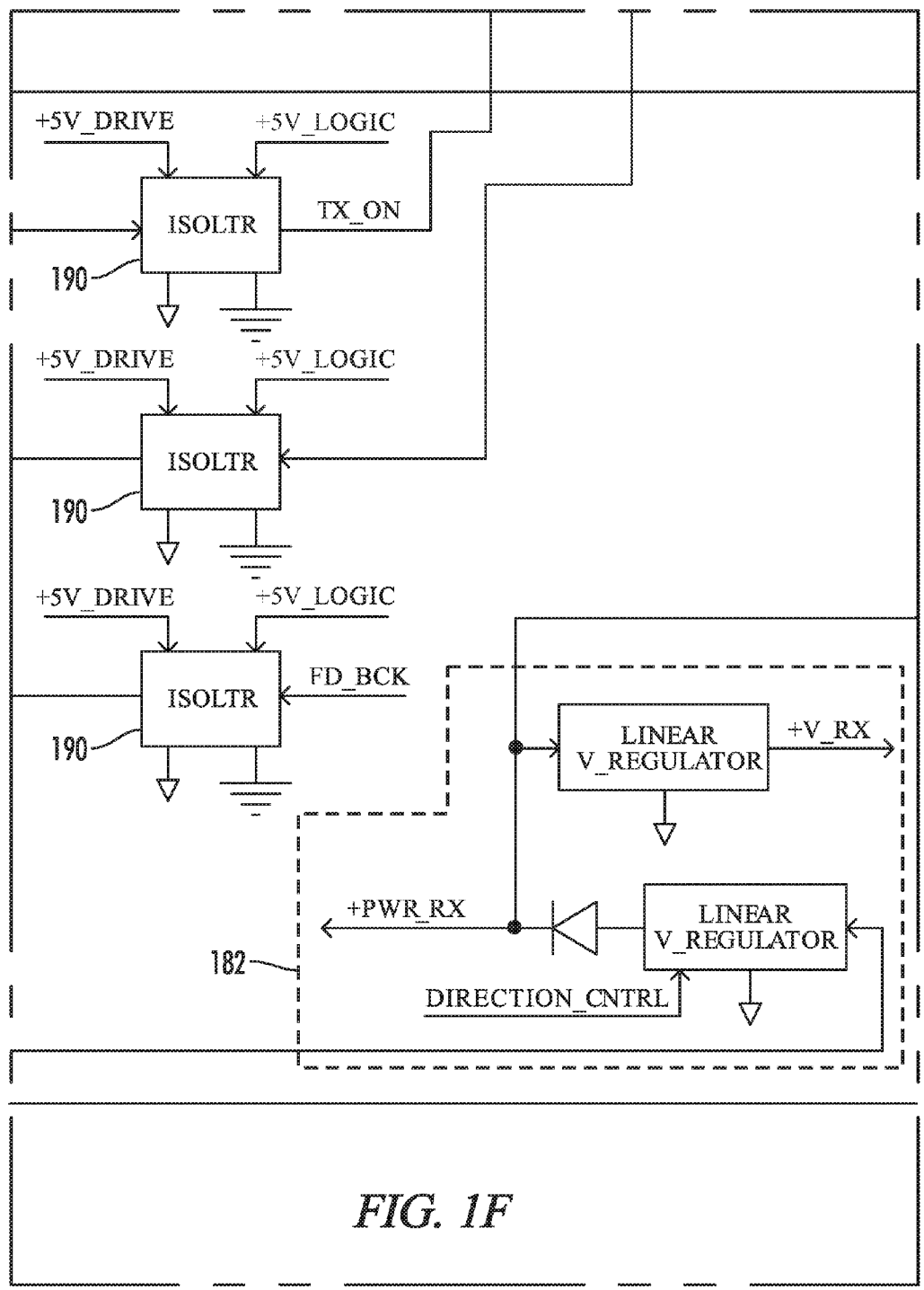
FIG. 1F is a partial block diagram of the block of diagram of the bidirectional power converter of FIG. 1.
Figure 1G:
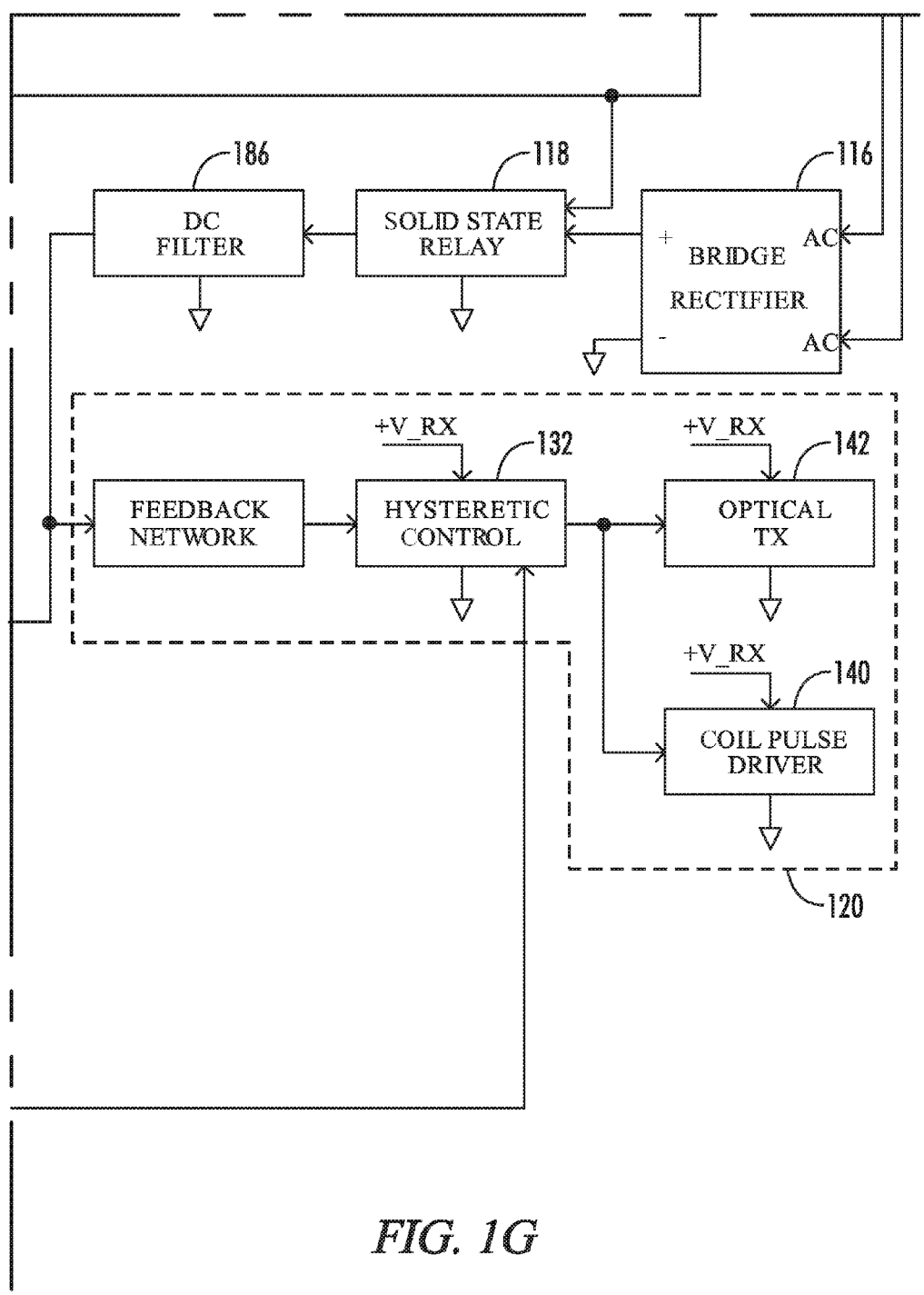
FIG. 1G is a partial block diagram of the block of diagram of the bidirectional power converter of FIG. 1.
Figure 1H:
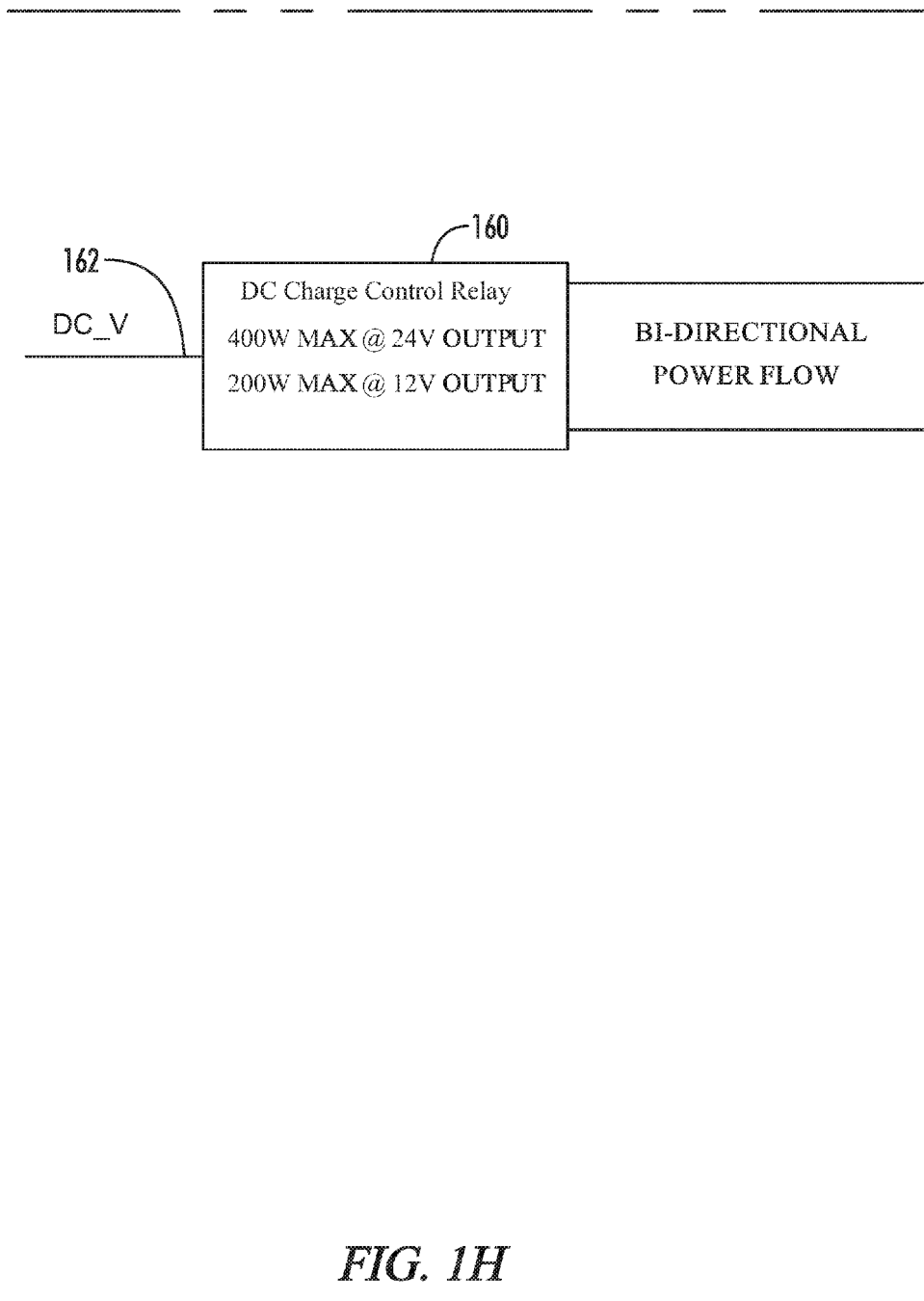
FIG. 1H is a partial block diagram of the block of diagram of the bidirectional power converter of FIG. 1.
Figure 1I:
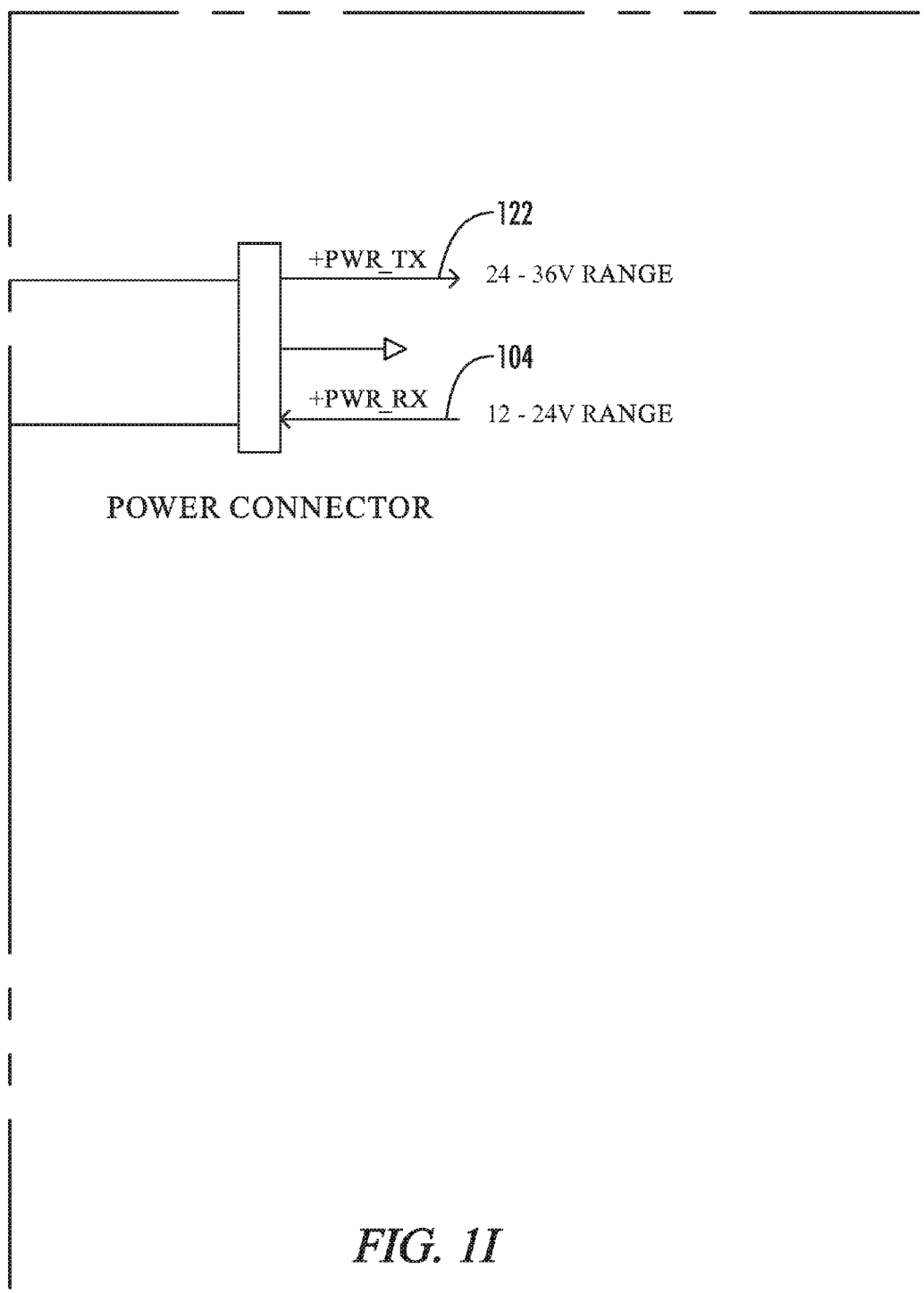
FIG. 1I is a partial block diagram of the block of diagram of the bidirectional power converter of FIG. 1.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

As used herein, "micro" refers generally to any semiconductor based microelectronic circuit including, but not limited to, a comparator, an operational amplifier, a microprocessor, a timer, an AND gate, a NOR gate, an OR gate, an XOR gate, or a NAND gate.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

To the extent the claims recited herein recite forms of signal transmission, those forms of signal transmission do not encompass transitory forms of signal transmission.

Figure 2:
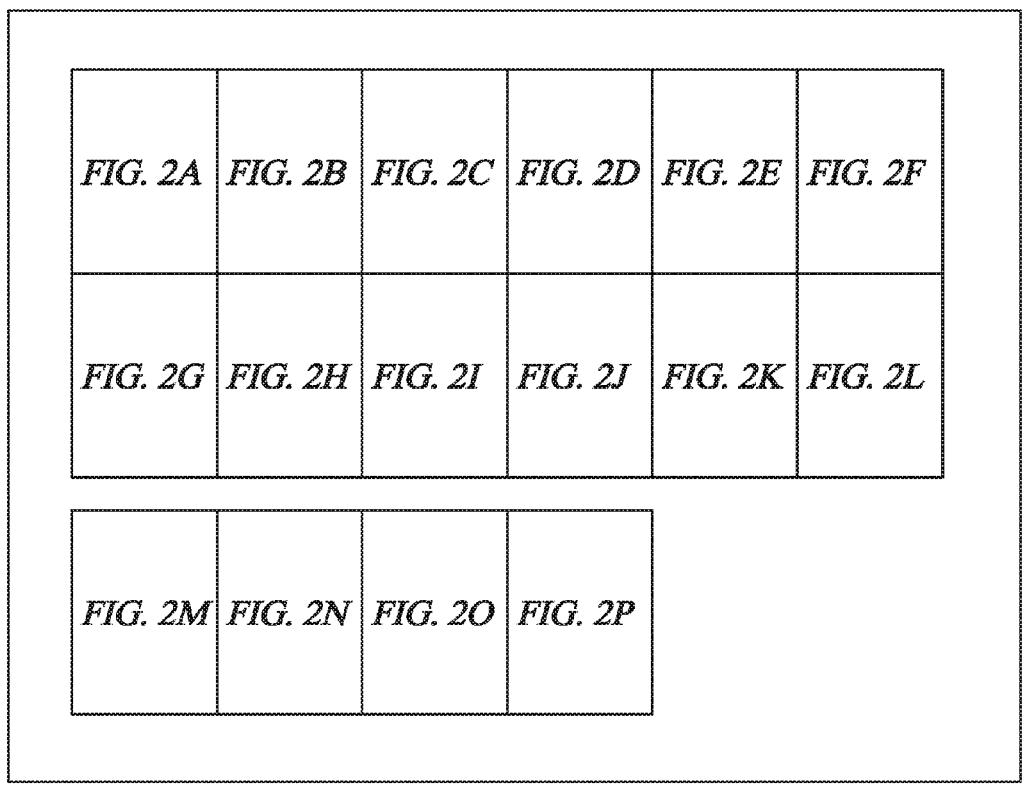
FIG. 2 is a block diagram of how FIG. 2A to FIG. 2P fit together to form a partial schematic diagram of the bidirectional power converter of FIG. 1.
Figure 2A:
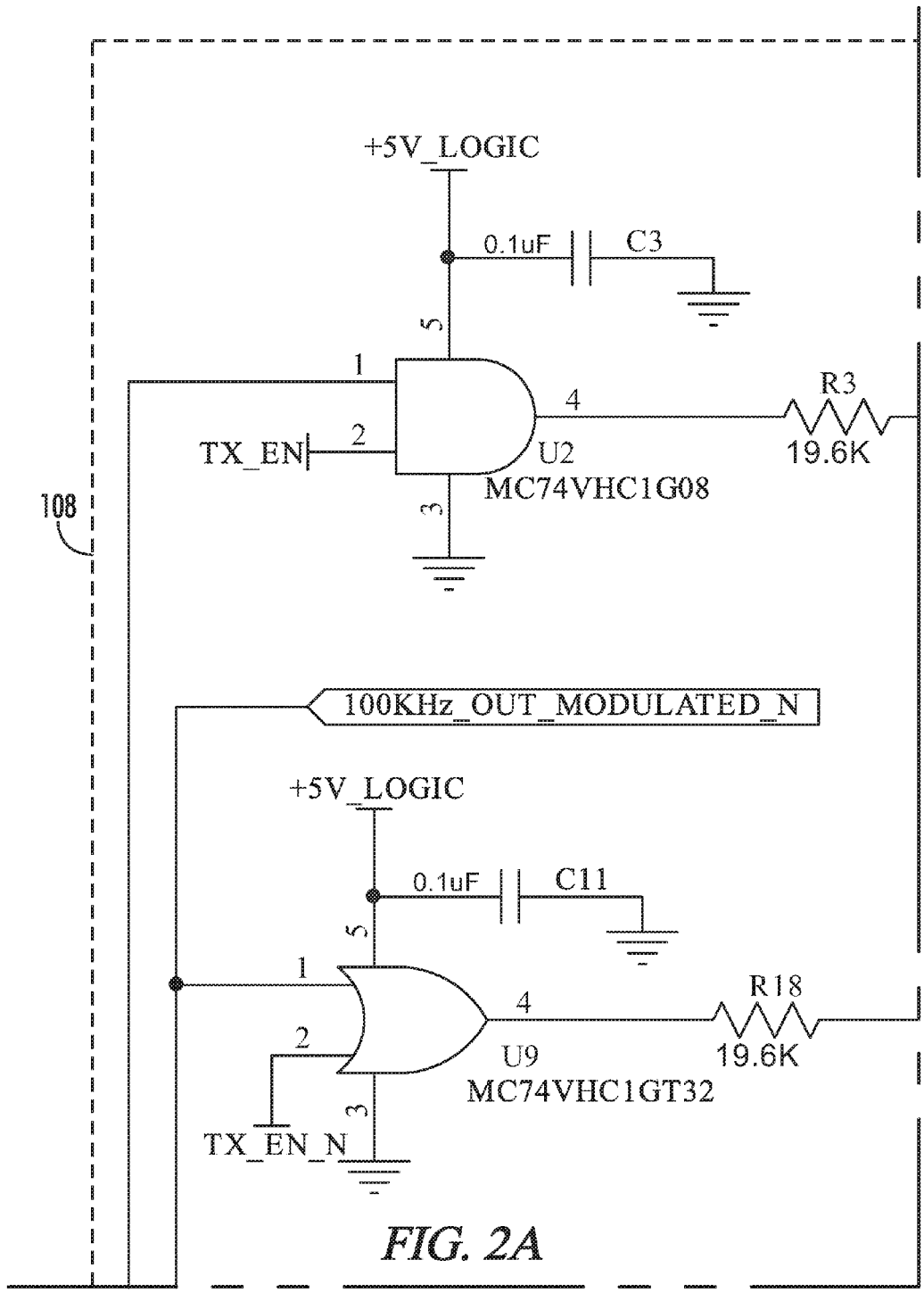
FIG. 2A is a partial schematic diagram of the bidirectional power converter of FIG. 2.
Figure 2B:
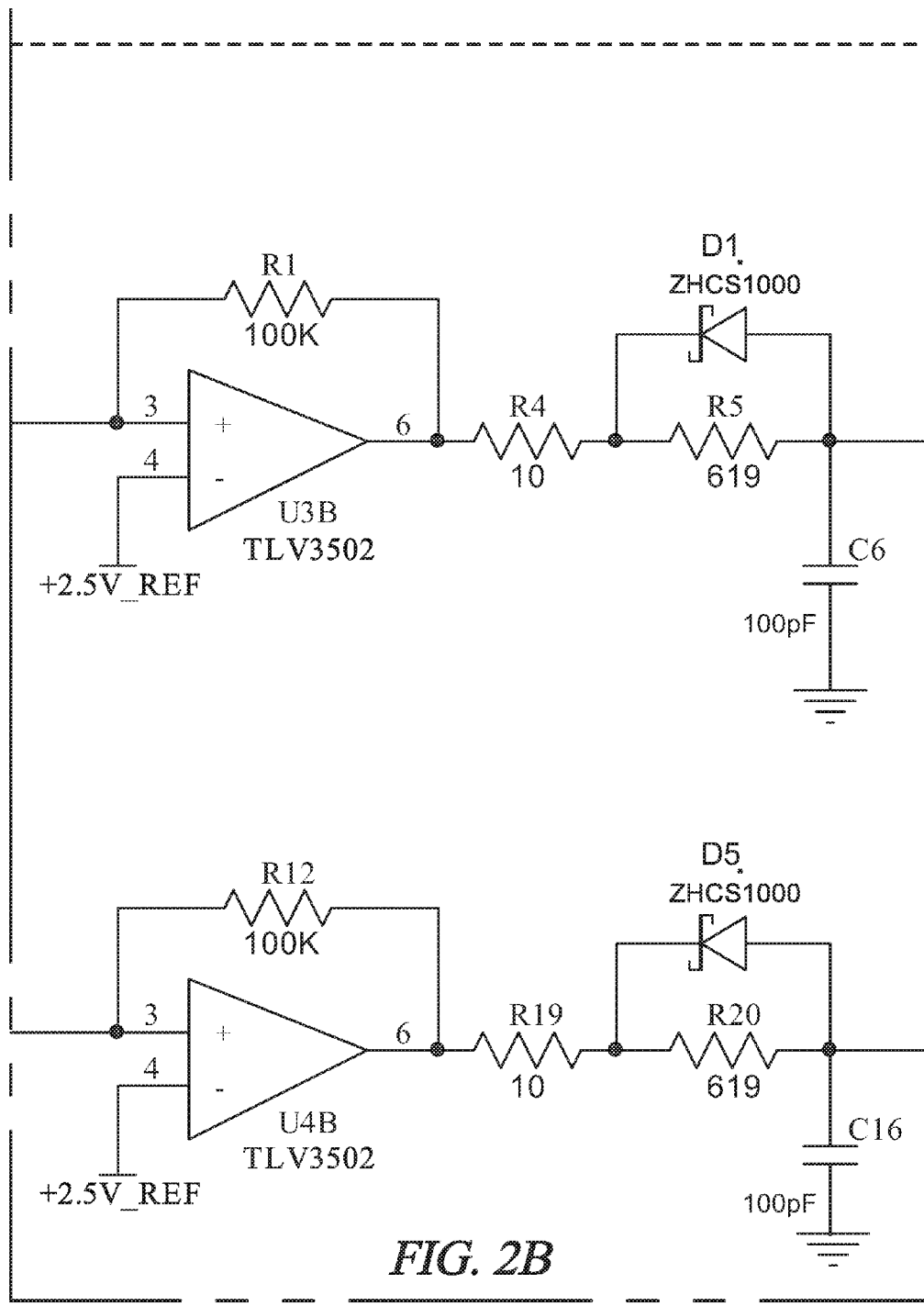
FIG. 2B is a partial schematic diagram of the bidirectional power converter of FIG. 2.
Figure 2C:
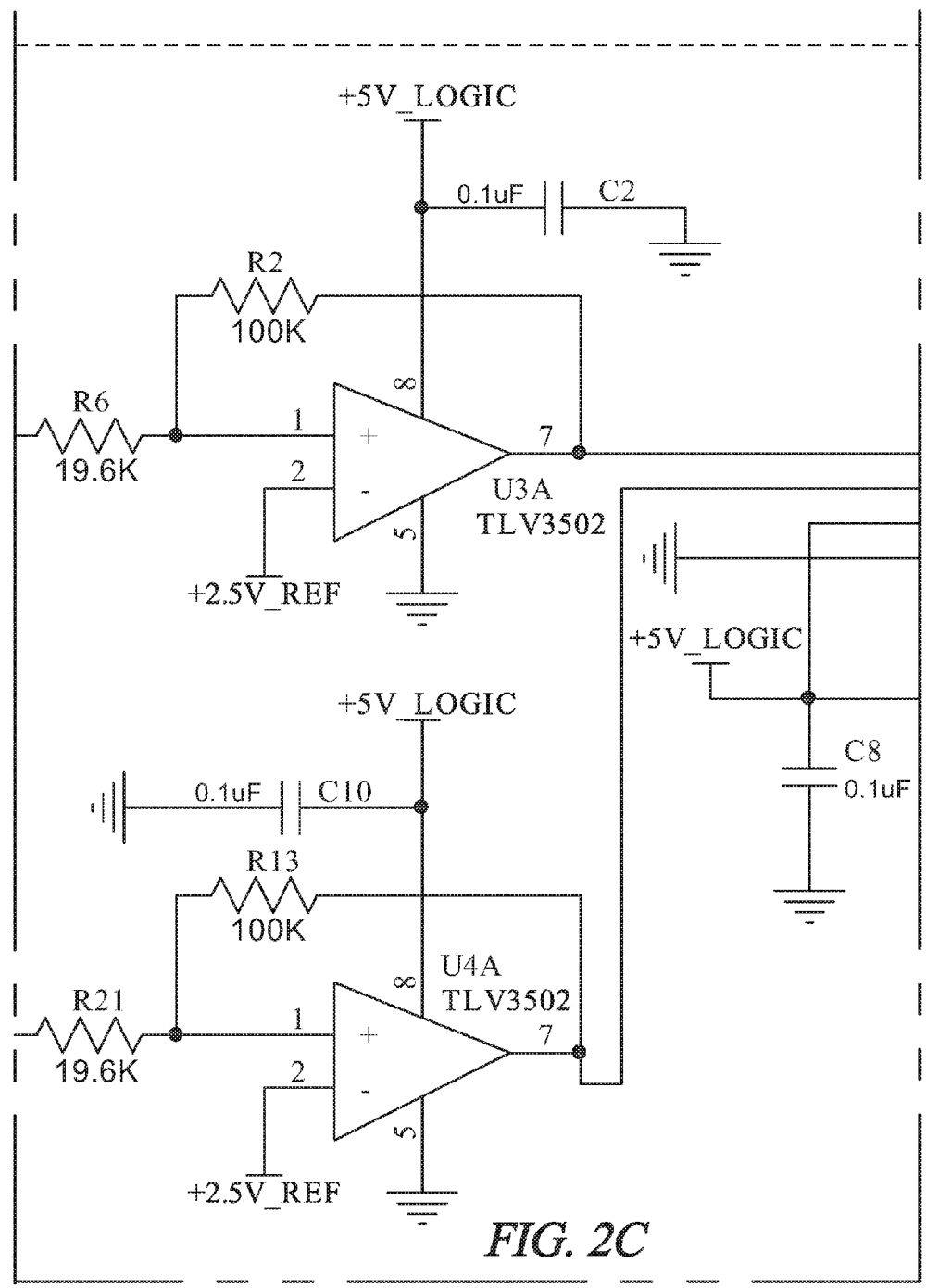
FIG. 2C is a partial schematic diagram of the bidirectional power converter of FIG. 2.
Figure 2D:
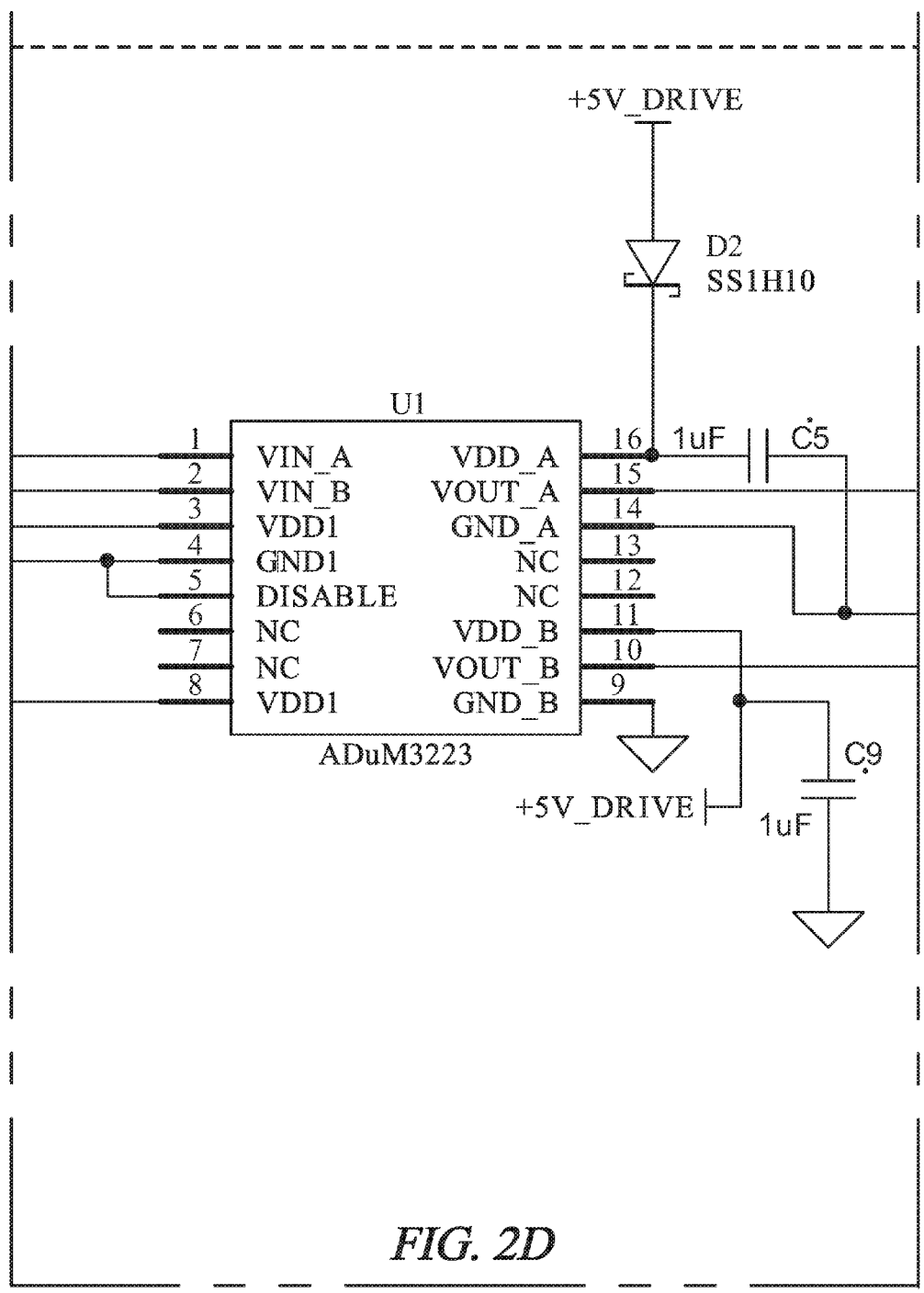
FIG. 2D is a partial schematic diagram of the bidirectional power converter of FIG. 2.
Figure 2E:
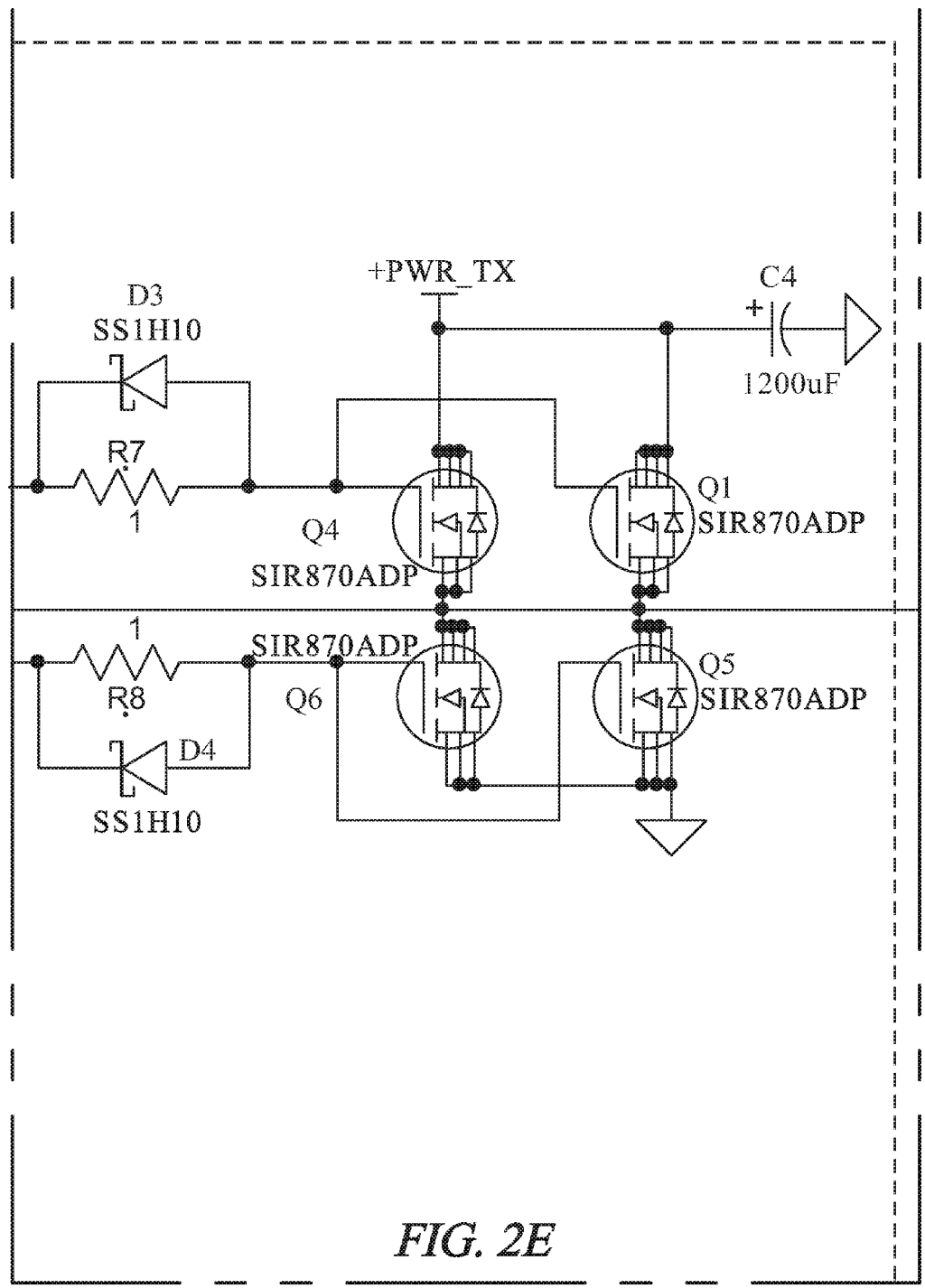
FIG. 2E is a partial schematic diagram of the bidirectional power converter of FIG. 2.
Figure 2F:
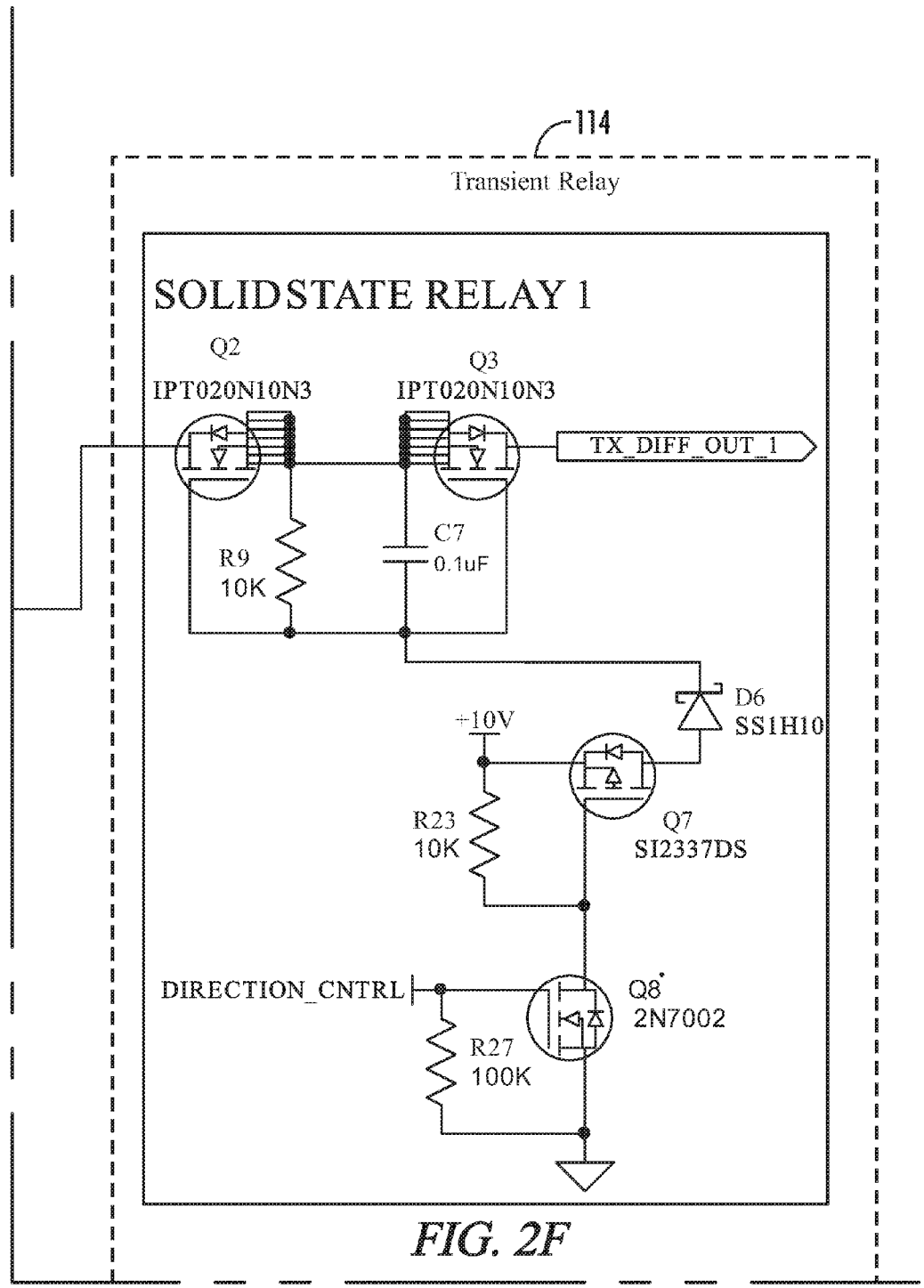
FIG. 2F is a partial schematic diagram of the bidirectional power converter of FIG. 2.
Figure 2H:
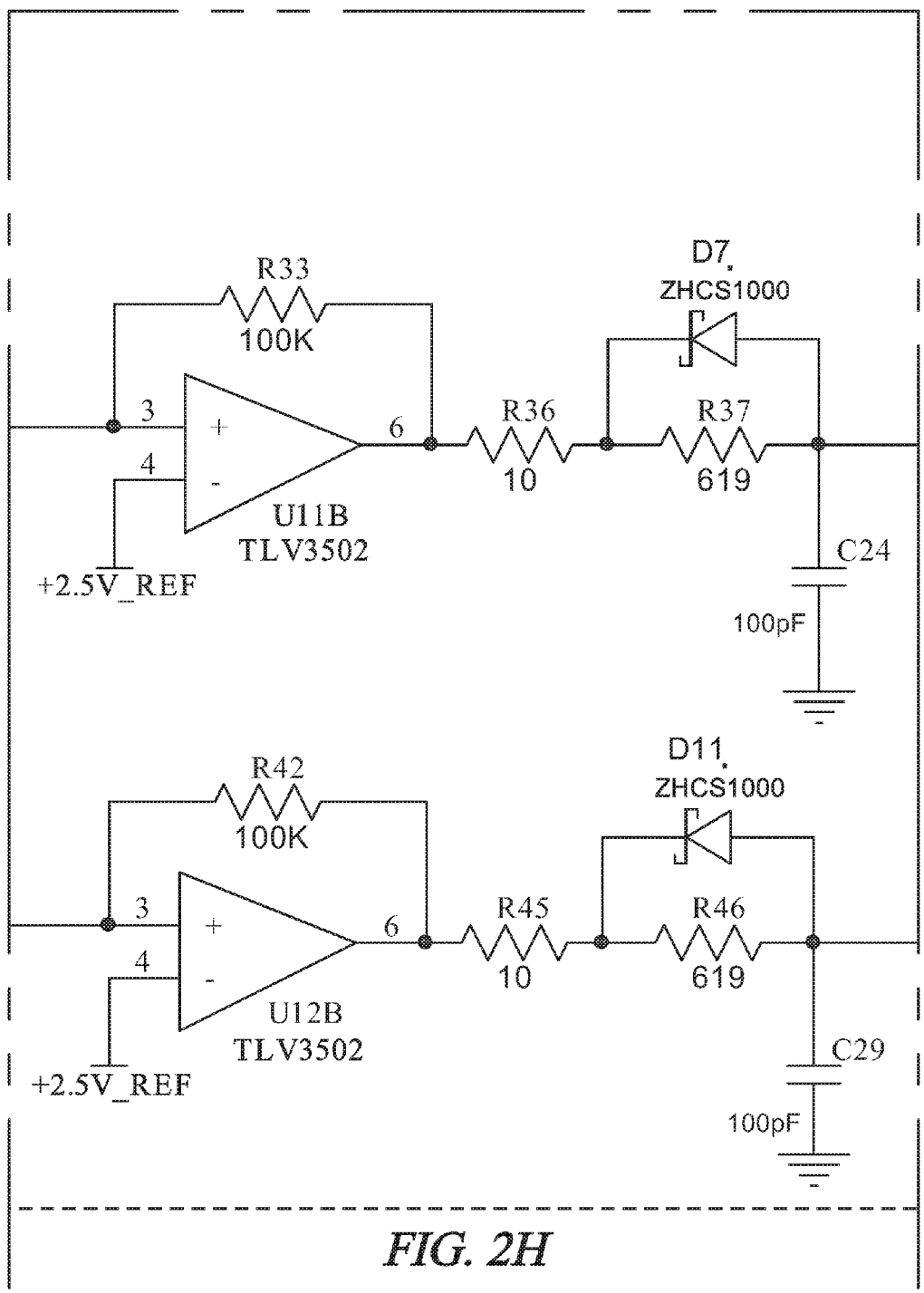
FIG. 2H is a partial schematic diagram of the bidirectional power converter of FIG. 2.
Figure 2J:
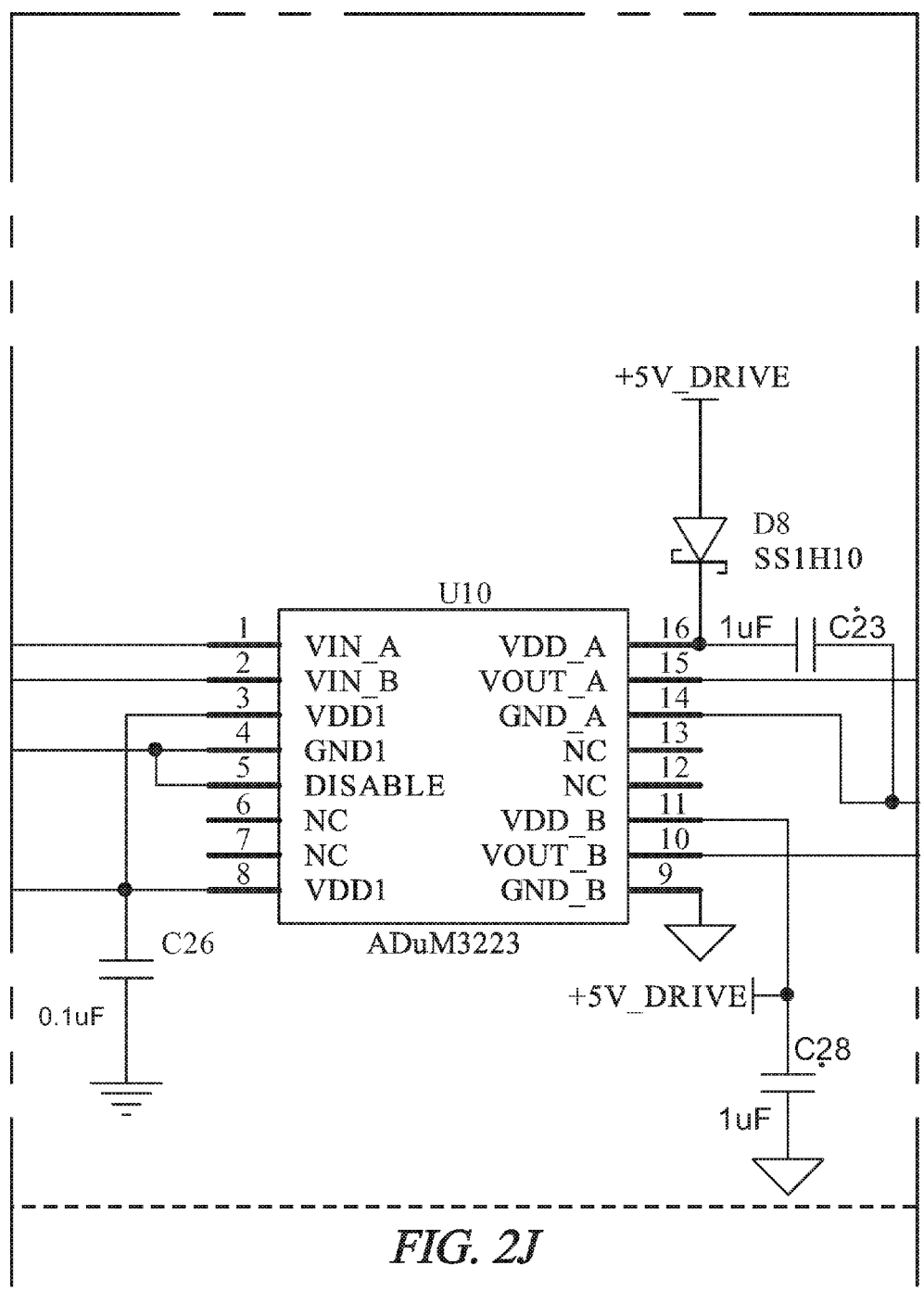
FIG. 2J is a partial schematic diagram of the bidirectional power converter of FIG. 2.
Figure 2K:
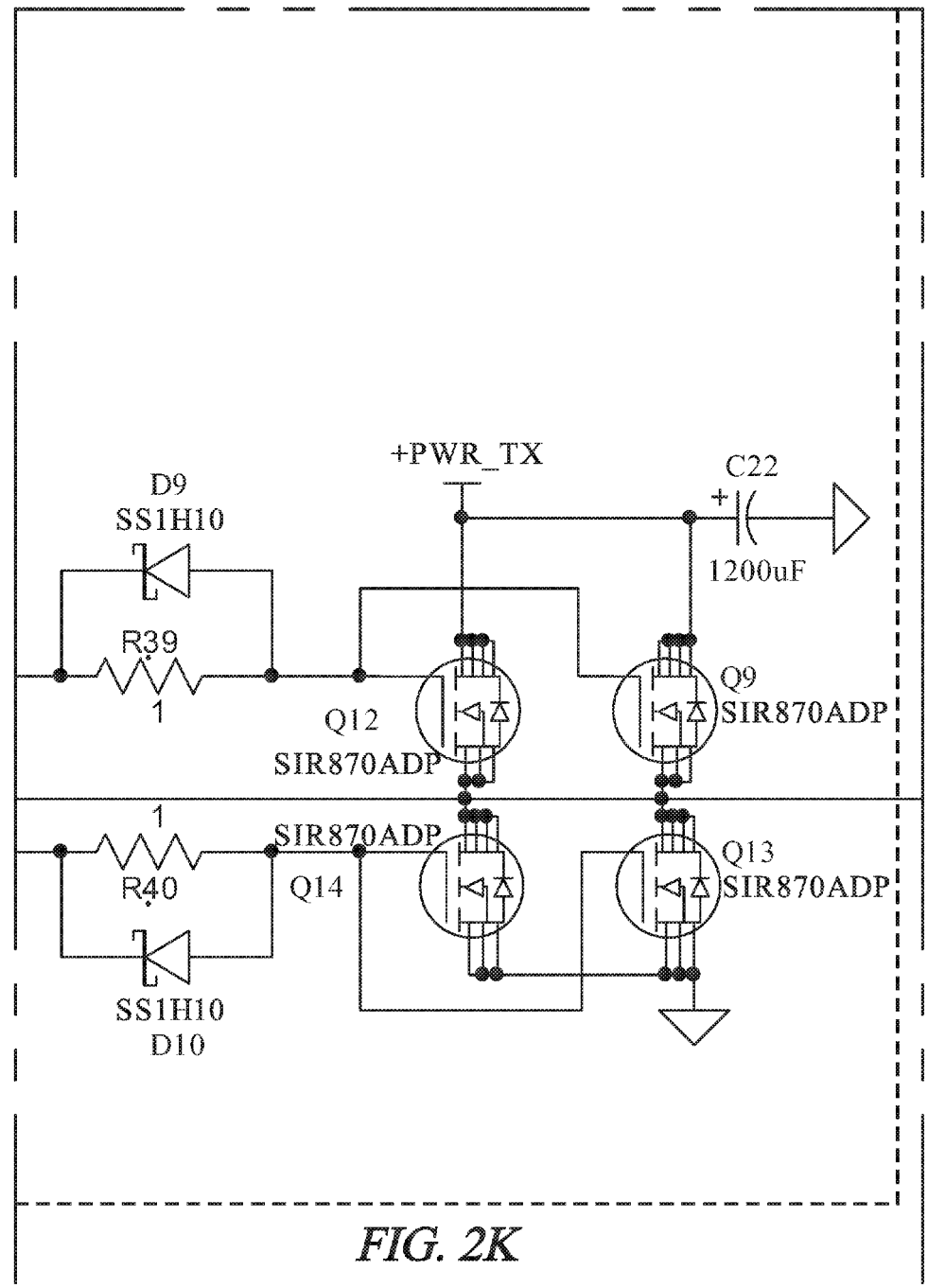
FIG. 2K is a partial schematic diagram of the bidirectional power converter of FIG. 2.
Figure 2L:
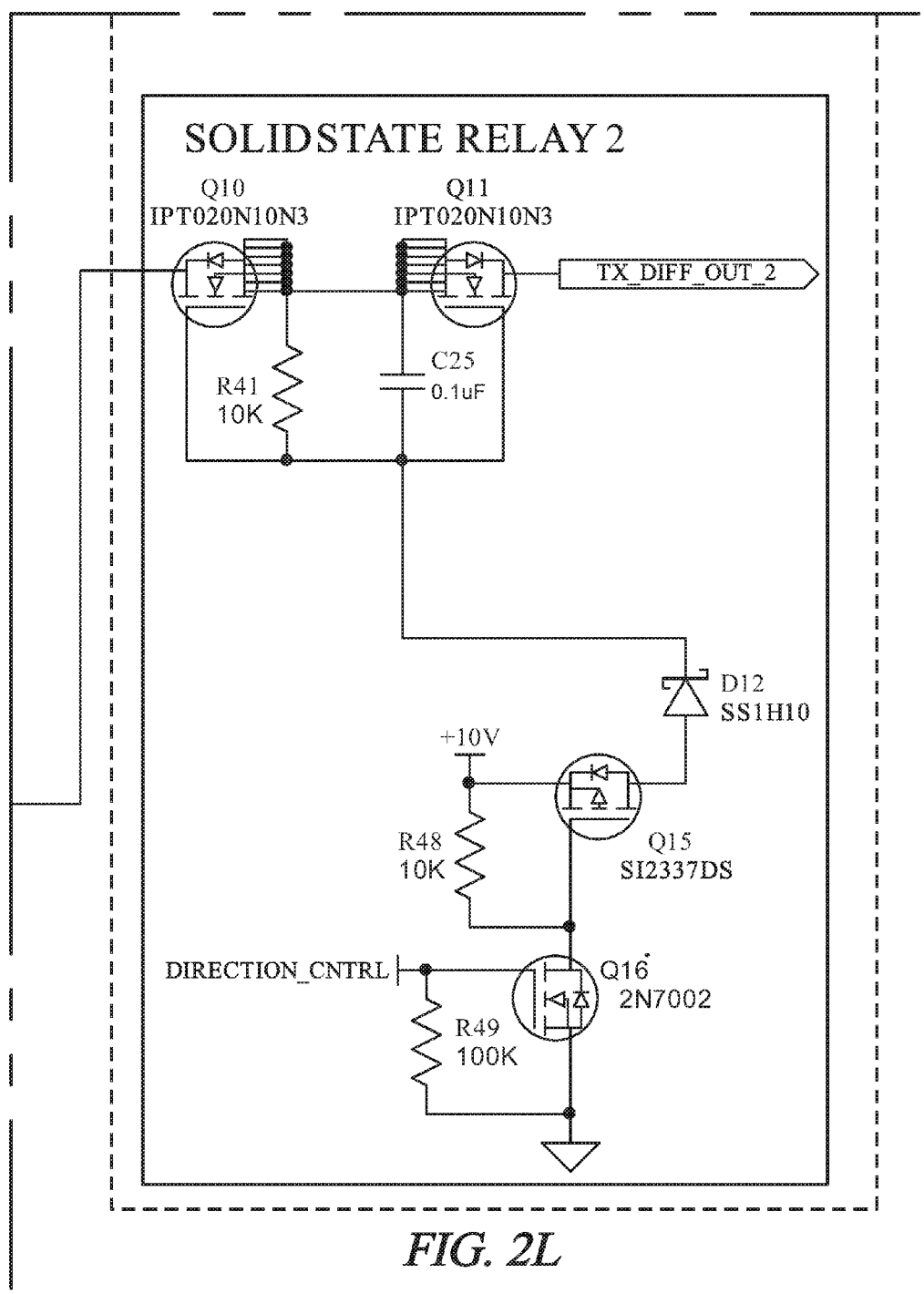
FIG. 2L is a partial schematic diagram of the bidirectional power converter of FIG. 2.
Figure 2M:
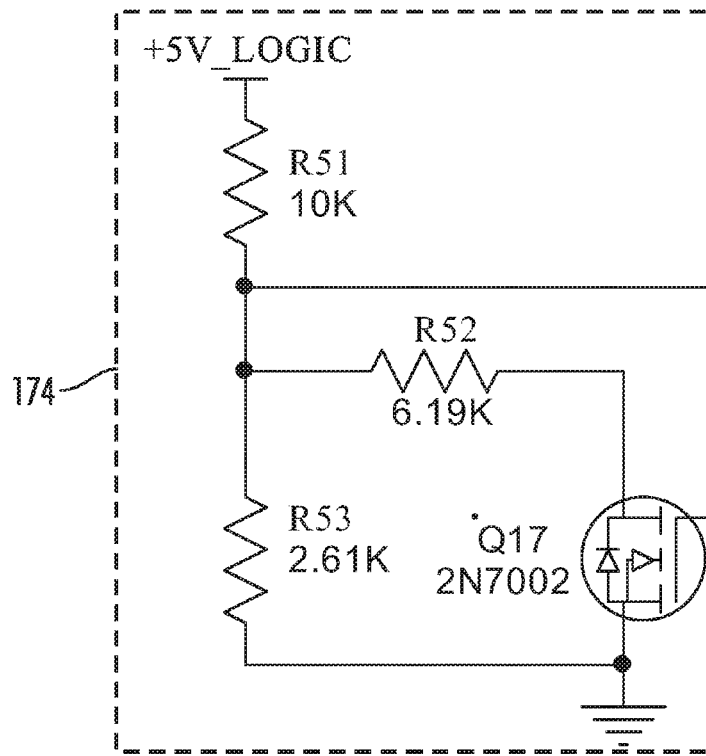
FIG. 2M is a partial schematic diagram of the bidirectional power converter of FIG. 2.
Figure 2N:
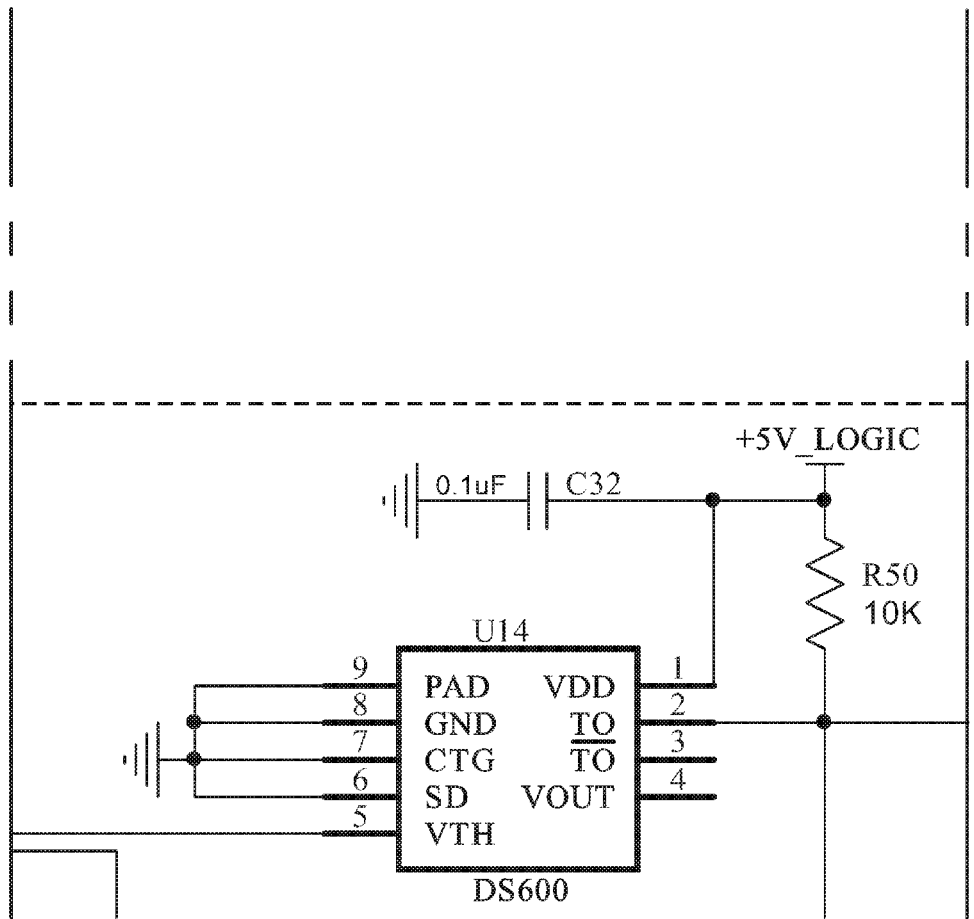
FIG. 2N is a partial schematic diagram of the bidirectional power converter of FIG. 2.
Figure 2O:
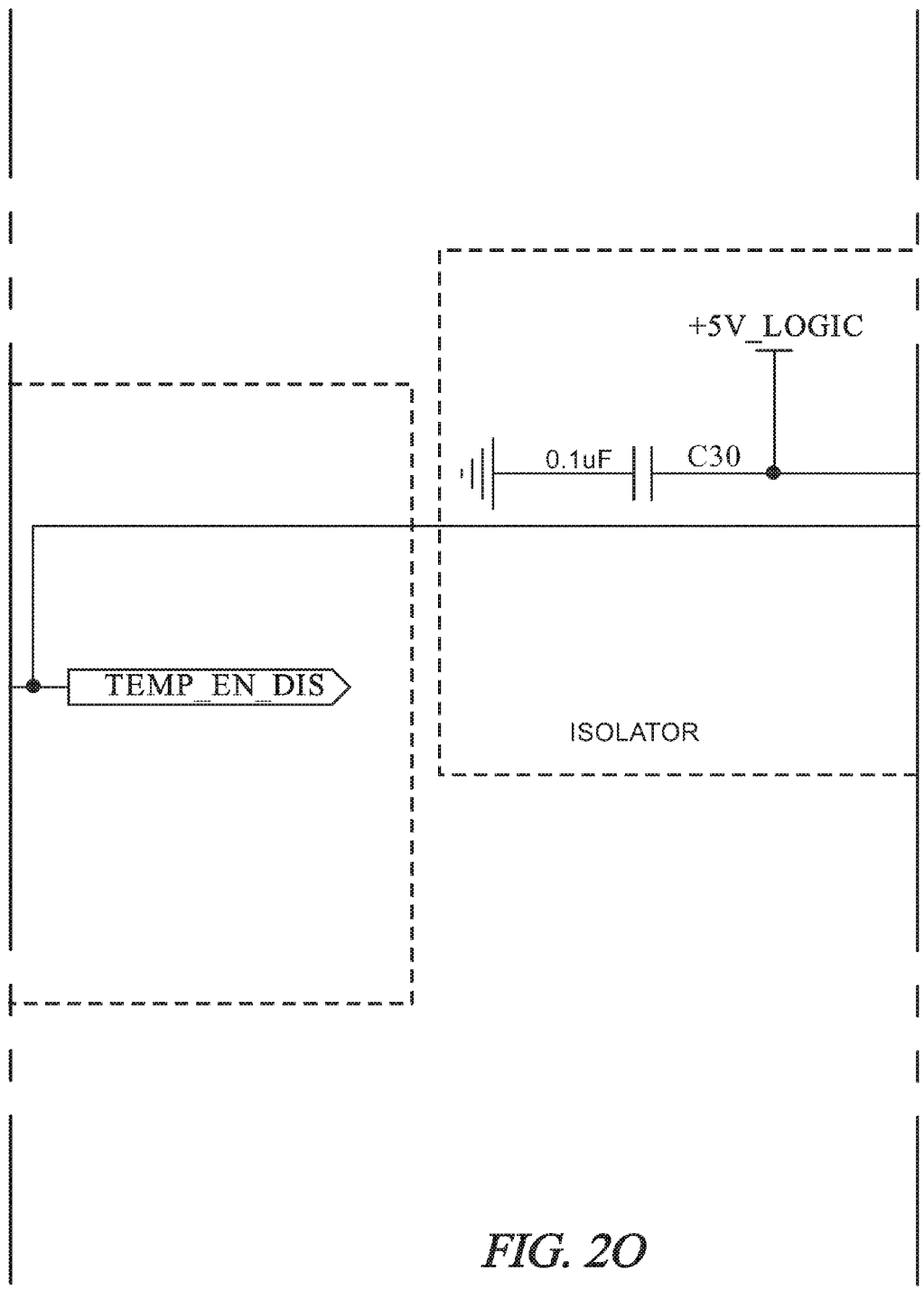
FIG. 2O is a partial schematic diagram of the bidirectional power converter of FIG. 2.
Figure 2P:
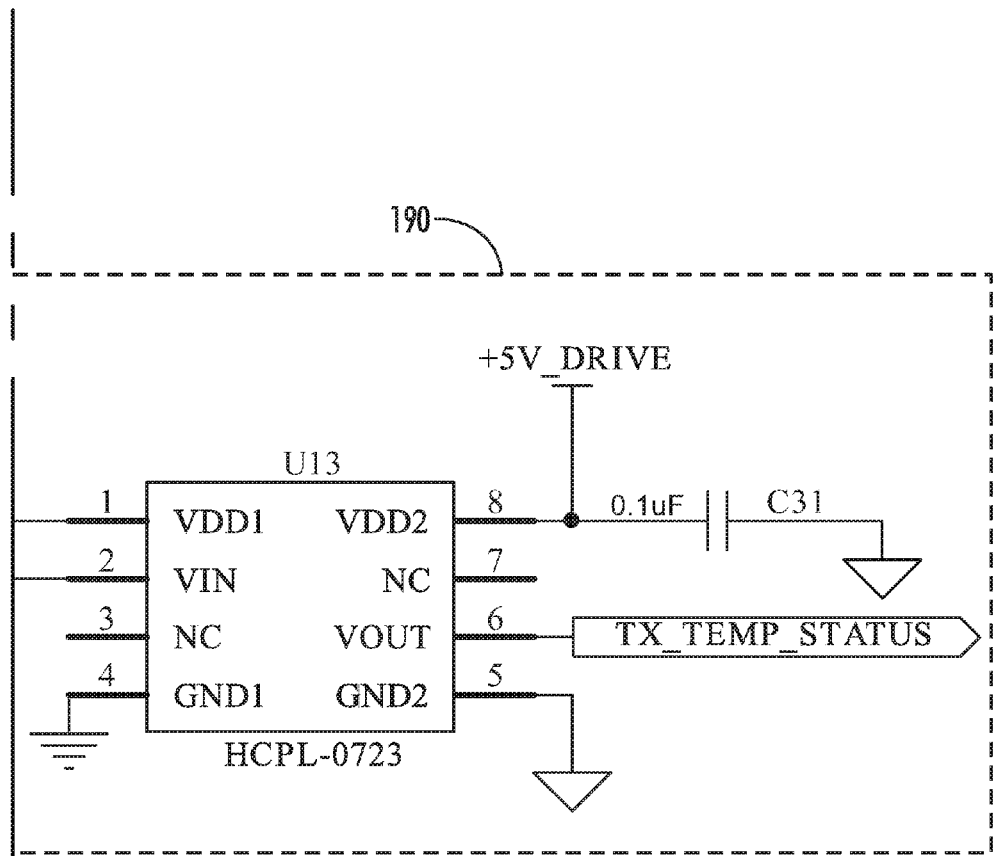
FIG. 2P is a partial schematic diagram of the bidirectional power converter of FIG. 2.
Figure 3:
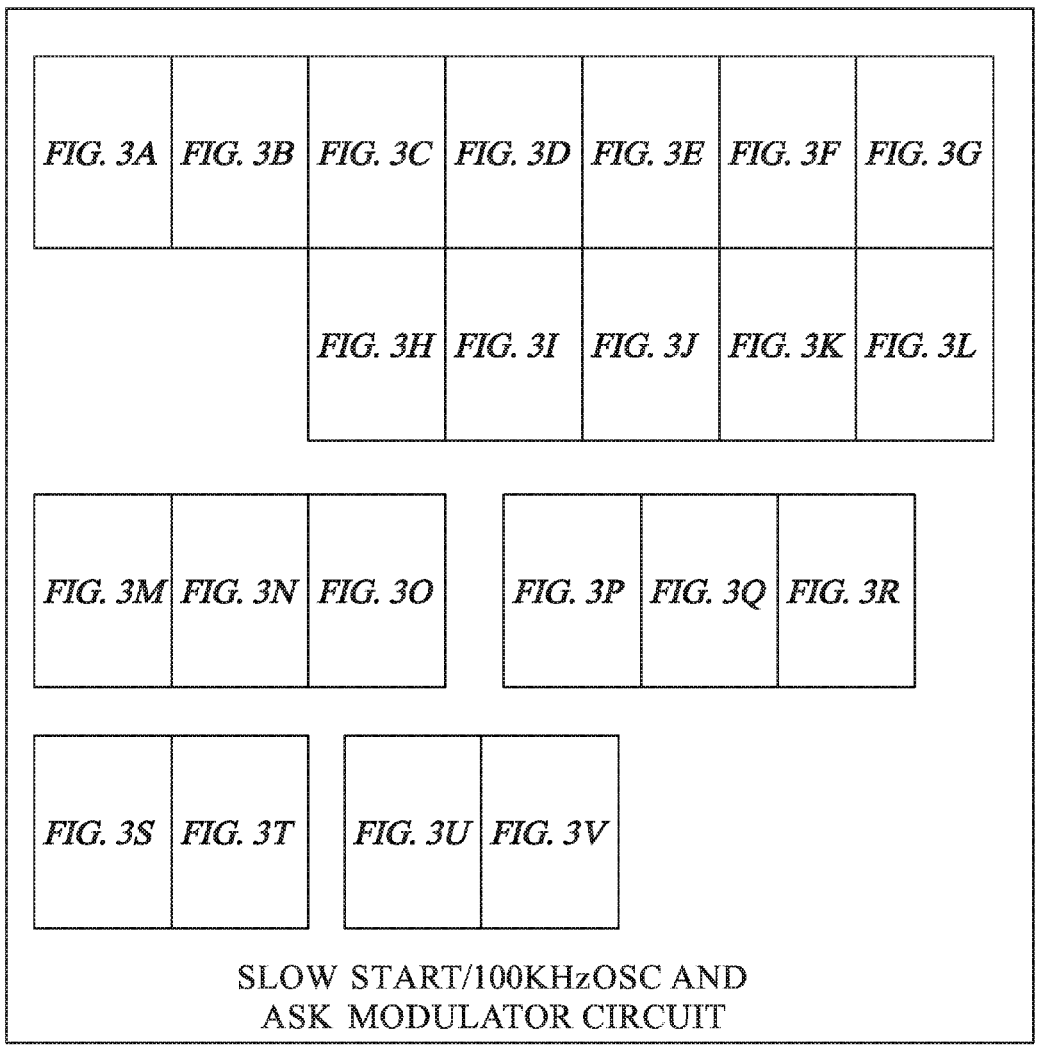
FIG. 3 is a block diagram of how FIGS. 3A to 3V fit together to form a partial schematic diagram of the bidirectional power converter of FIGS. 1 and 2.
Figure 3A:
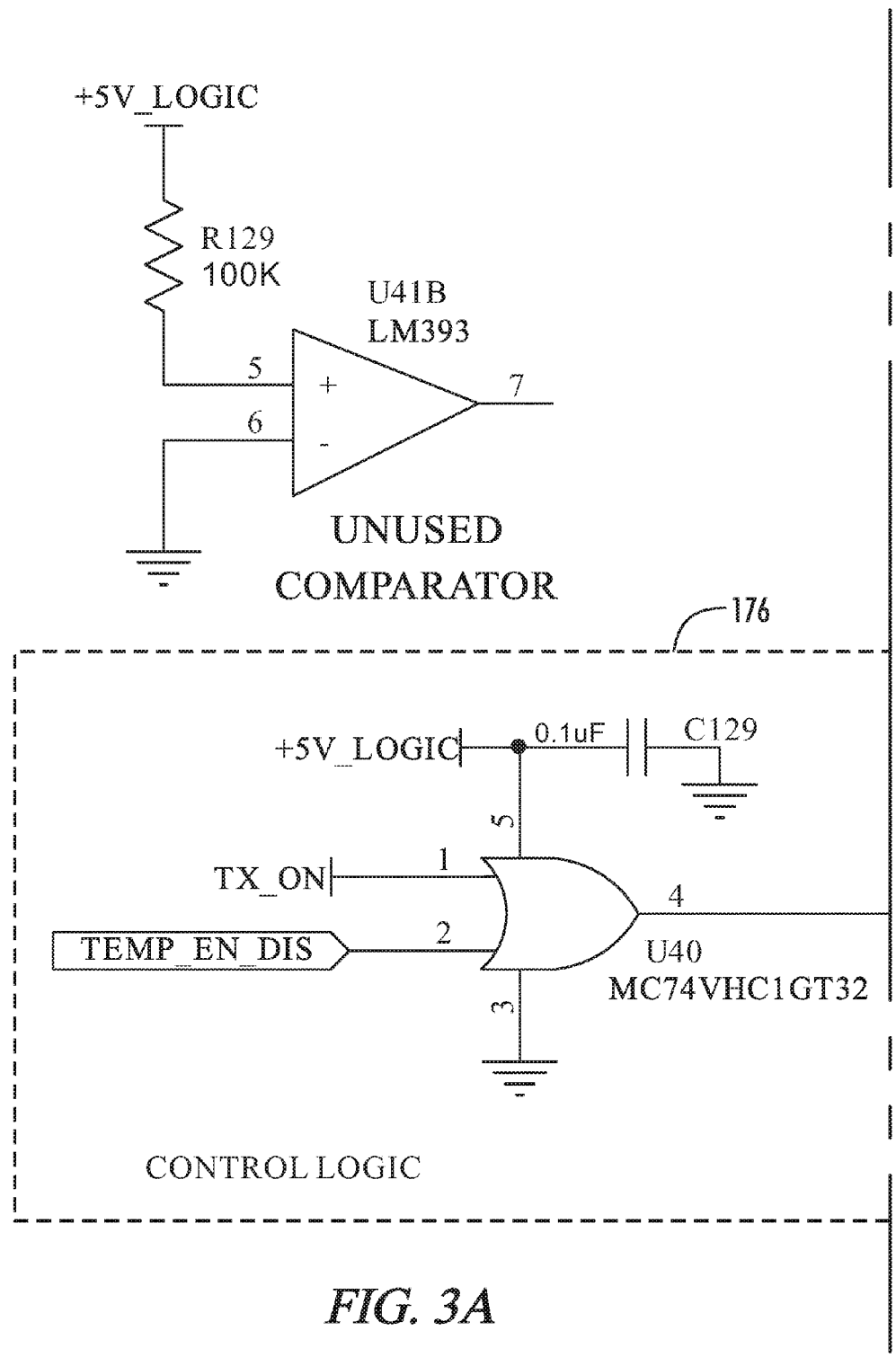
FIG. 3A is a partial schematic diagram of the bidirectional power converter of FIG. 3.
Figure 3B:
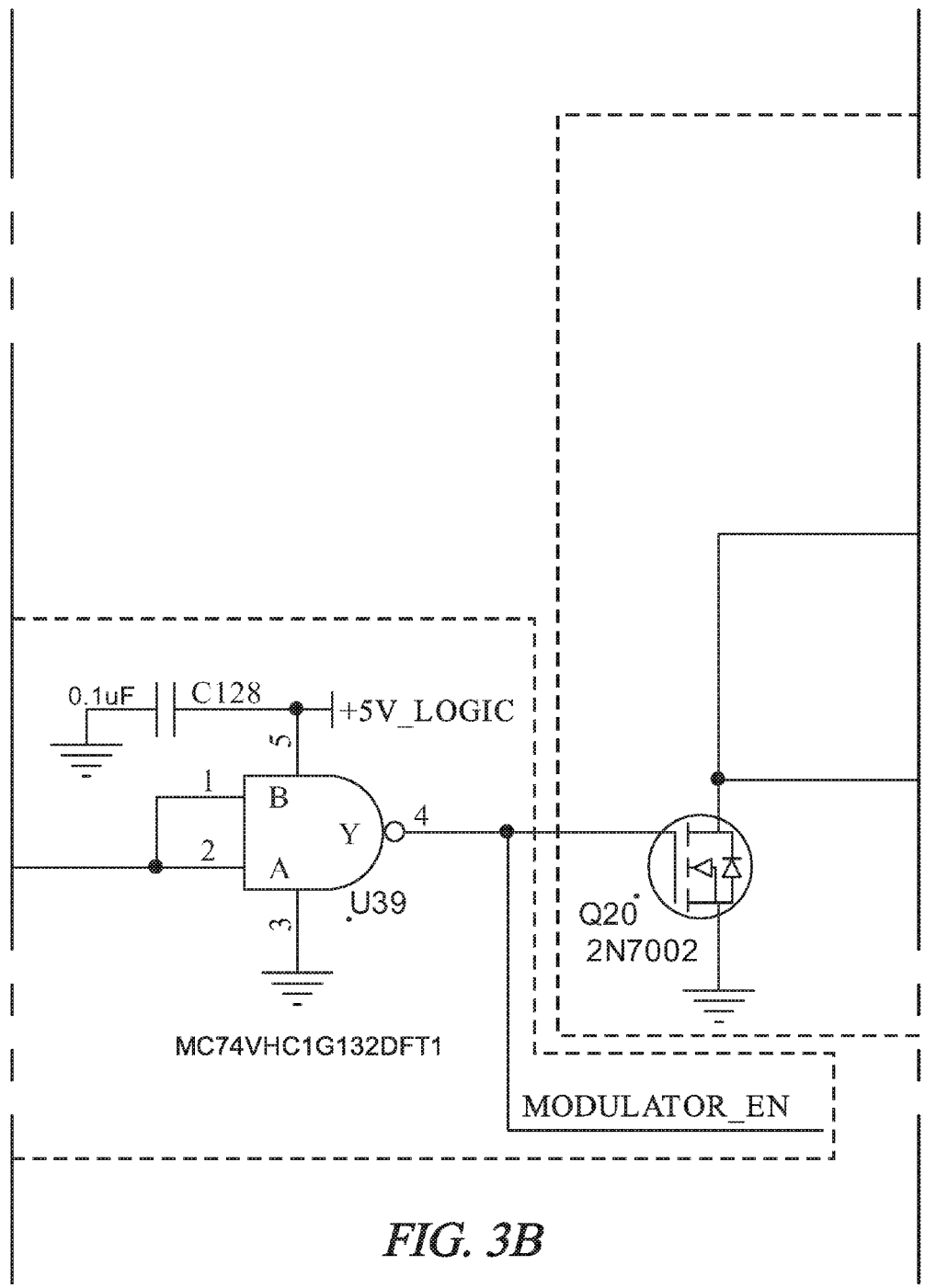
FIG. 3B is a partial schematic diagram of the bidirectional power converter of FIG. 3.
Figure 3C:
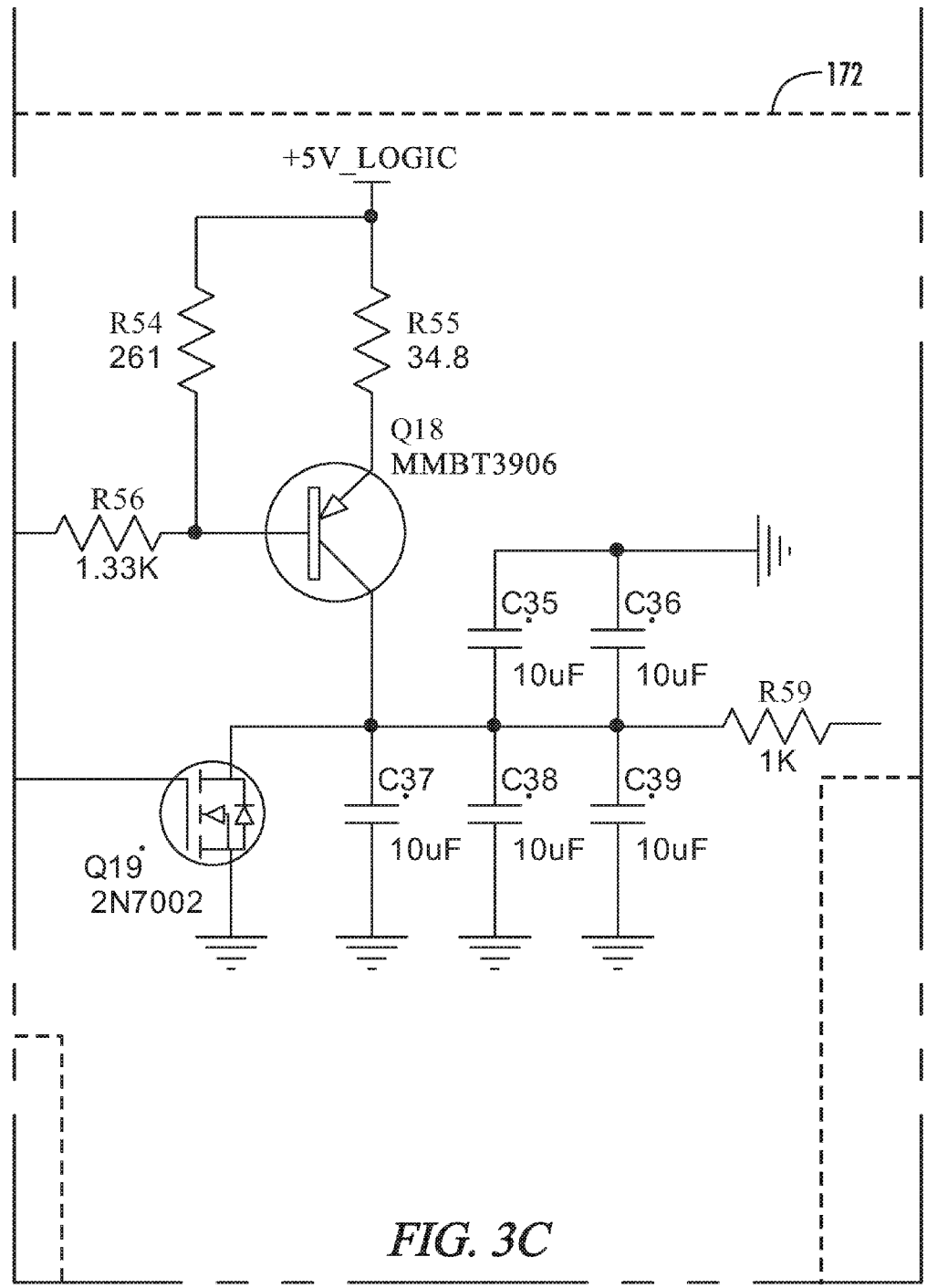
FIG. 3C is a partial schematic diagram of the bidirectional power converter of FIG. 3.
Figure 3D:
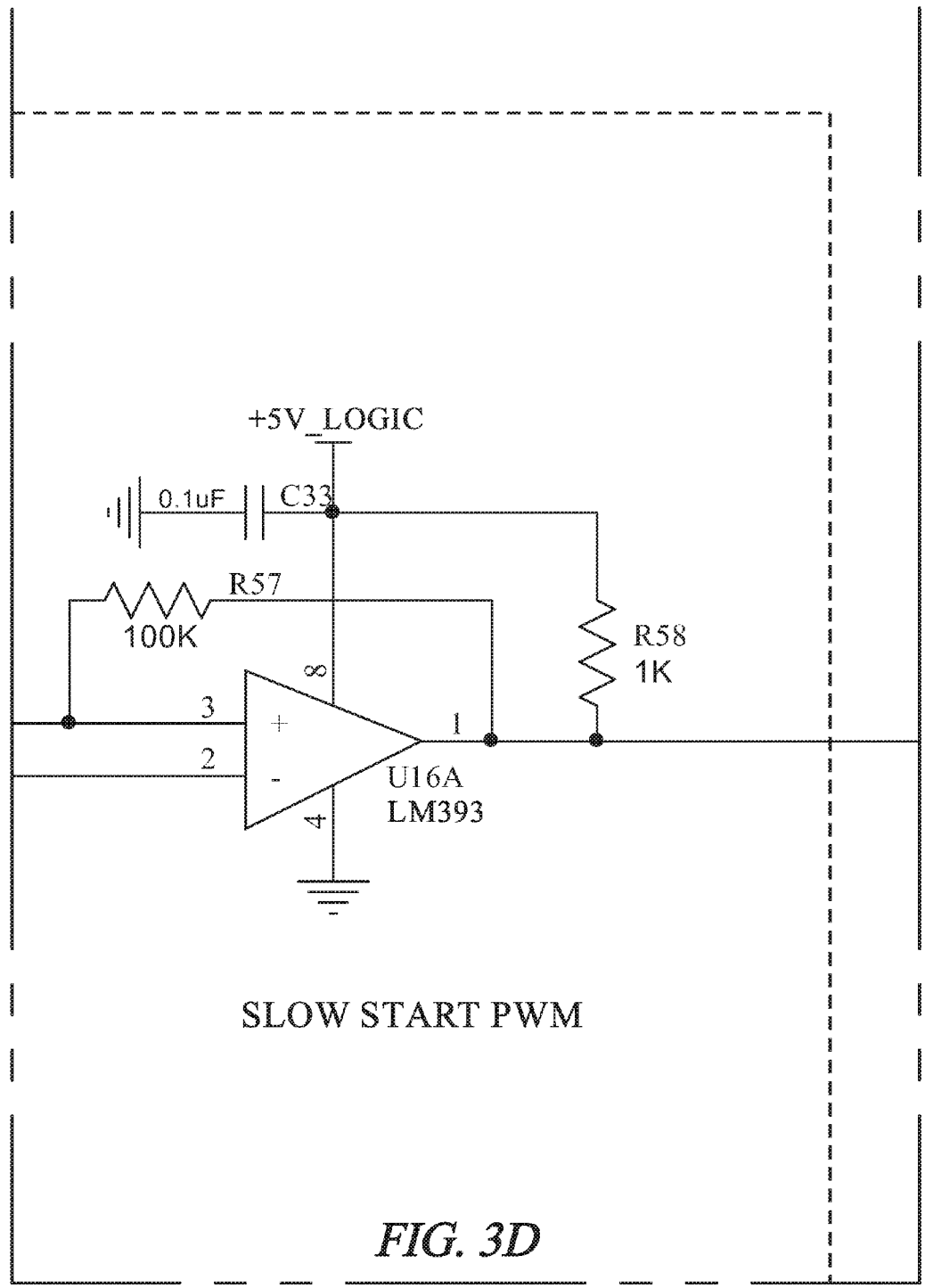
FIG. 3D is a partial schematic diagram of the bidirectional power converter of FIG. 3.
Figure 3E:
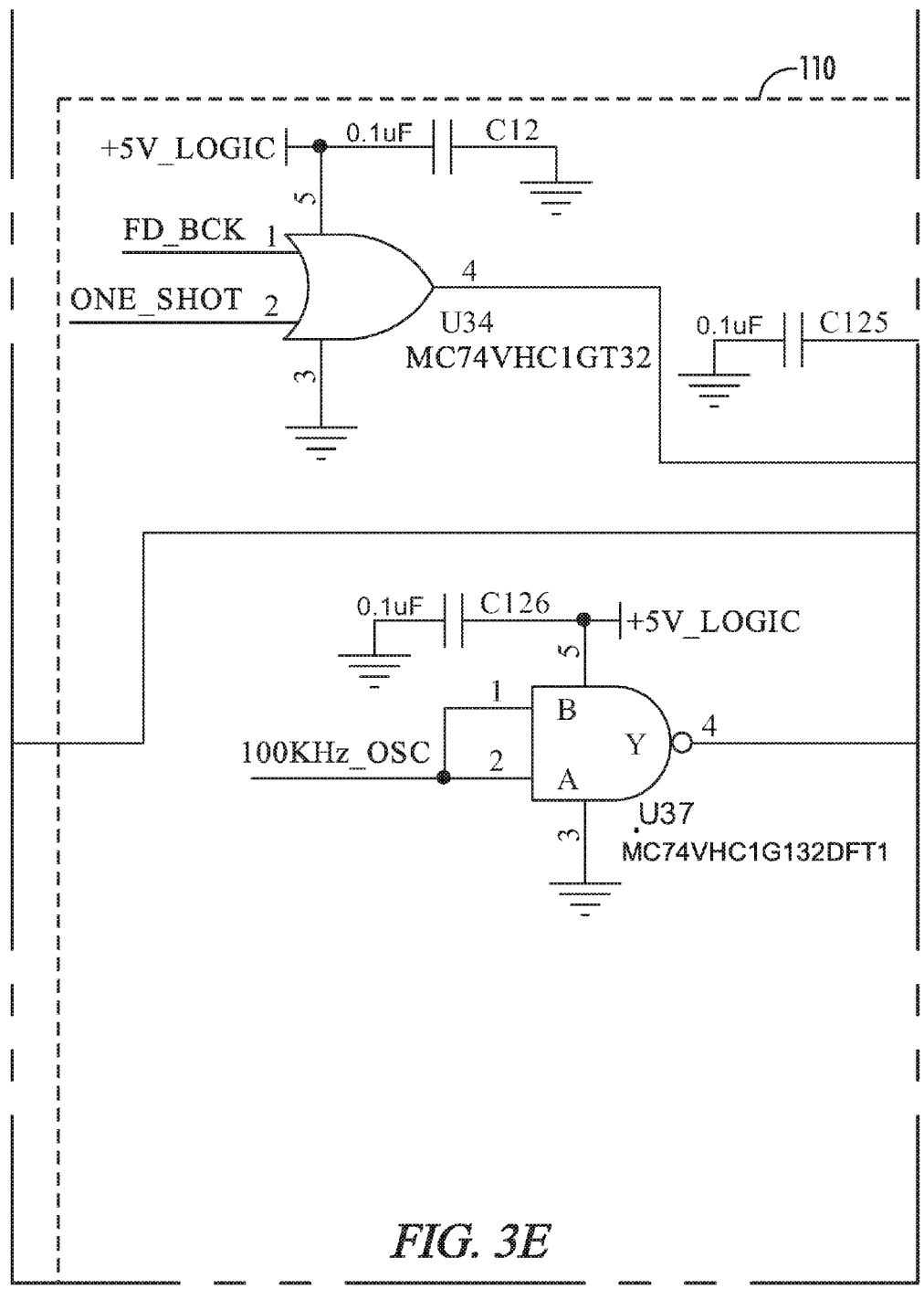
FIG. 3E is a partial schematic diagram of the bidirectional power converter of FIG. 3.
Figure 3F:
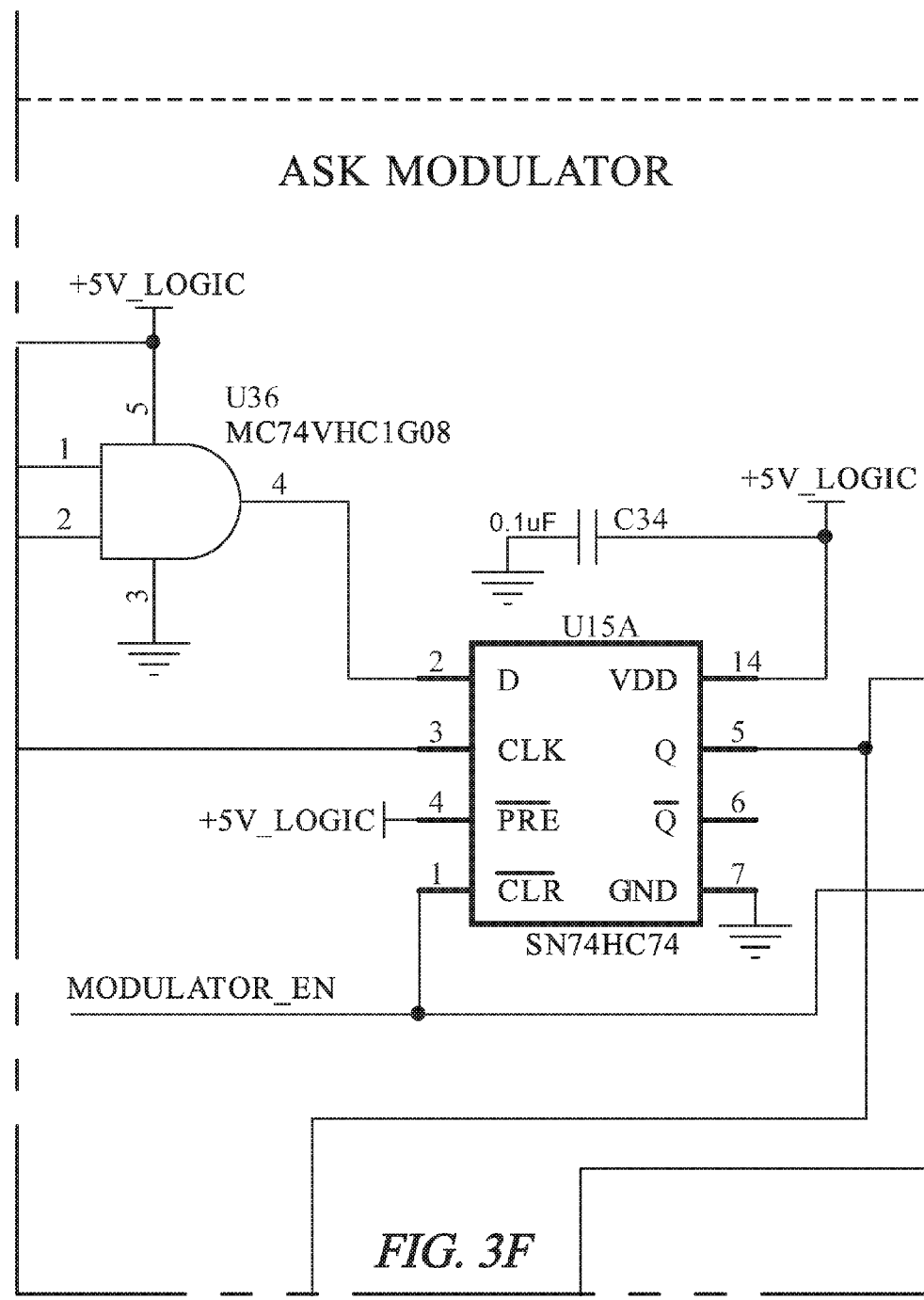
FIG. 3F is a partial schematic diagram of the bidirectional power converter of FIG. 3.
Figure 3G:
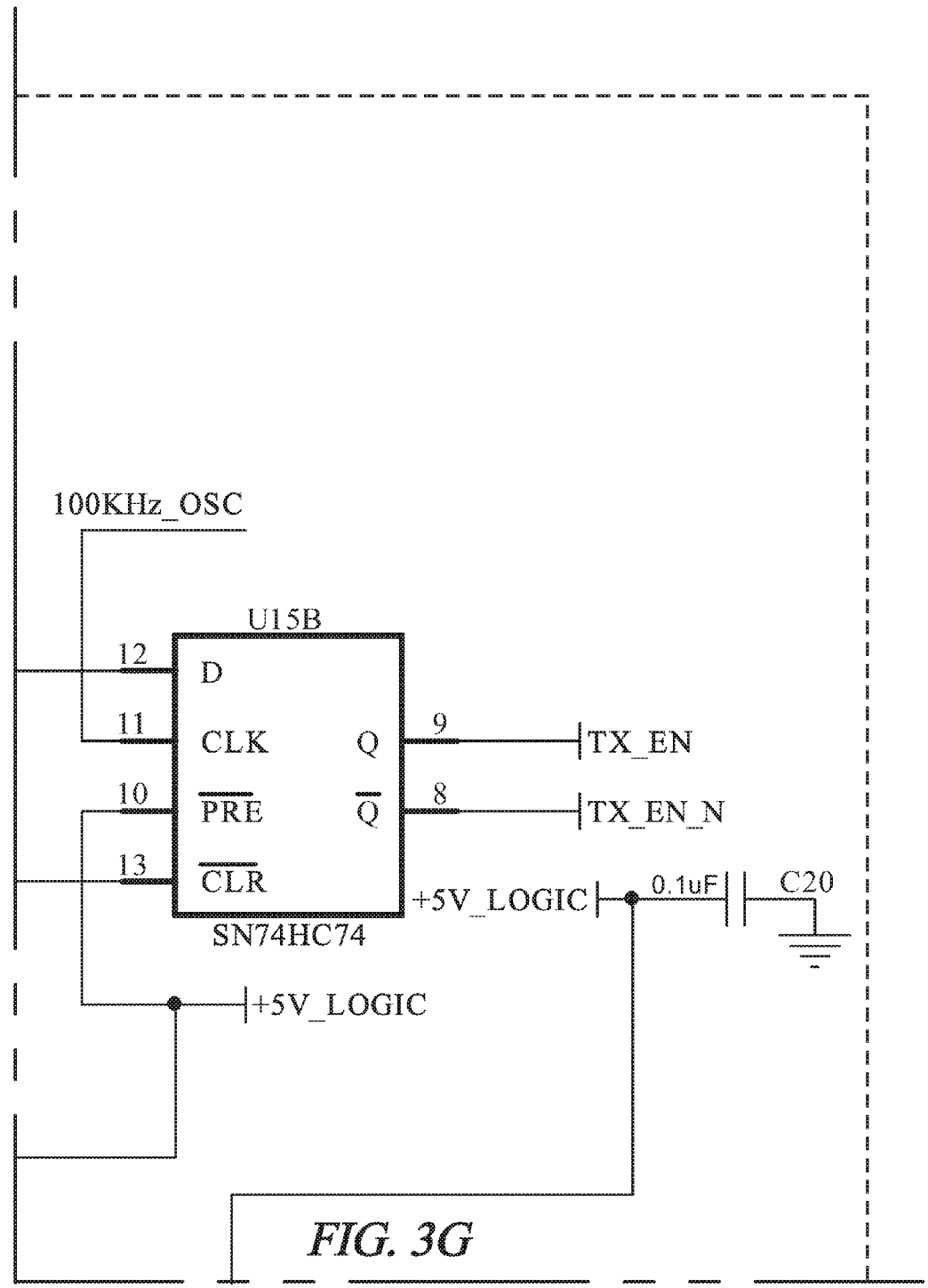
FIG. 3G is a partial schematic diagram of the bidirectional power converter of FIG. 3.
Figure 3H:
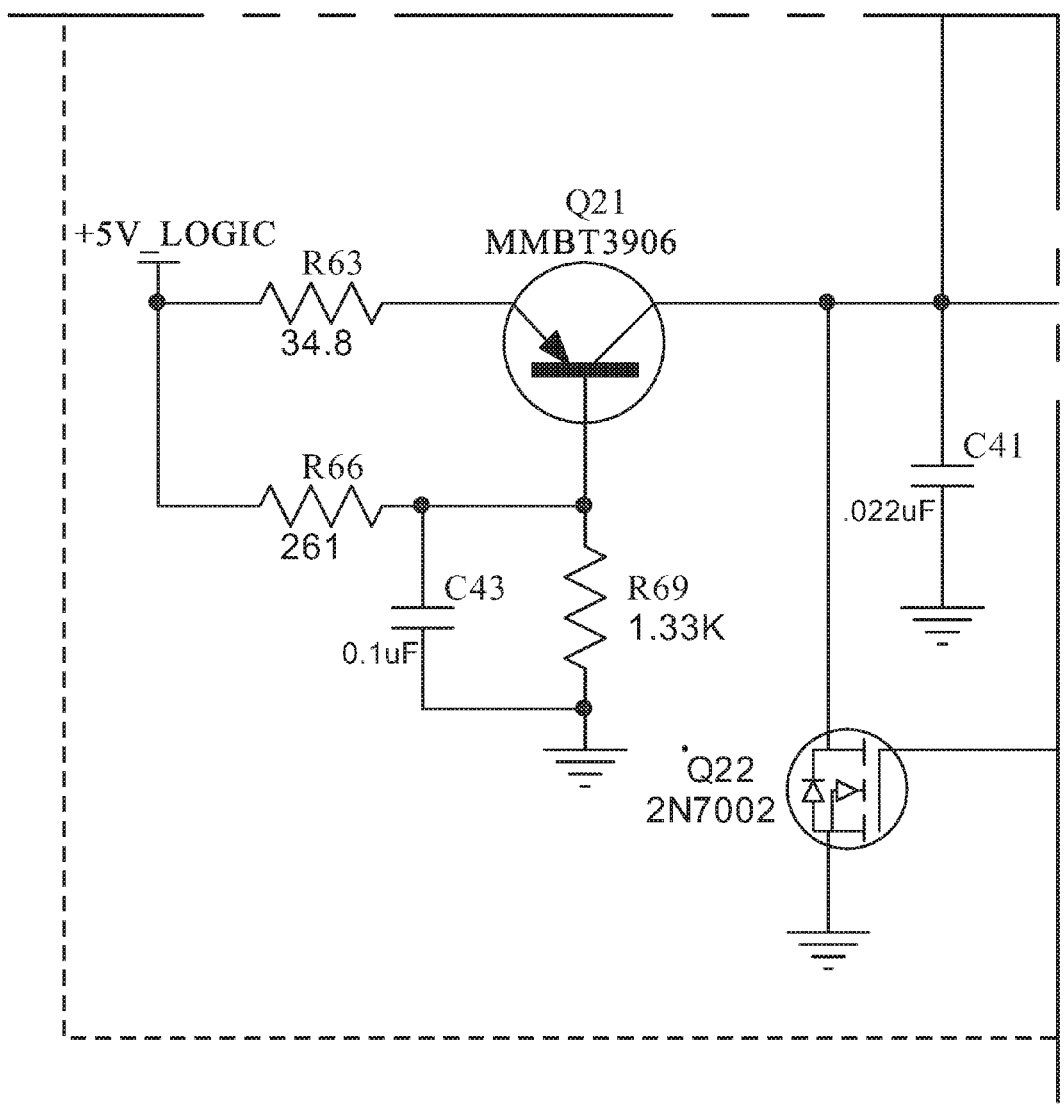
FIG. 3H is a partial schematic diagram of the bidirectional power converter of FIG. 3.
Figure 3I:
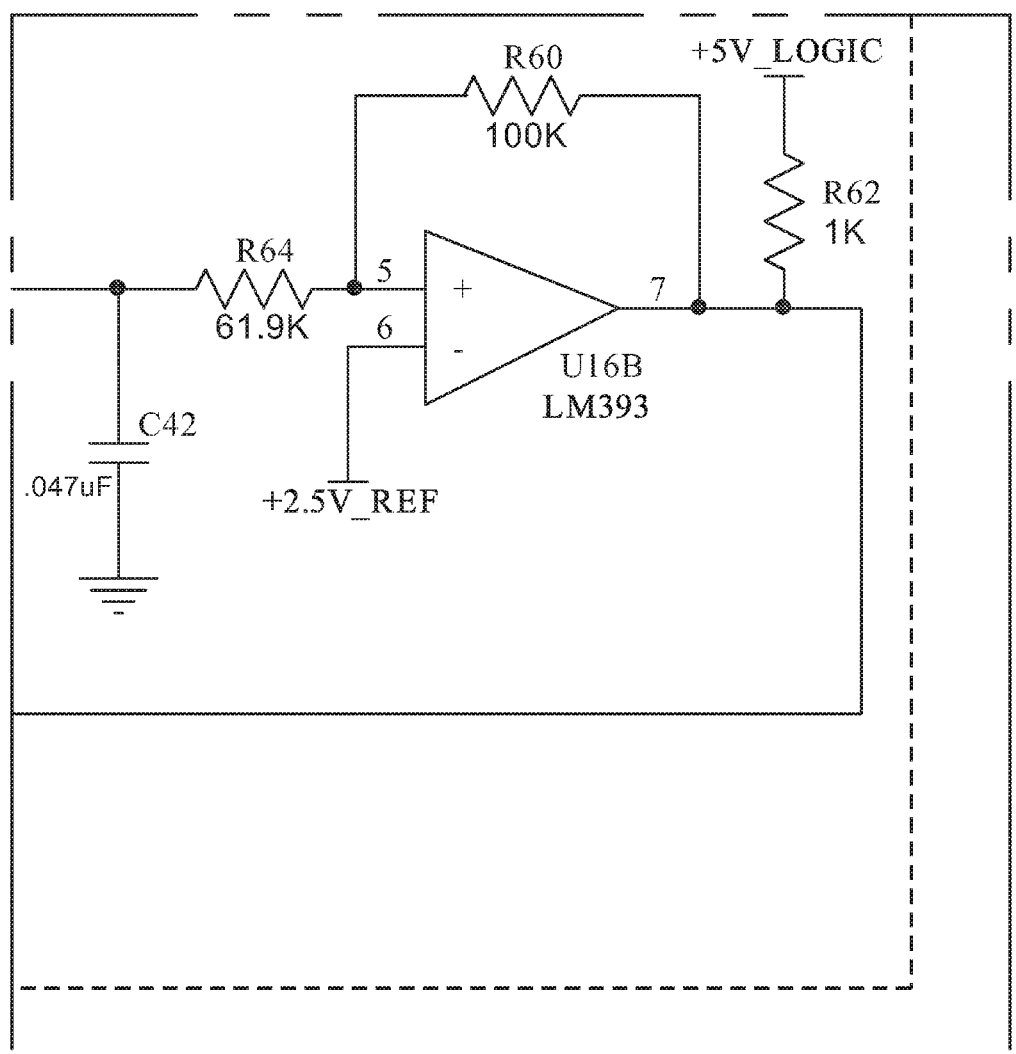
FIG. 3I is a partial schematic diagram of the bidirectional power converter of FIG. 3.
Figure 3J:
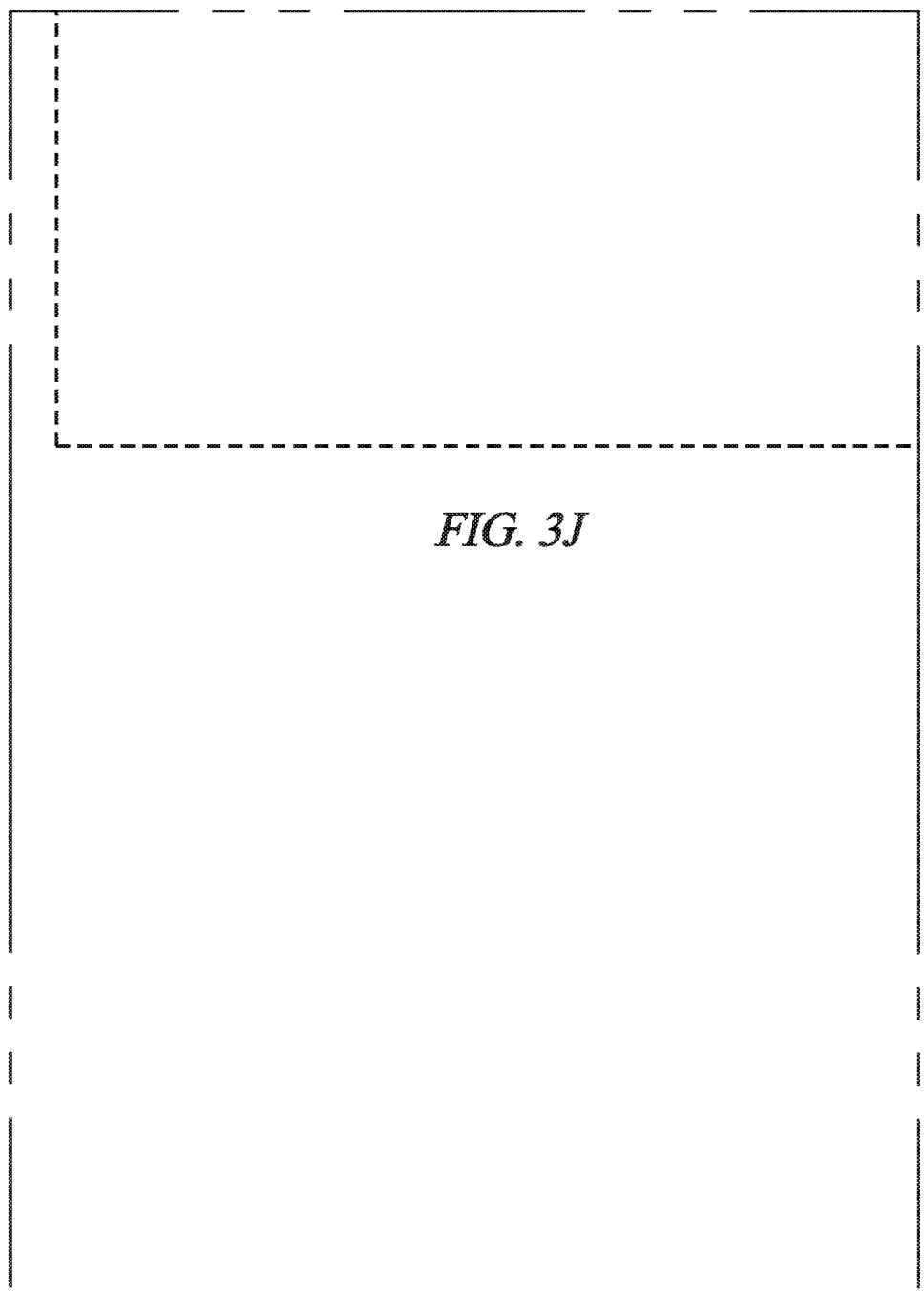
FIG. 3J is a partial schematic diagram of the bidirectional power converter of FIG. 3.
Figure 3K:
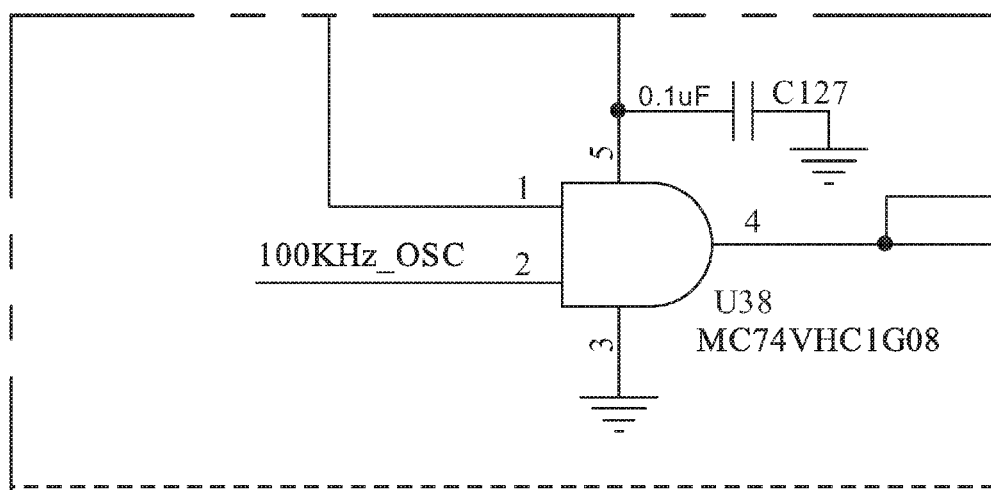
FIG. 3K is a partial schematic diagram of the bidirectional power converter of FIG. 3.
Figure 3L:
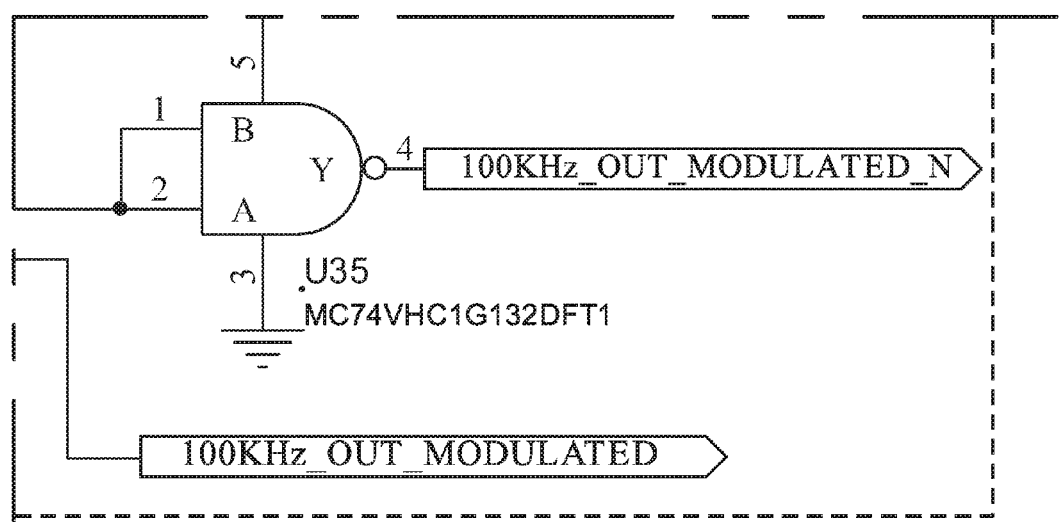
FIG. 3L is a partial schematic diagram of the bidirectional power converter of FIG. 3.
Figure 3M:
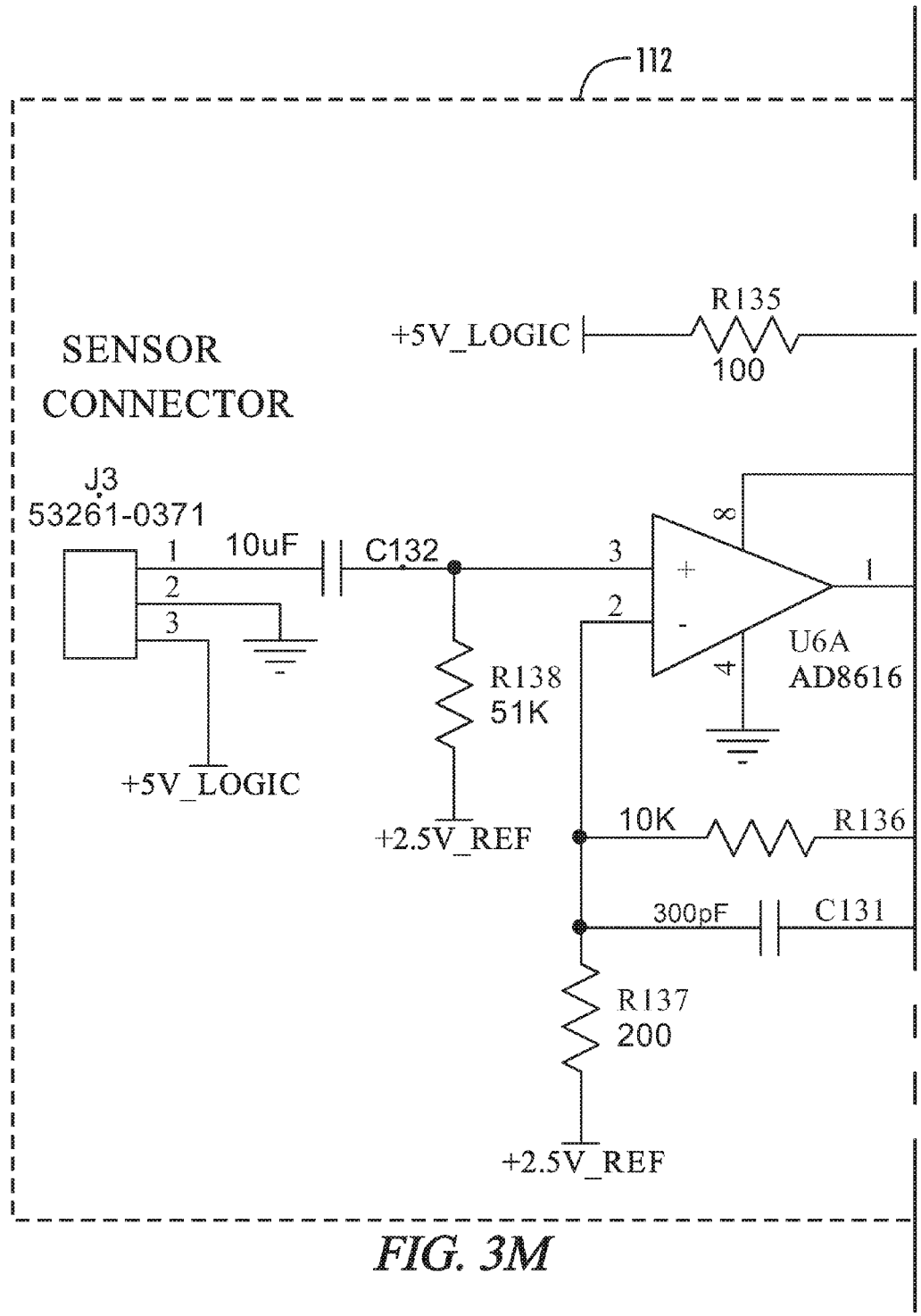
FIG. 3M is a partial schematic diagram of the bidirectional power converter of FIG. 3.
Figure 3N:
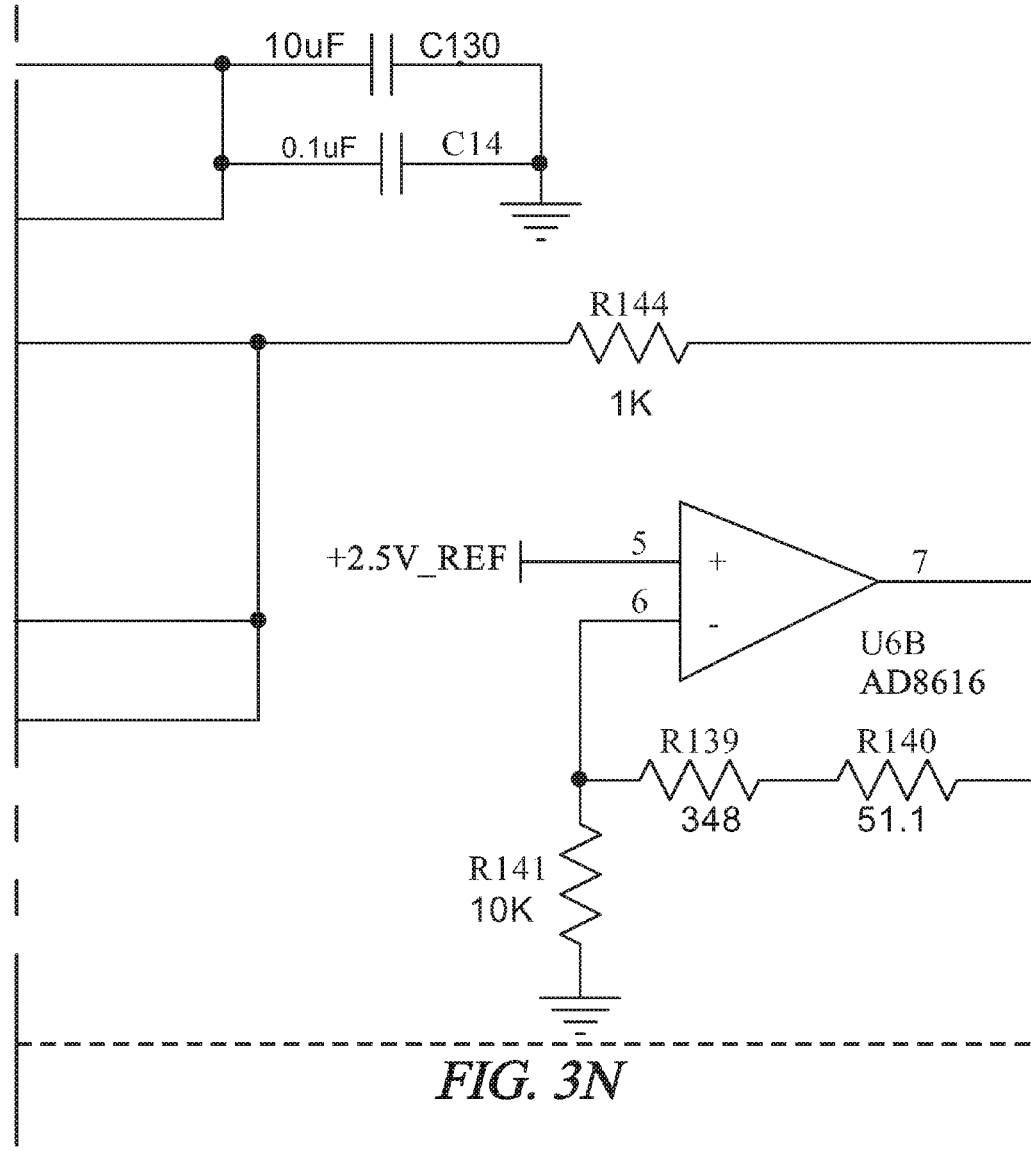
FIG. 3N is a partial schematic diagram of the bidirectional power converter of FIG. 3.
Figure 3O:
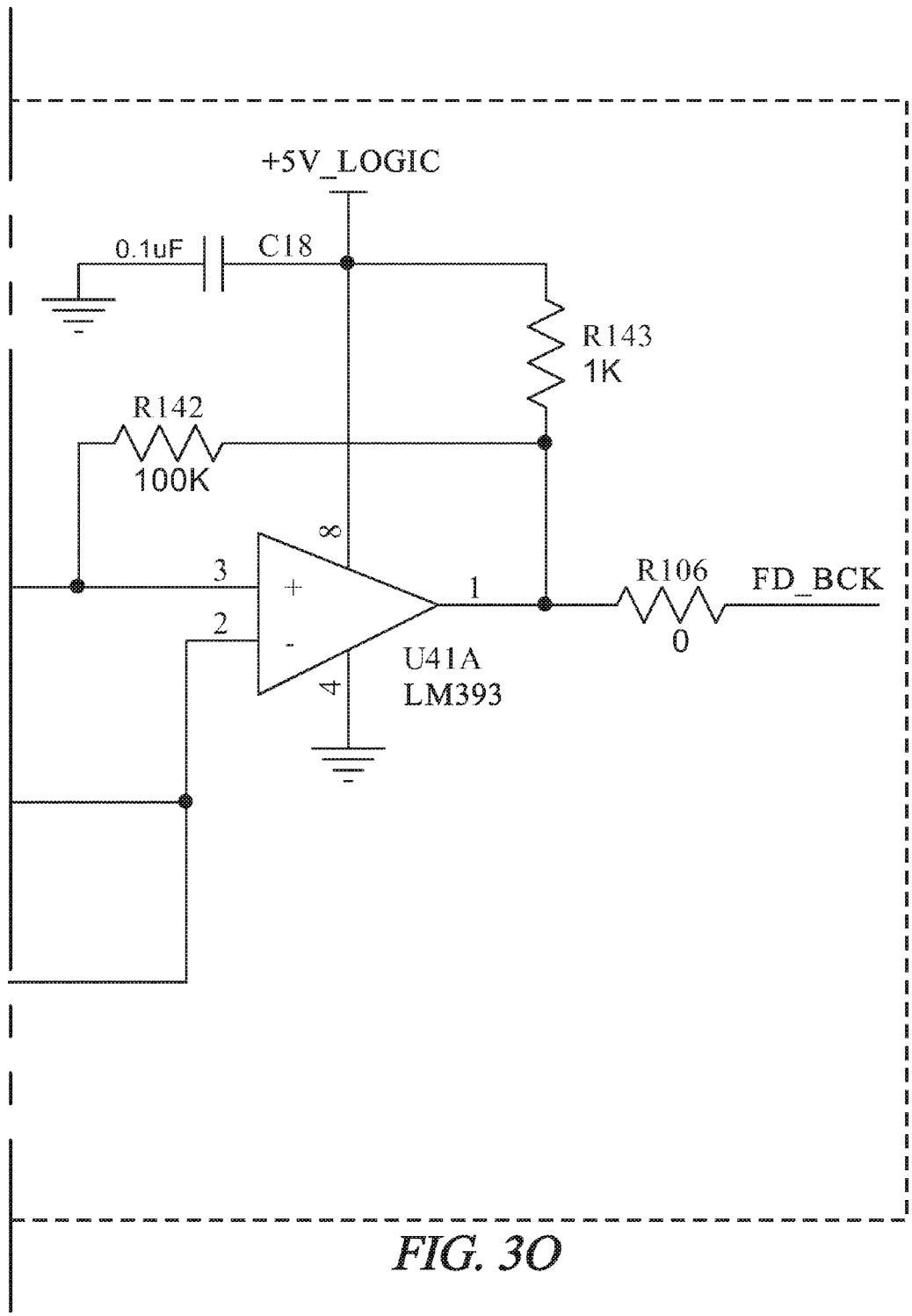
FIG. 3O is a partial schematic diagram of the bidirectional power converter of FIG. 3.
Figure 3P:
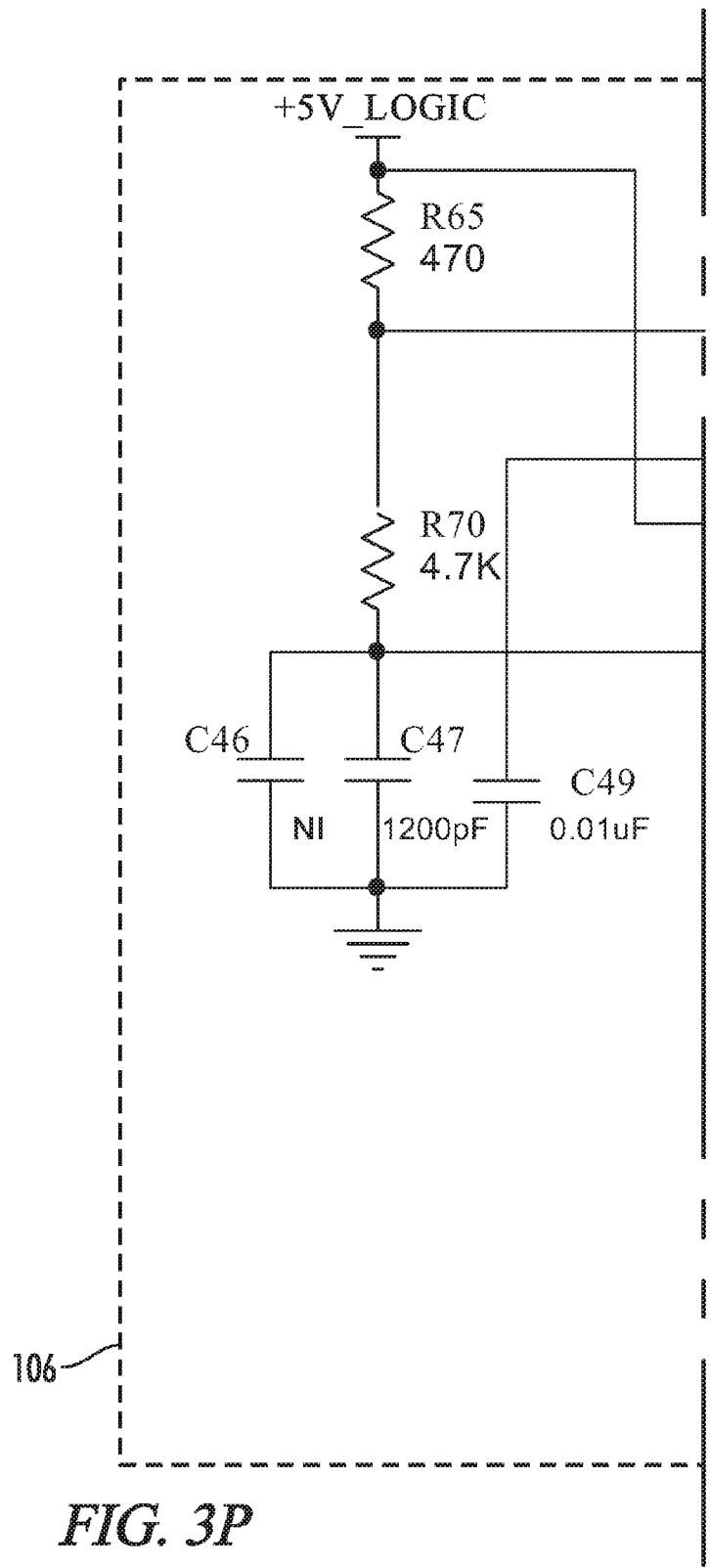
FIG. 3P is a partial schematic diagram of the bidirectional power converter of FIG. 3.
Figure 3Q:
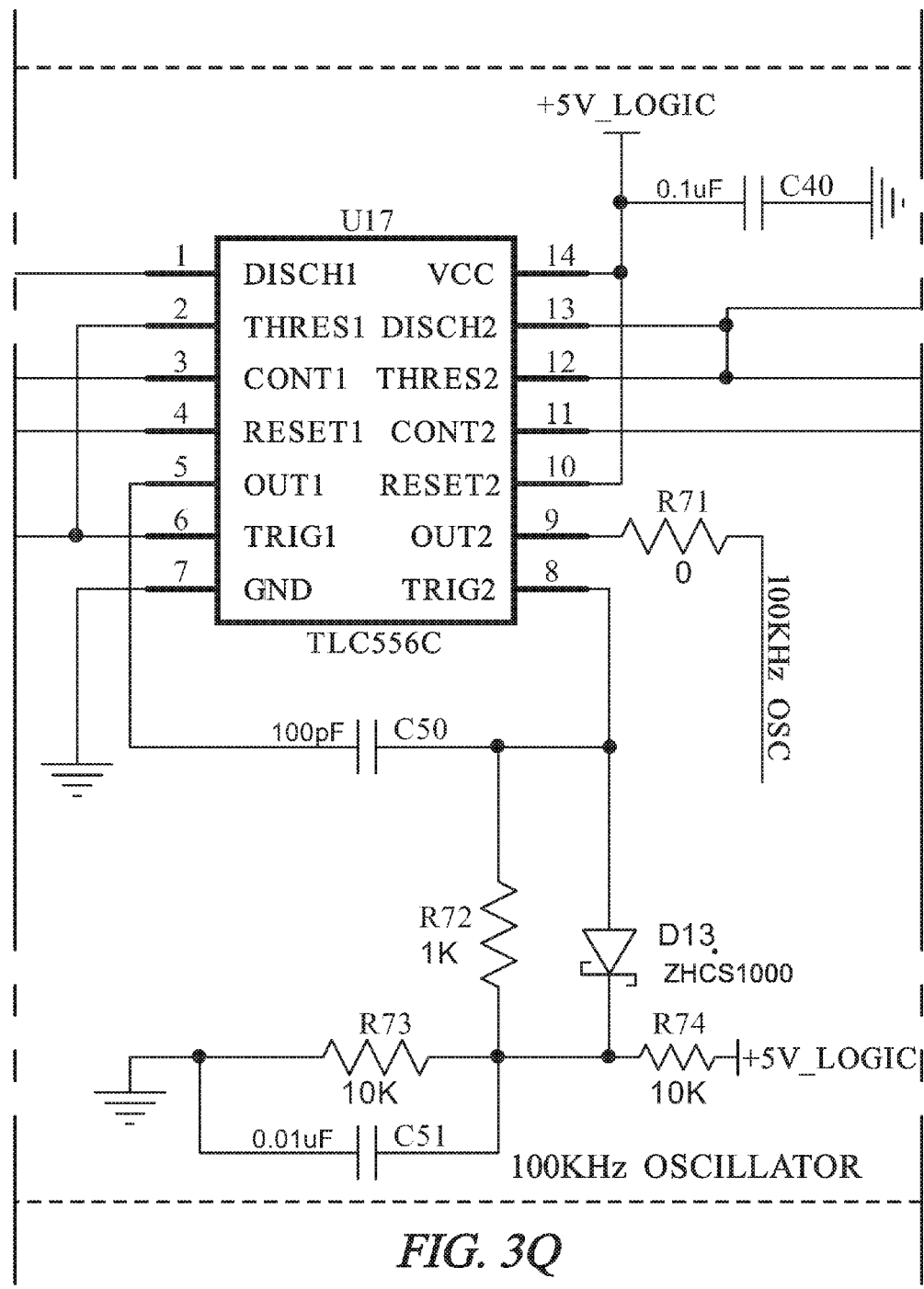
FIG. 3Q is a partial schematic diagram of the bidirectional power converter of FIG. 3.
Figure 3R:
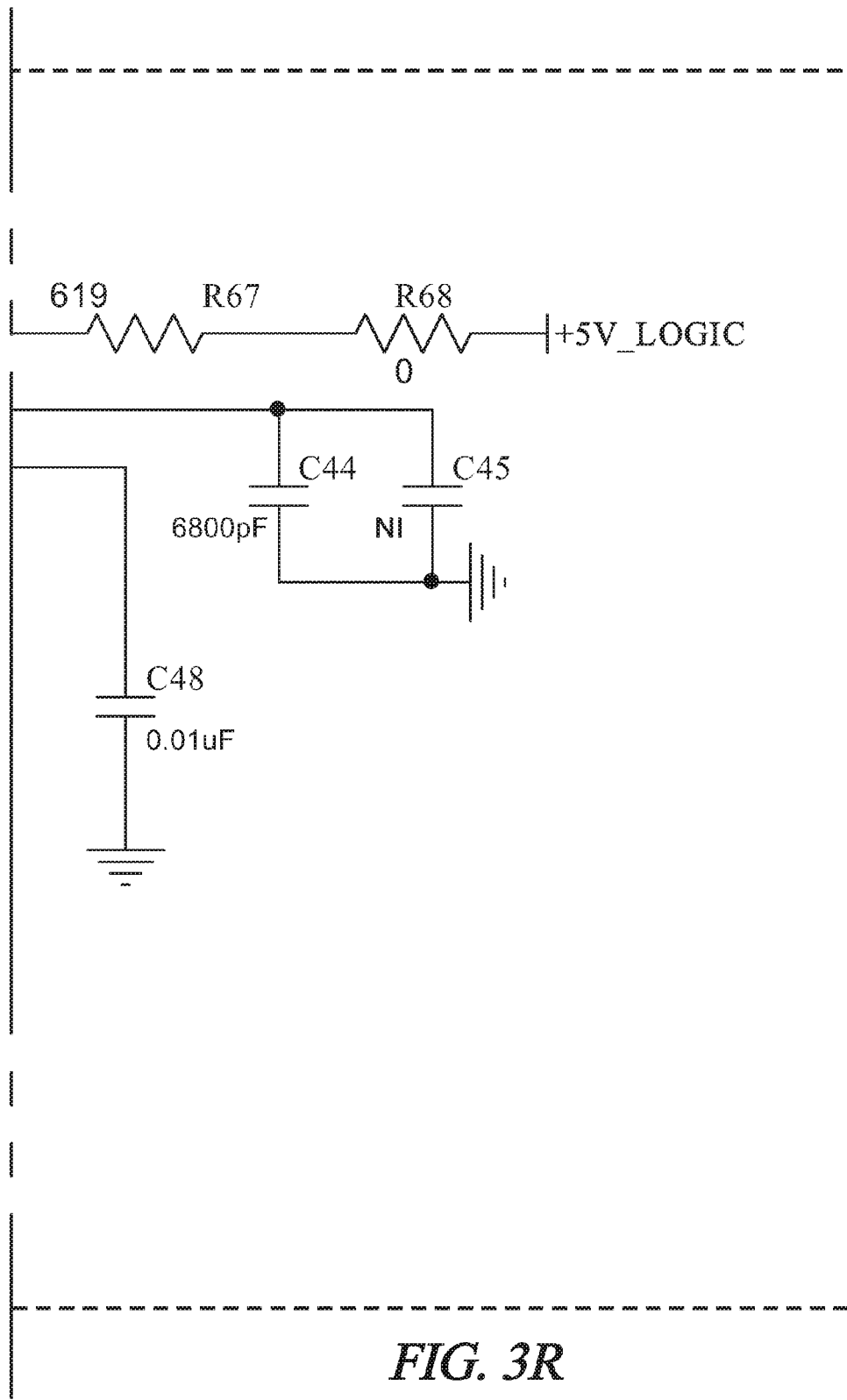
FIG. 3R is a partial schematic diagram of the bidirectional power converter of FIG. 3.
Figure 3S:
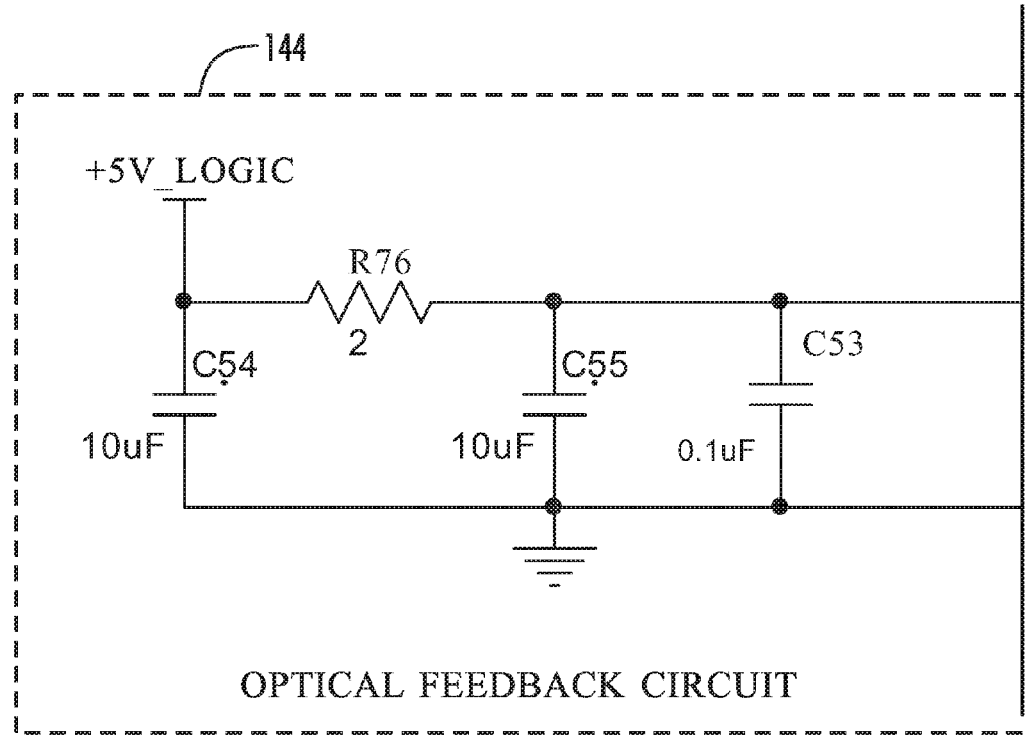
FIG. 3S is a partial schematic diagram of the bidirectional power converter of FIG. 3.
Figure 3T:
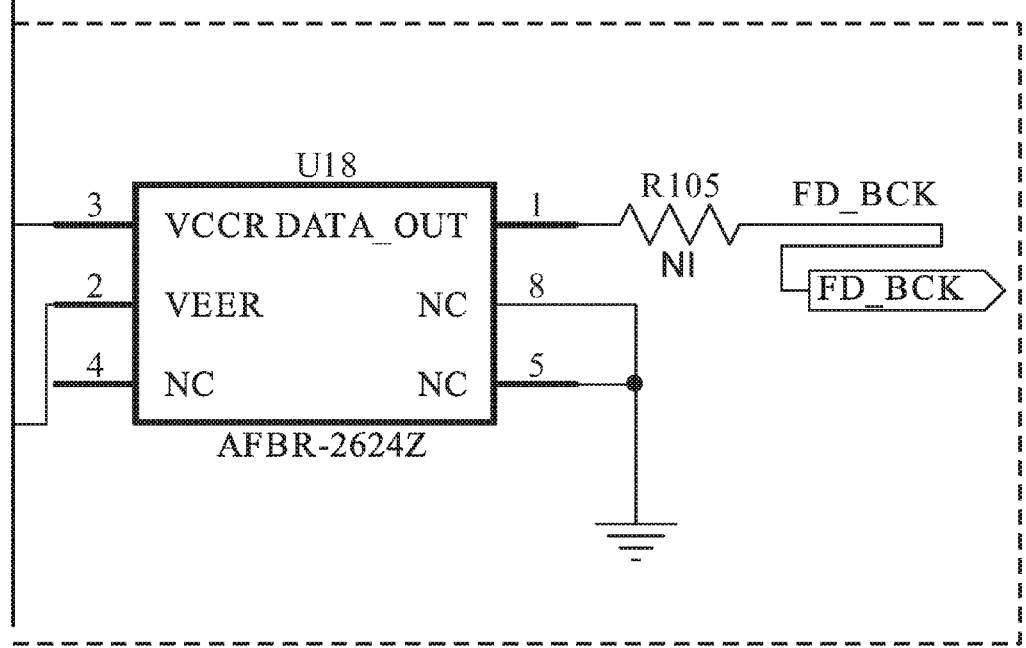
FIG. 3T is a partial schematic diagram of the bidirectional power converter of FIG. 3.
Figure 3U:
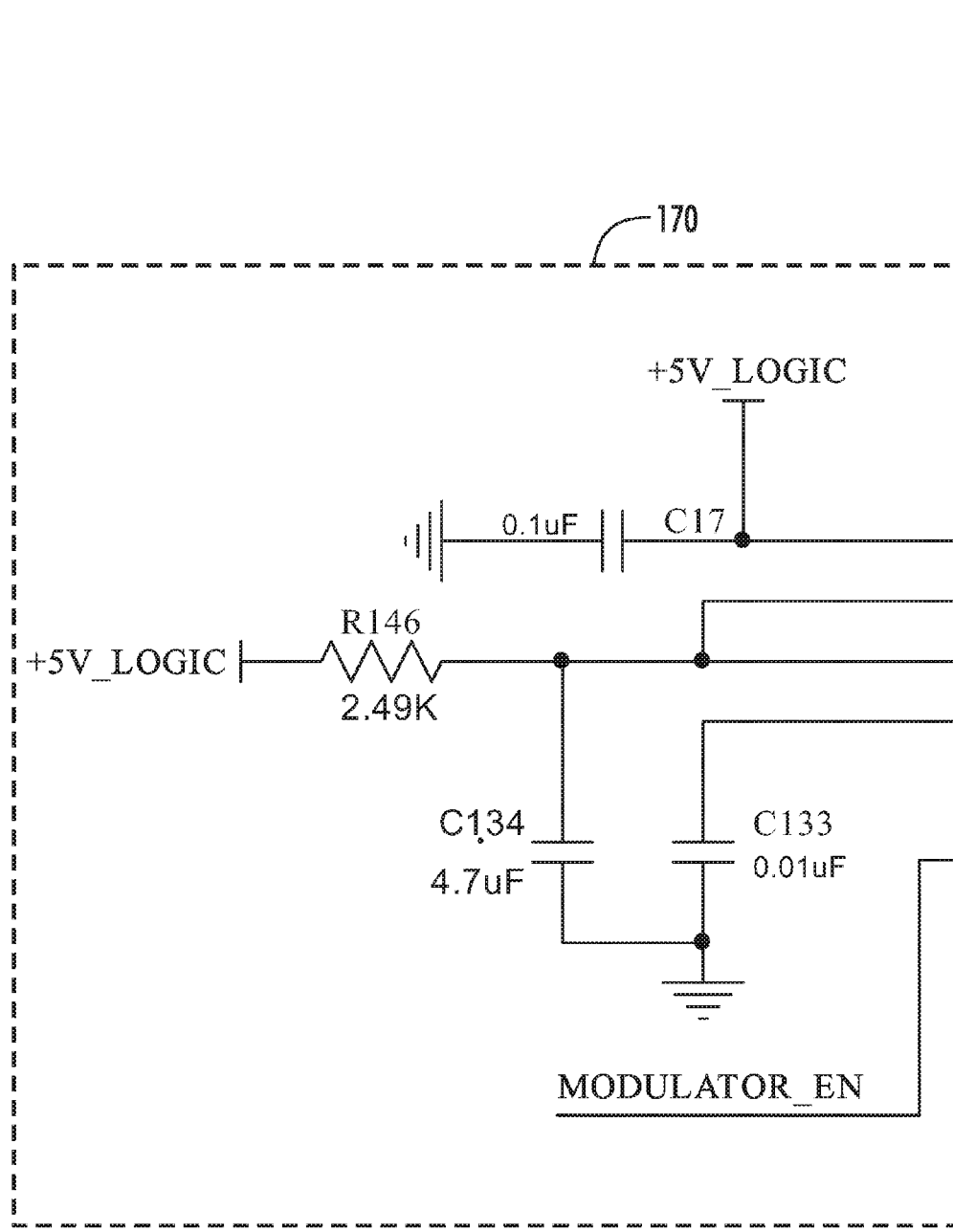
FIG. 3U is a partial schematic diagram of the bidirectional power converter of FIG. 3.
Figure 3V:
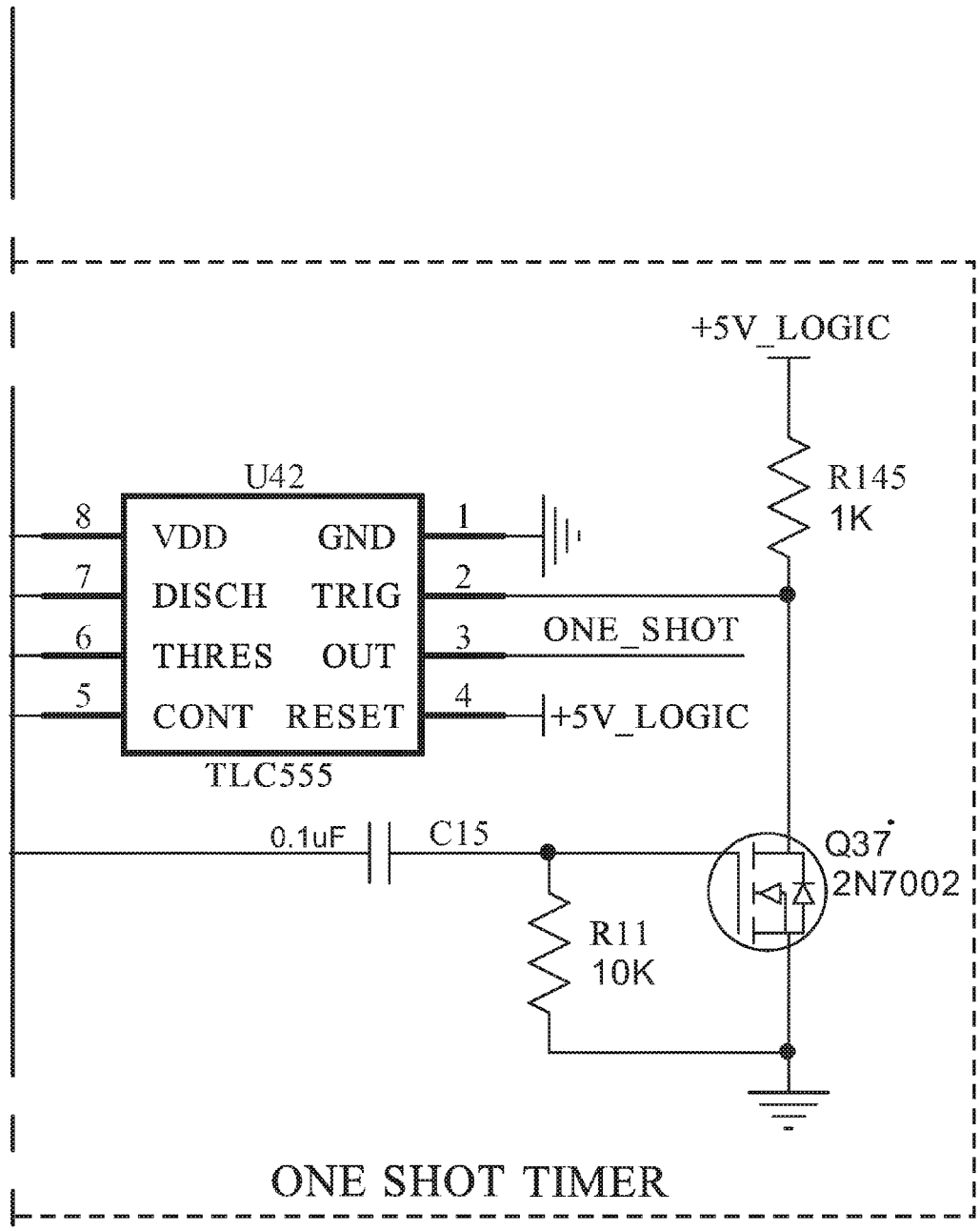
FIG. 3V is a partial schematic diagram of the bidirectional power converter of FIG. 3.
Figure 4:
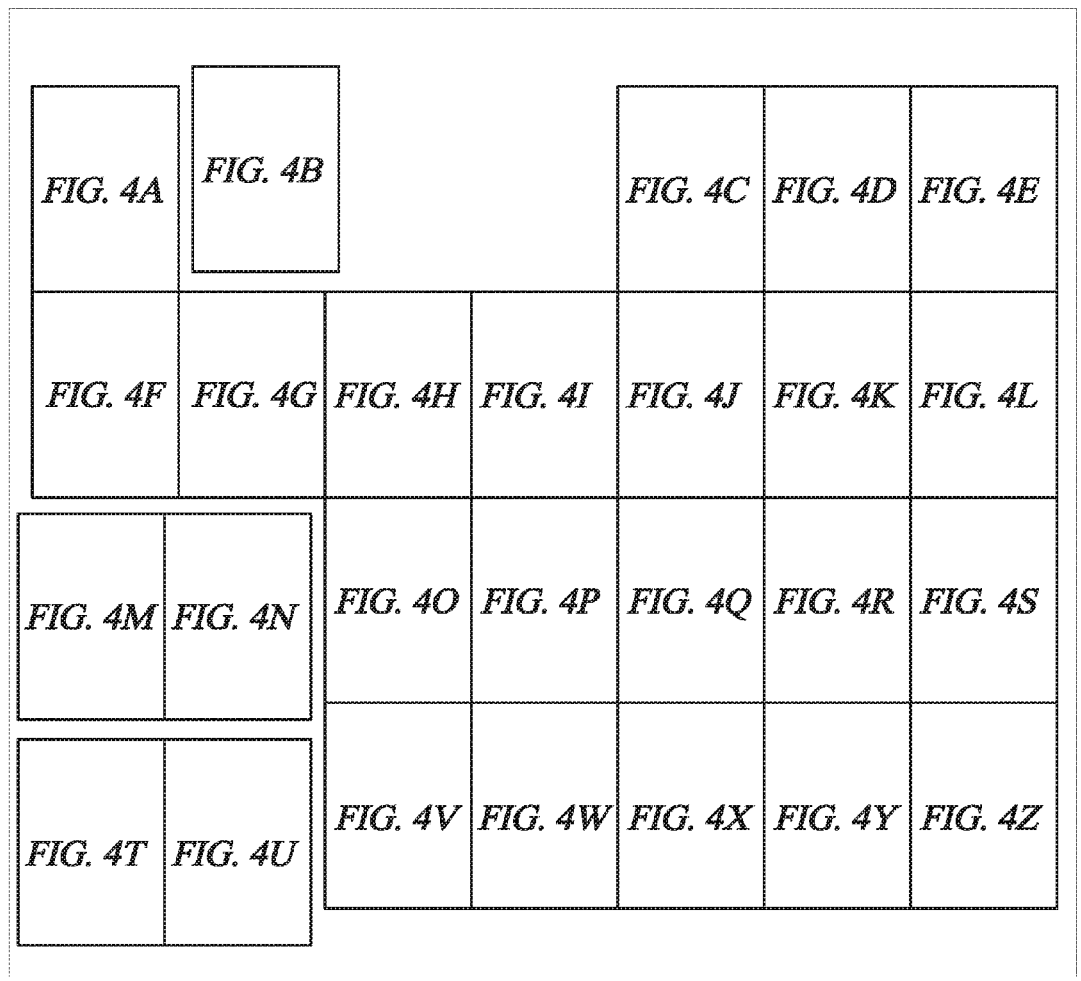
FIG. 4 is a block diagram of how FIGS. 4A to 4Z fit together to form a partial schematic diagram of the bidirectional power converter of FIGS. 1, 2, and 3.
Figure 4A:
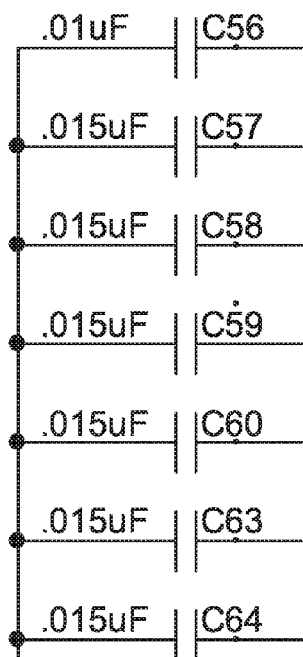
FIG. 4A is a partial schematic diagram of the bidirectional power converter of FIG. 4.
Figure 4B:
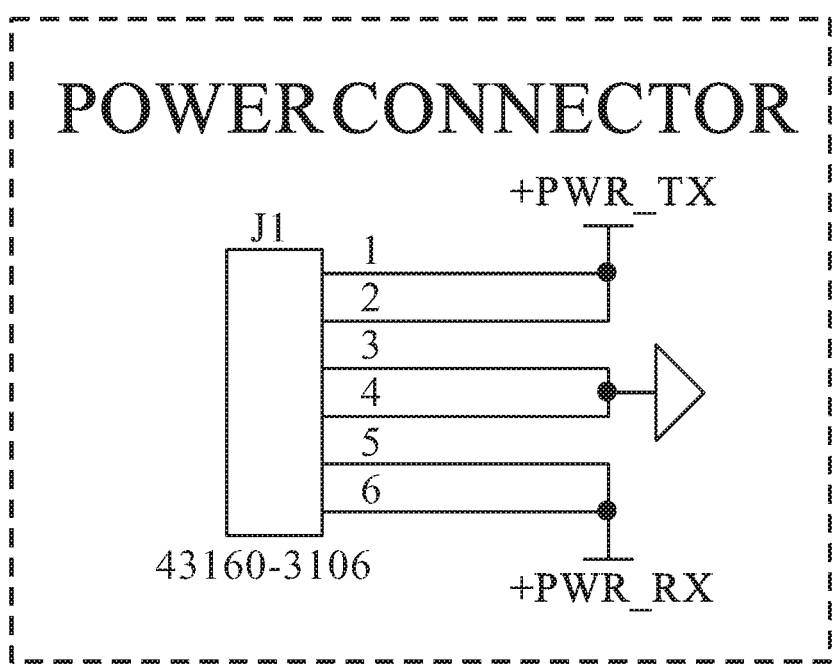
FIG. 4B is a partial schematic diagram of the bidirectional power converter of FIG. 4.
Figure 4C:
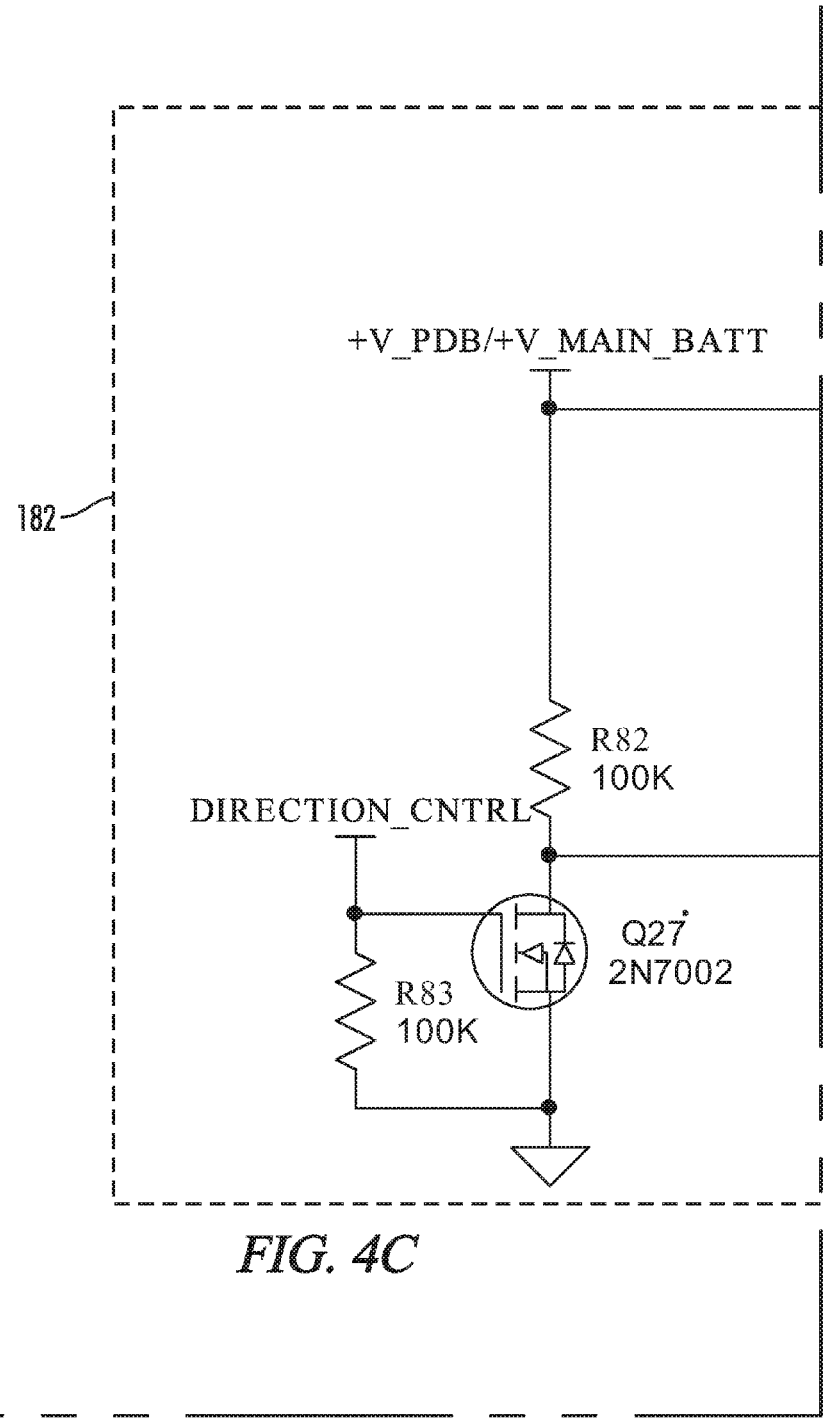
FIG. 4C is a partial schematic diagram of the bidirectional power converter of FIG. 4.
Figure 4D:
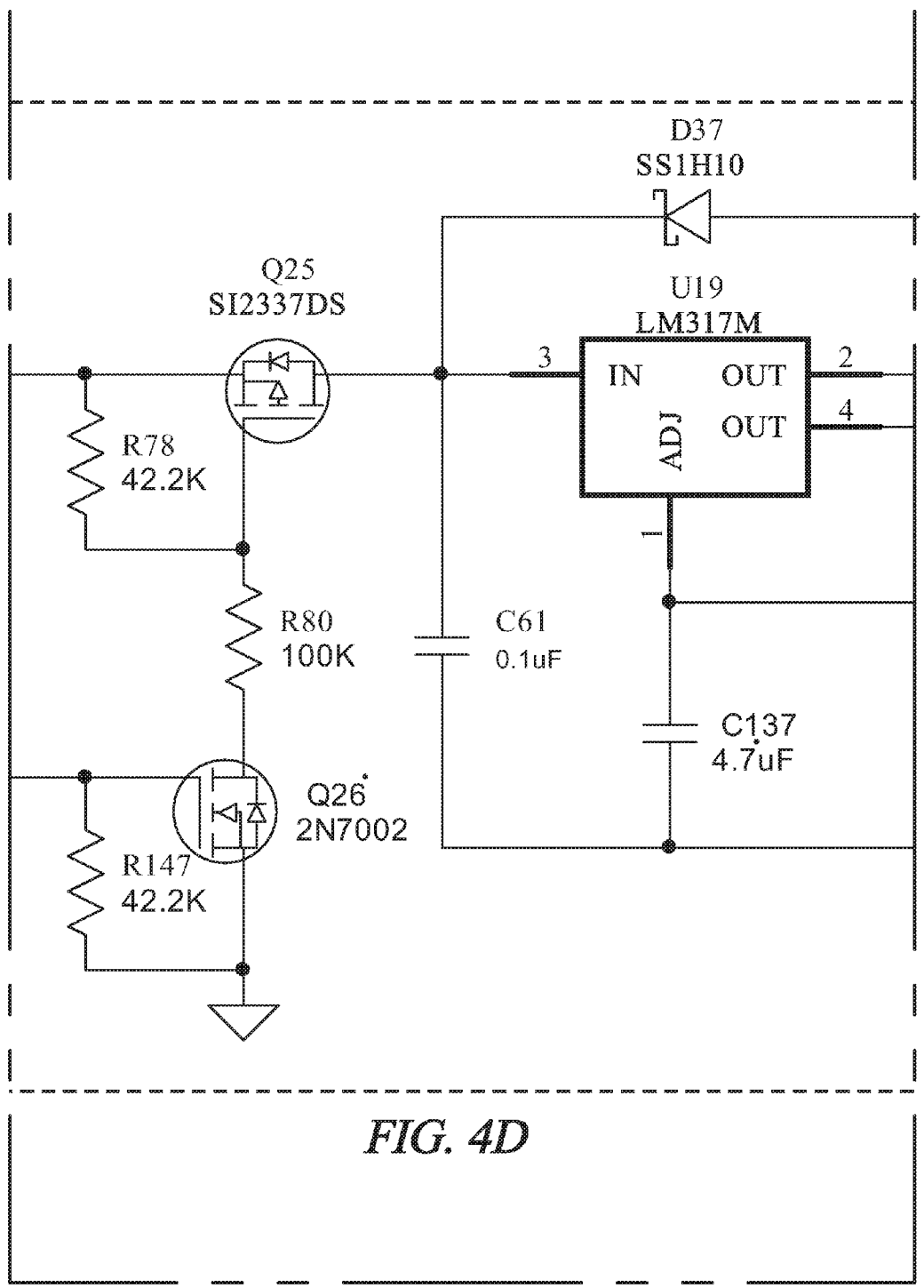
FIG. 4D is a partial schematic diagram of the bidirectional power converter of FIG. 4.
Figure 4E:
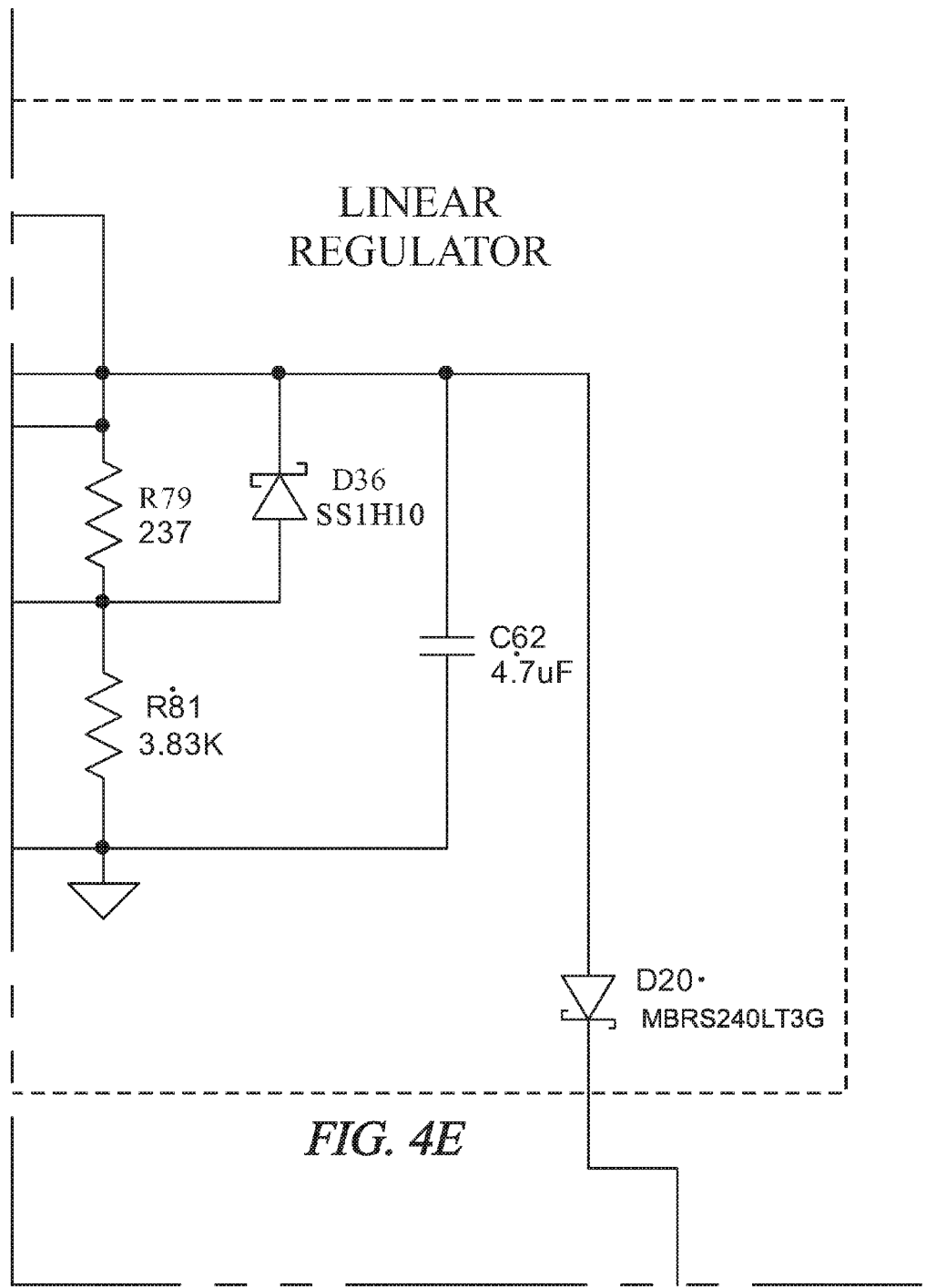
FIG. 4E is a partial schematic diagram of the bidirectional power converter of FIG. 4.
Figure 4F:
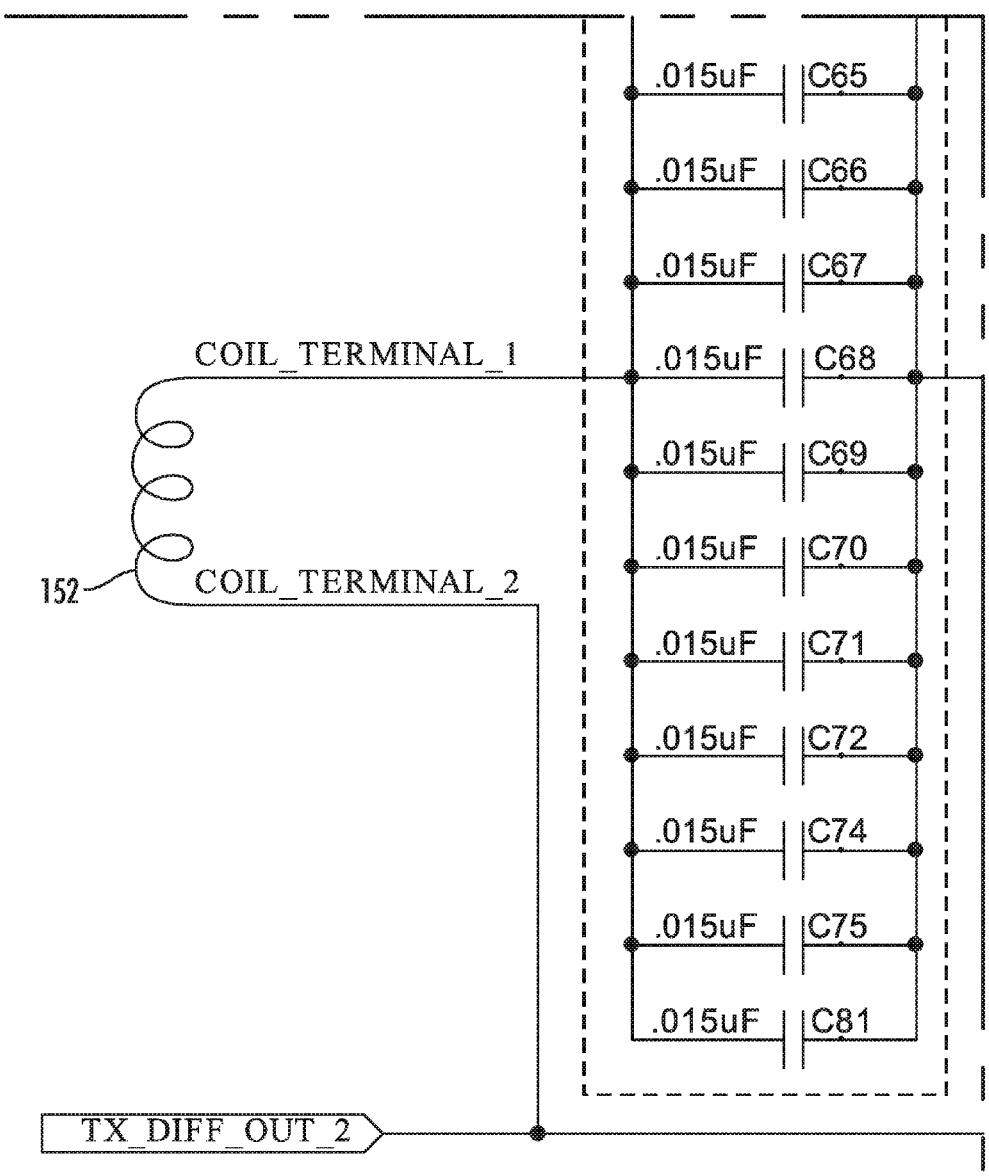
FIG. 4F is a partial schematic diagram of the bidirectional power converter of FIG. 4.
Figure 4G:
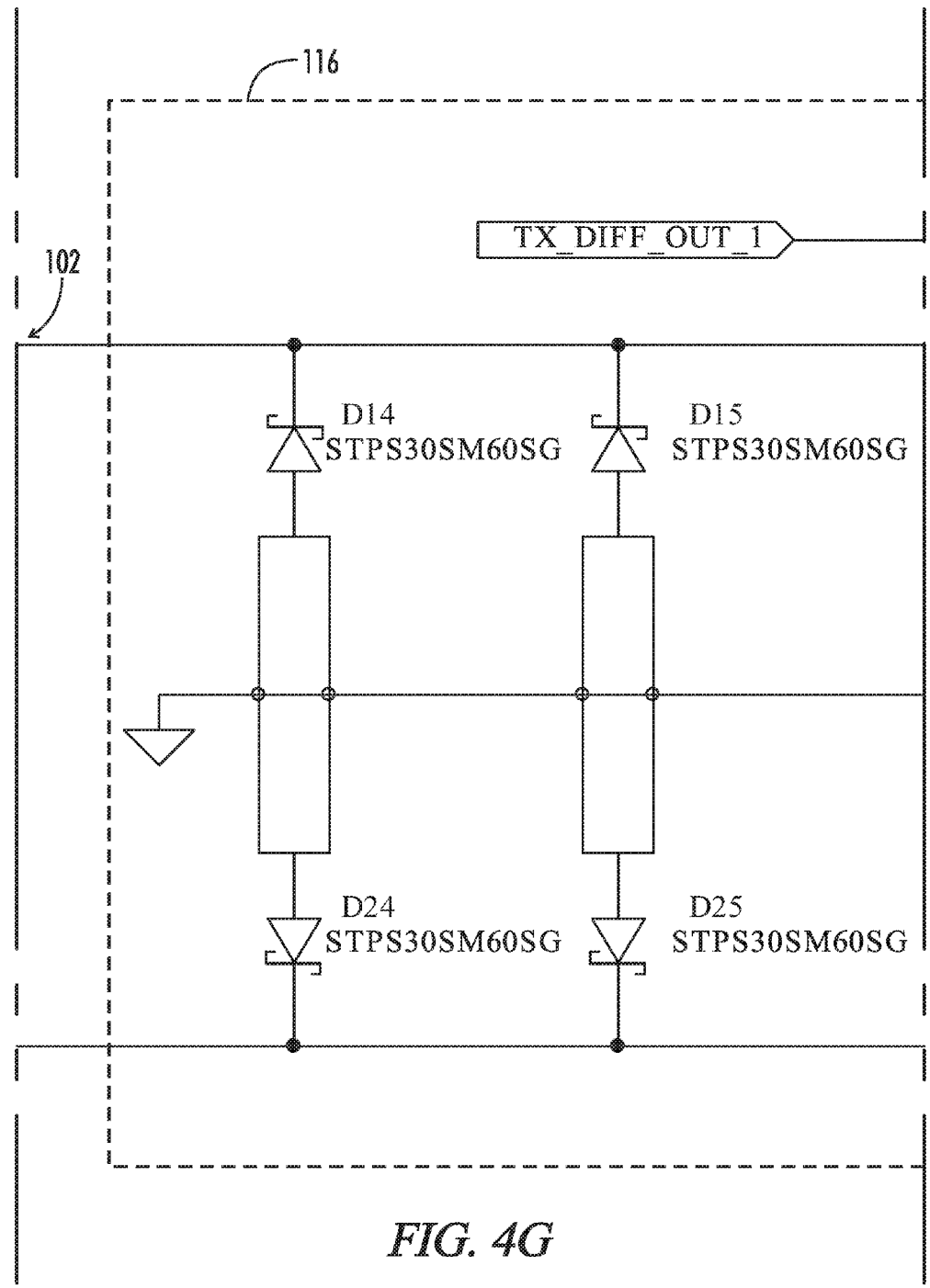
FIG. 4G is a partial schematic diagram of the bidirectional power converter of FIG. 4.
Figure 4H:
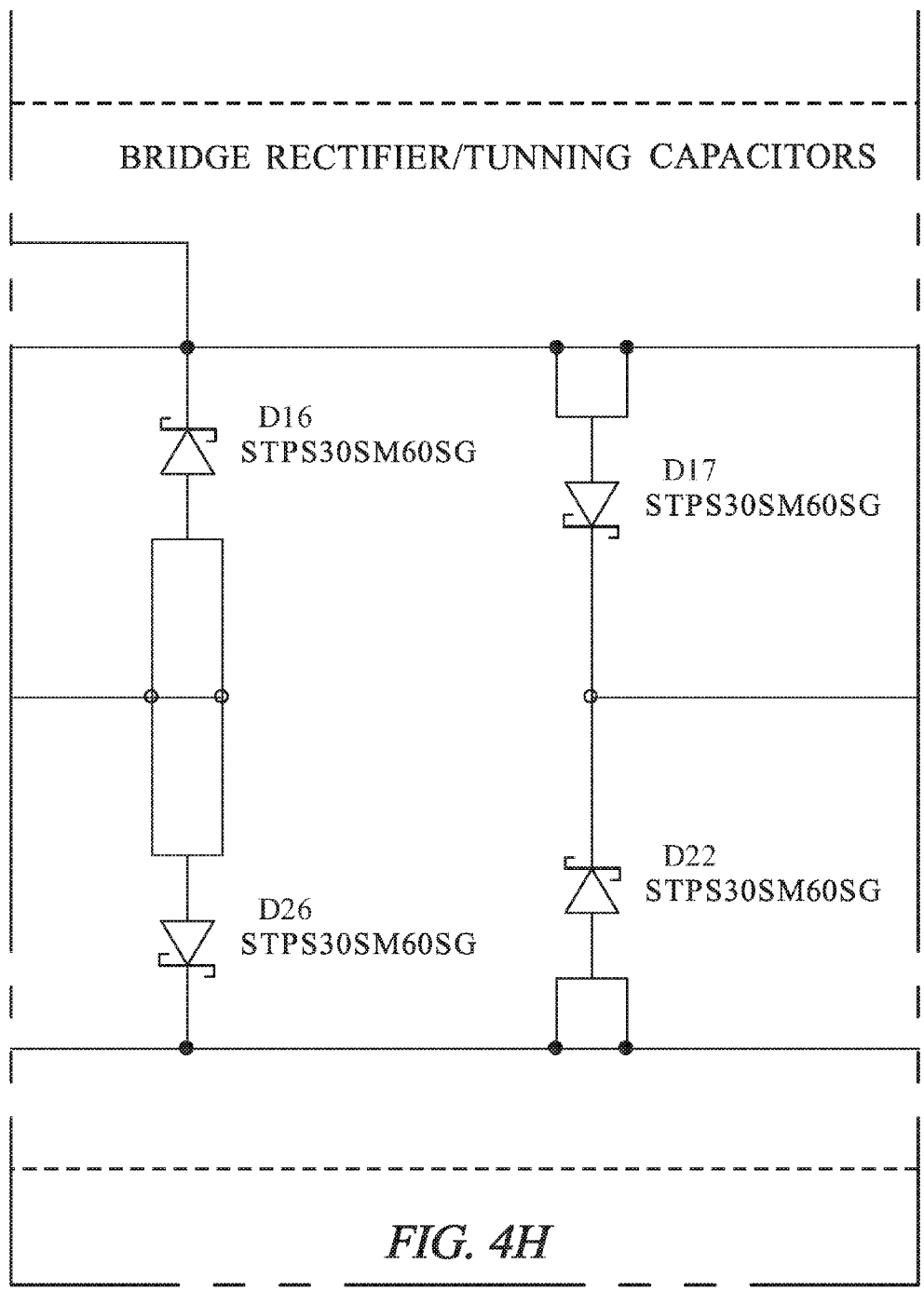
FIG. 4H is a partial schematic diagram of the bidirectional power converter of FIG. 4.
Figure 4I:
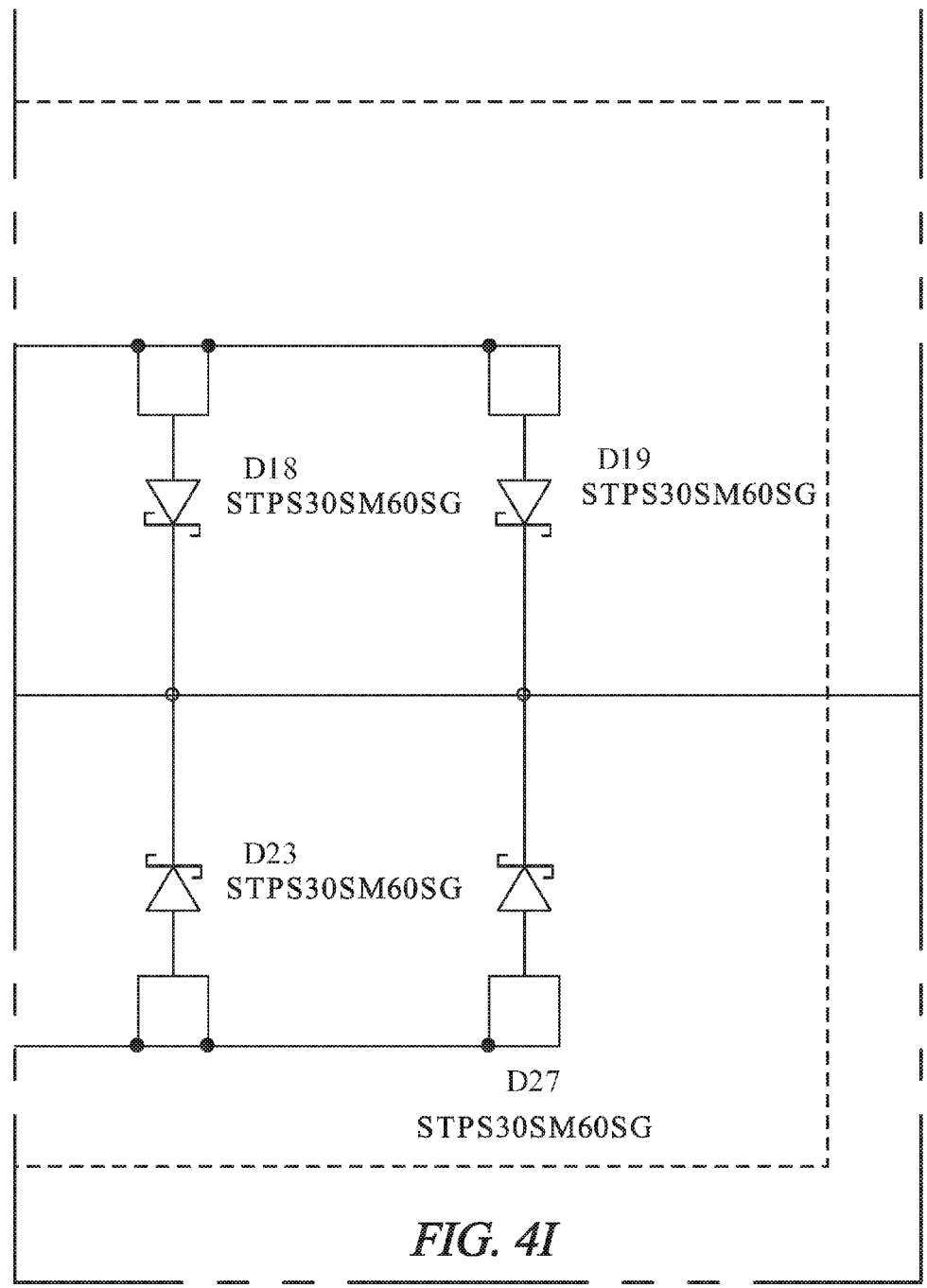
FIG. 4I is a partial schematic diagram of the bidirectional power converter of FIG. 4.
Figure 4J:
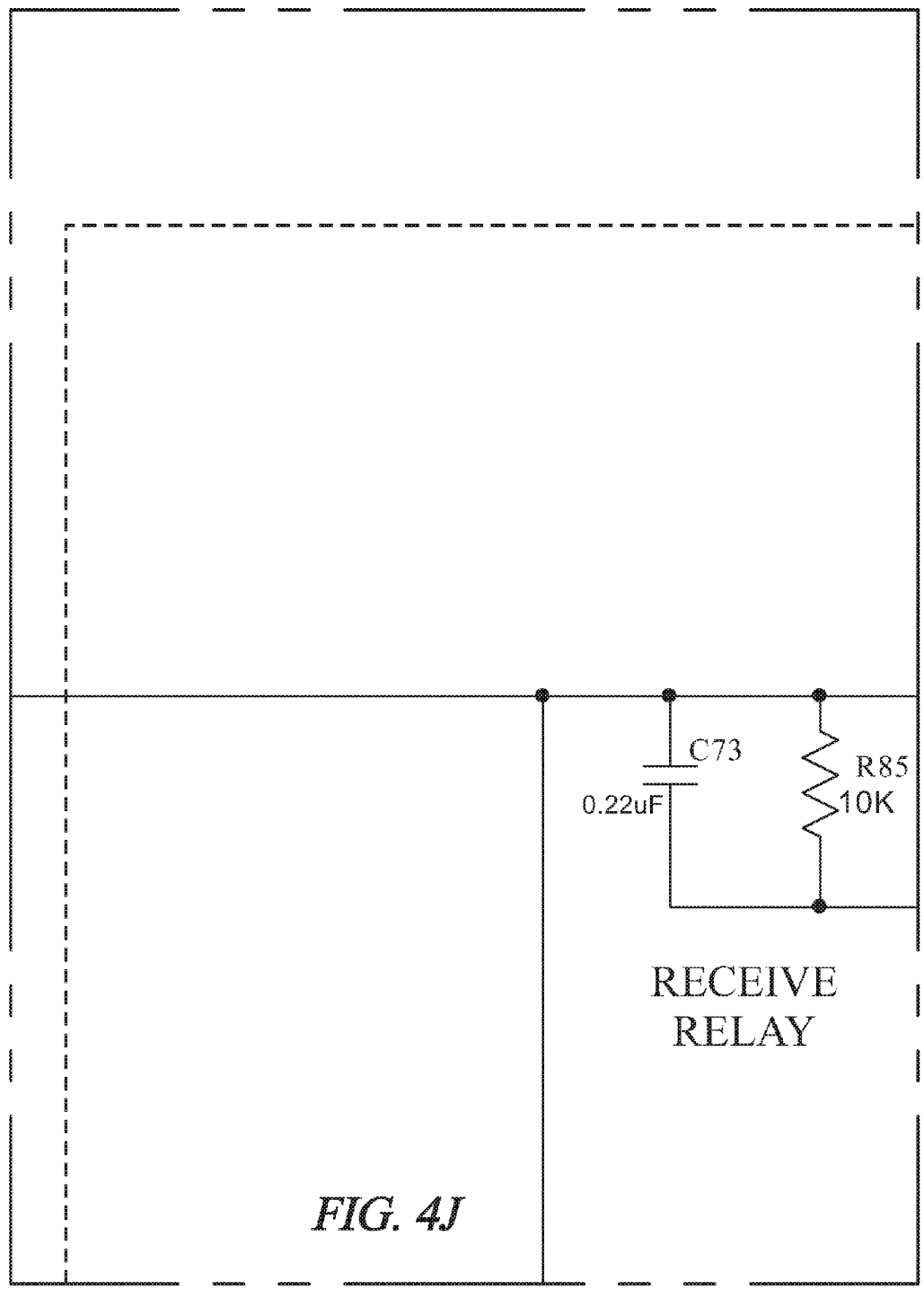
FIG. 4J is a partial schematic diagram of the bidirectional power converter of FIG. 4.
Figure 4K:
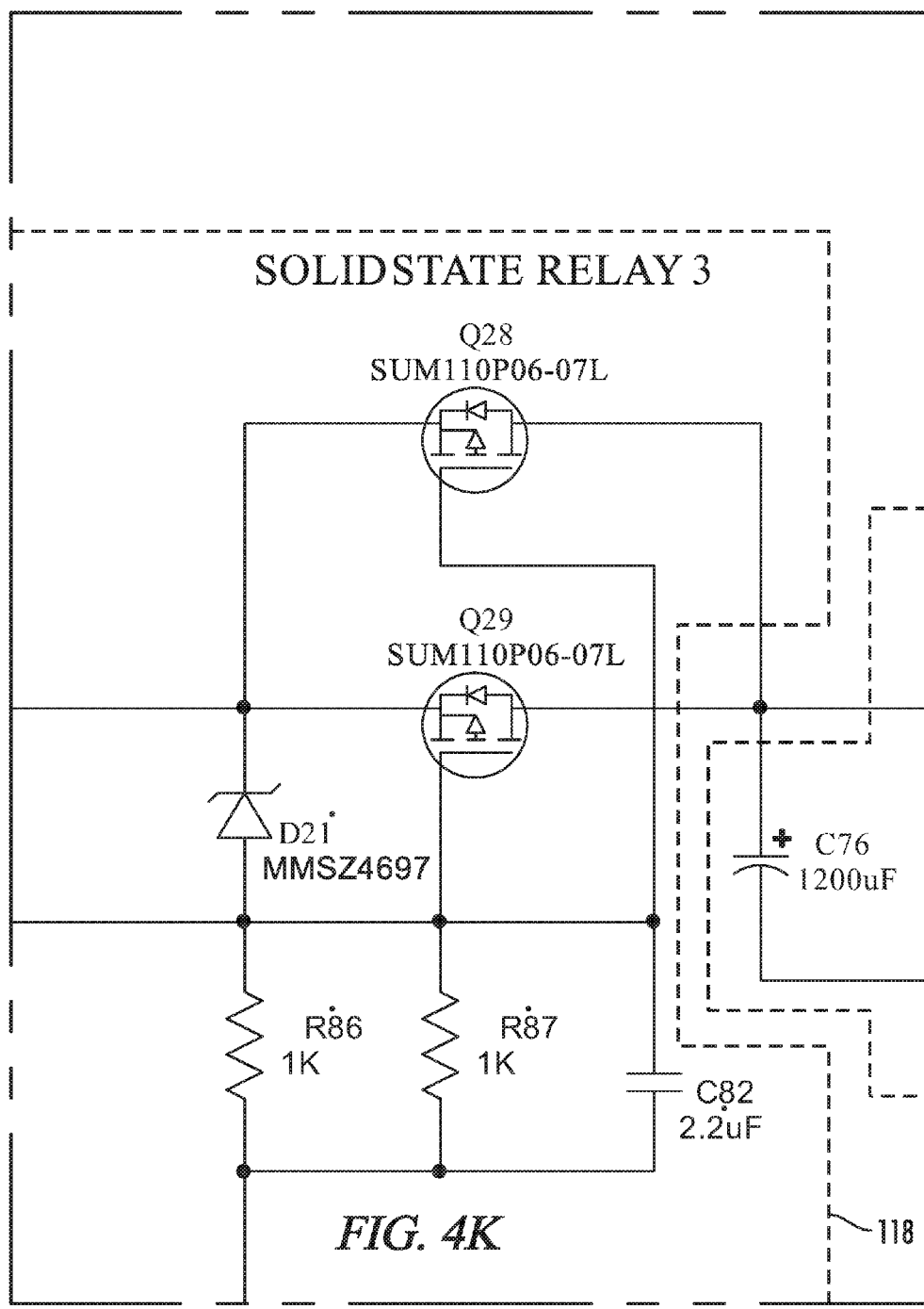
FIG. 4K is a partial schematic diagram of the bidirectional power converter of FIG. 4.
Figure 4M:
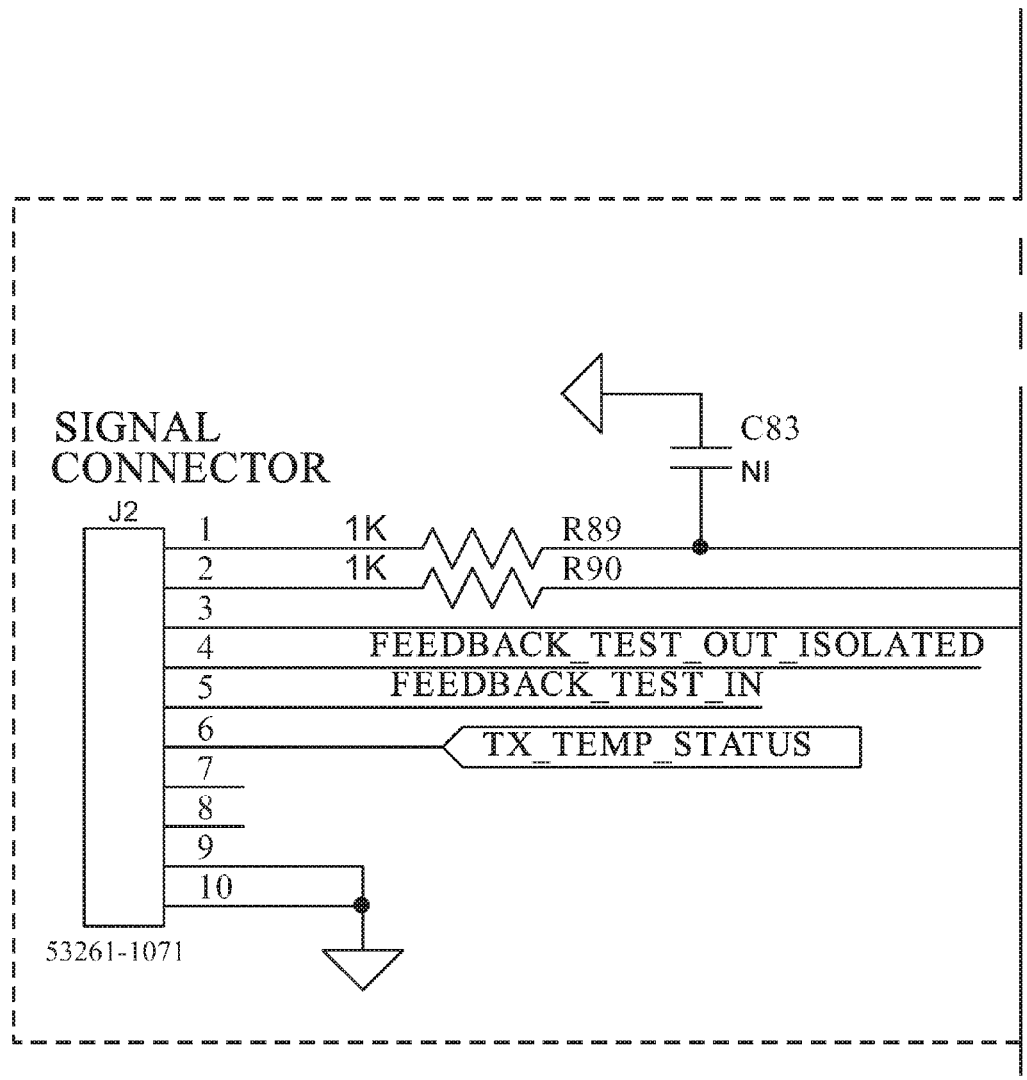
FIG. 4M is a partial schematic diagram of the bidirectional power converter of FIG. 4.
Figure 4N:
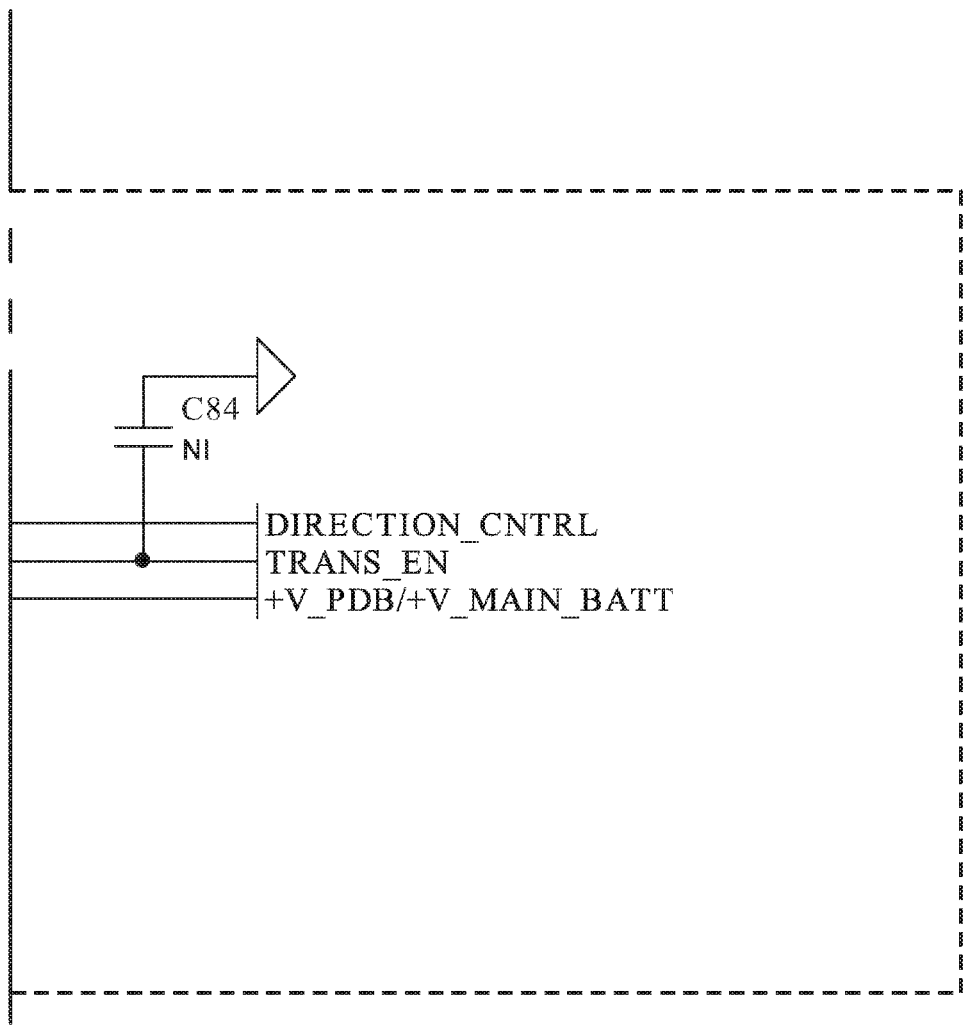
FIG. 4N is a partial schematic diagram of the bidirectional power converter of FIG. 4.
Figure 40:
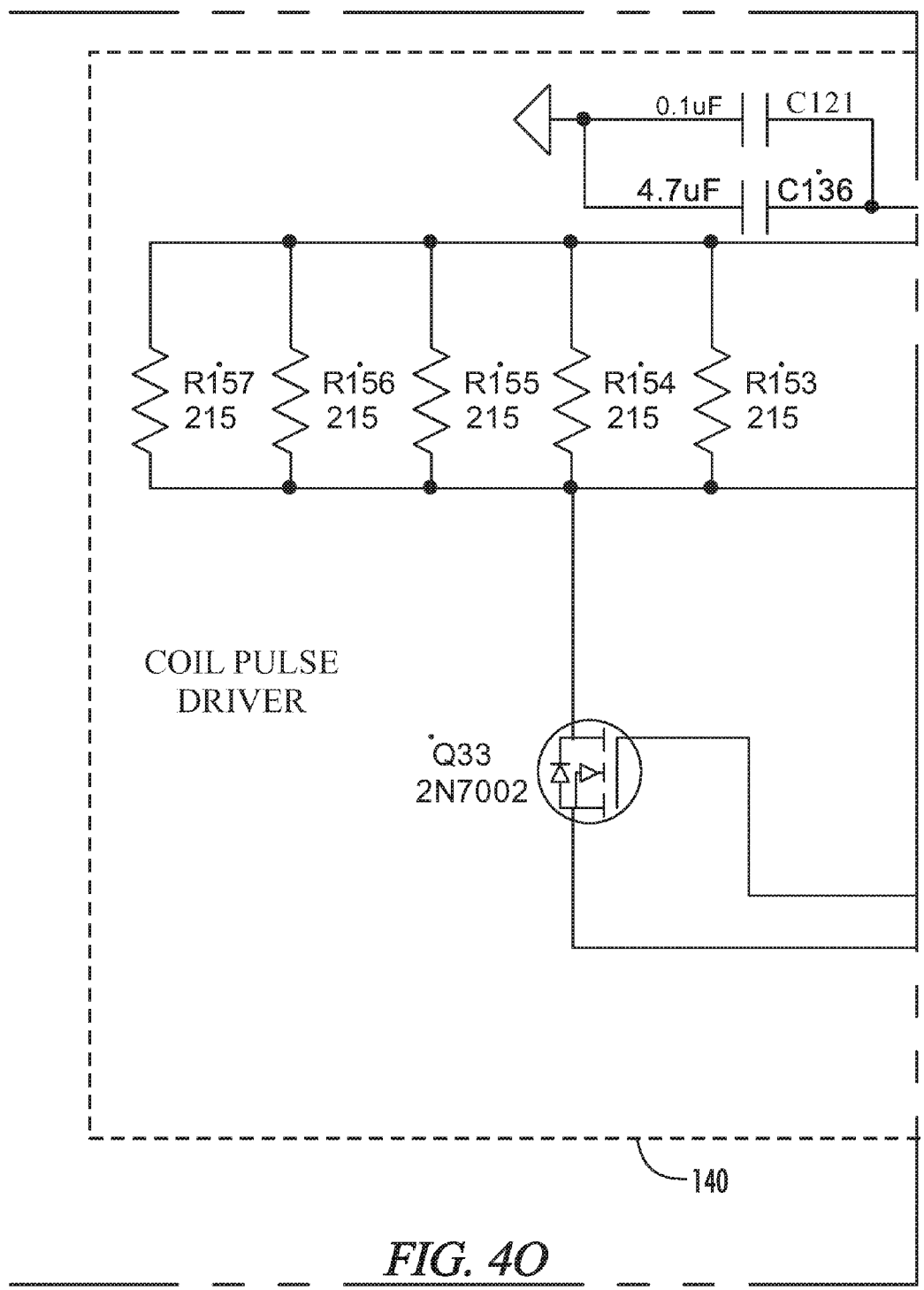
Figure 4P:
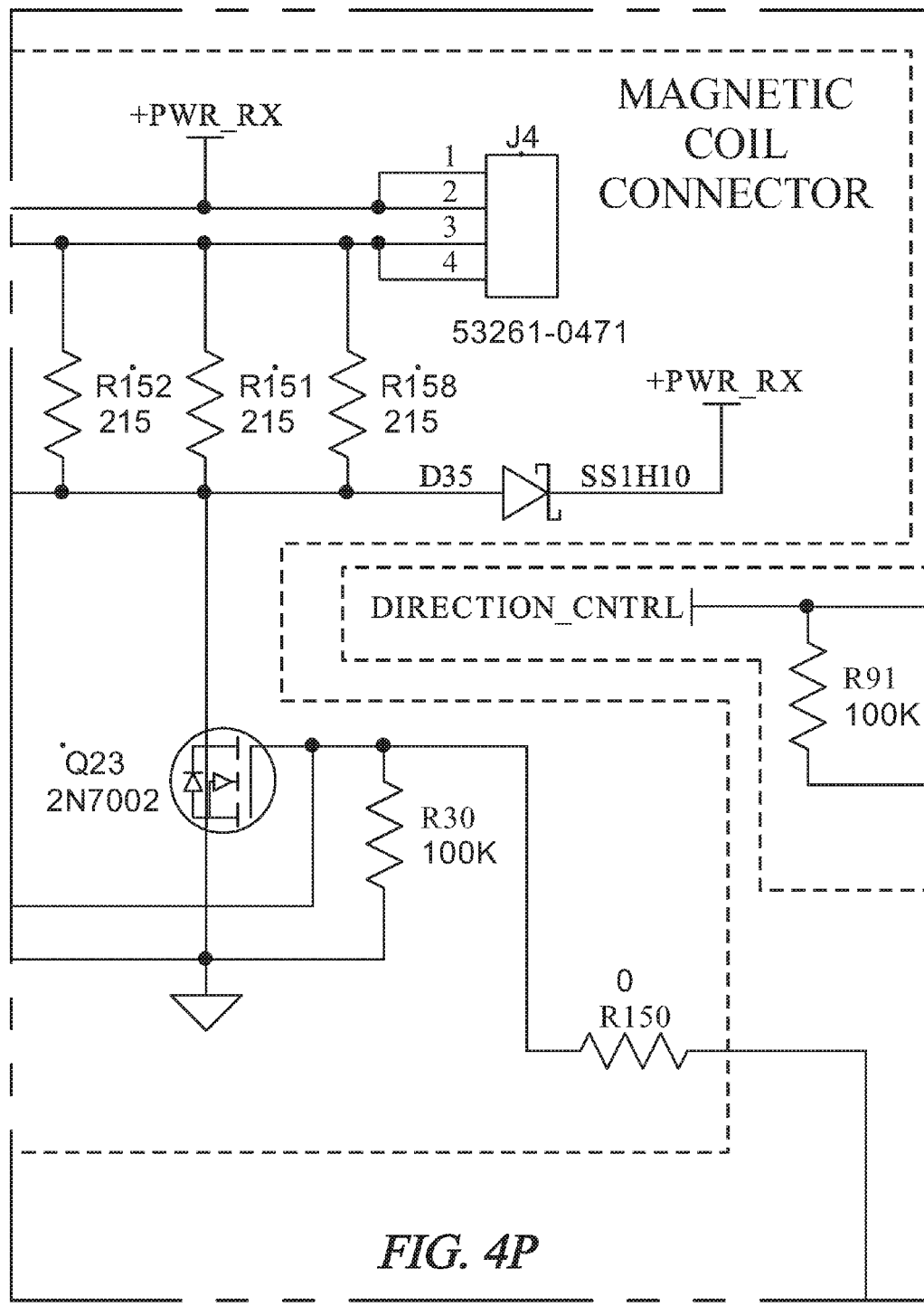
FIG. 4P is a partial schematic diagram of the bidirectional power converter of FIG. 4.
Figure 4Q:
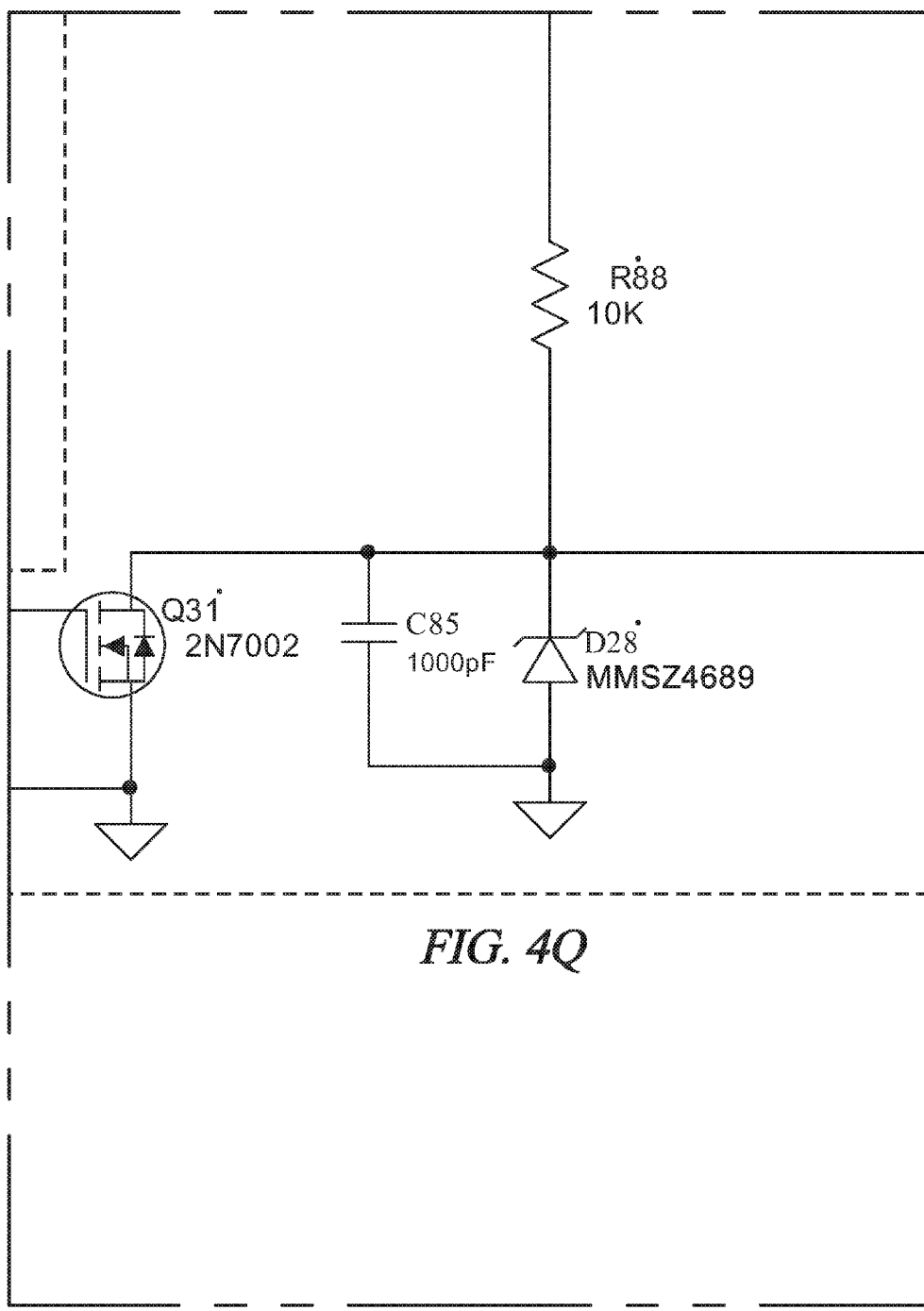
FIG. 4Q is a partial schematic diagram of the bidirectional power converter of FIG. 4.
Figure 4R:
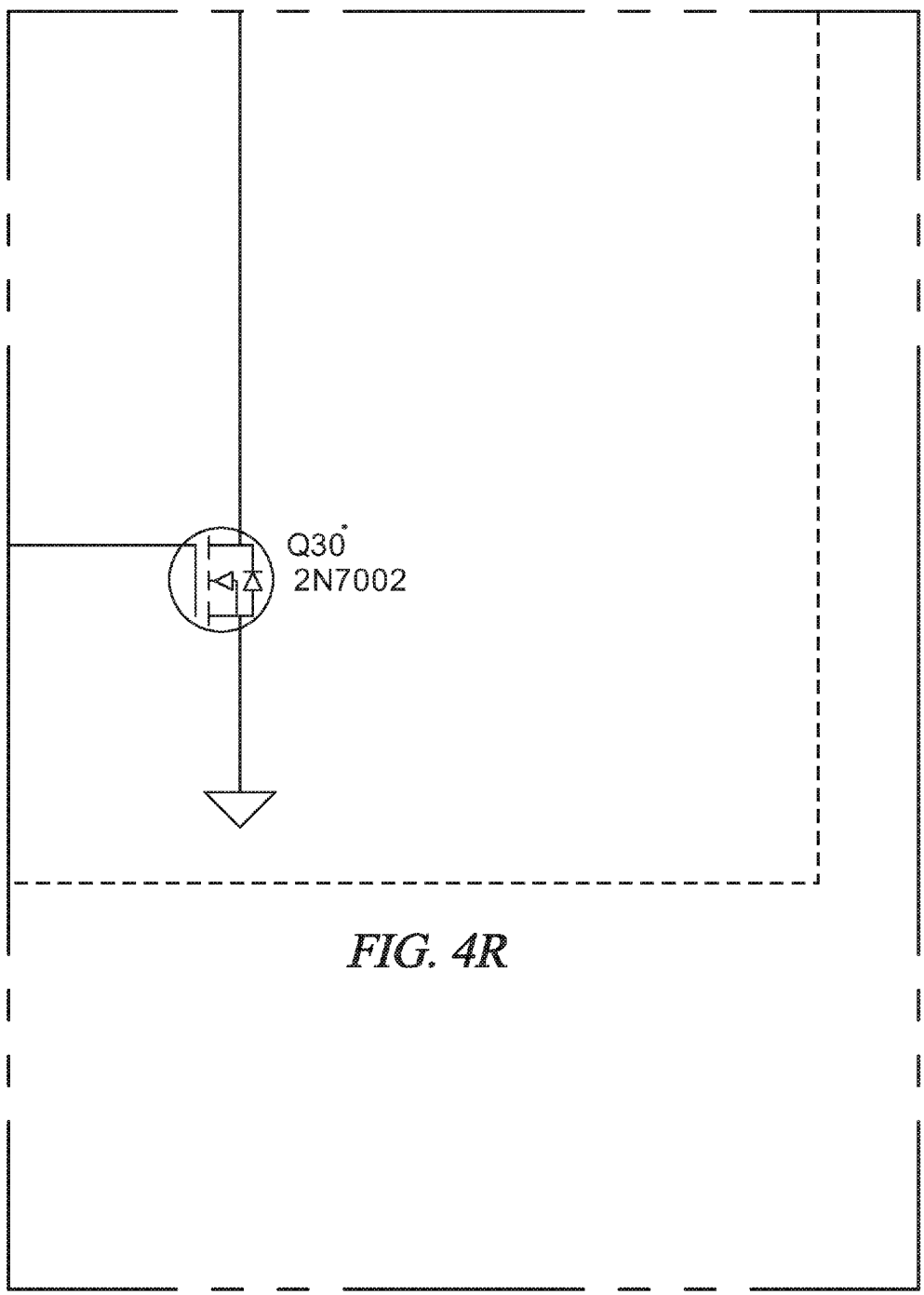
FIG. 4R is a partial schematic diagram of the bidirectional power converter of FIG. 4.
Figure 4S:
FIG. 4S is a partial schematic diagram of the bidirectional power converter of FIG. 4.
Figure 4T:
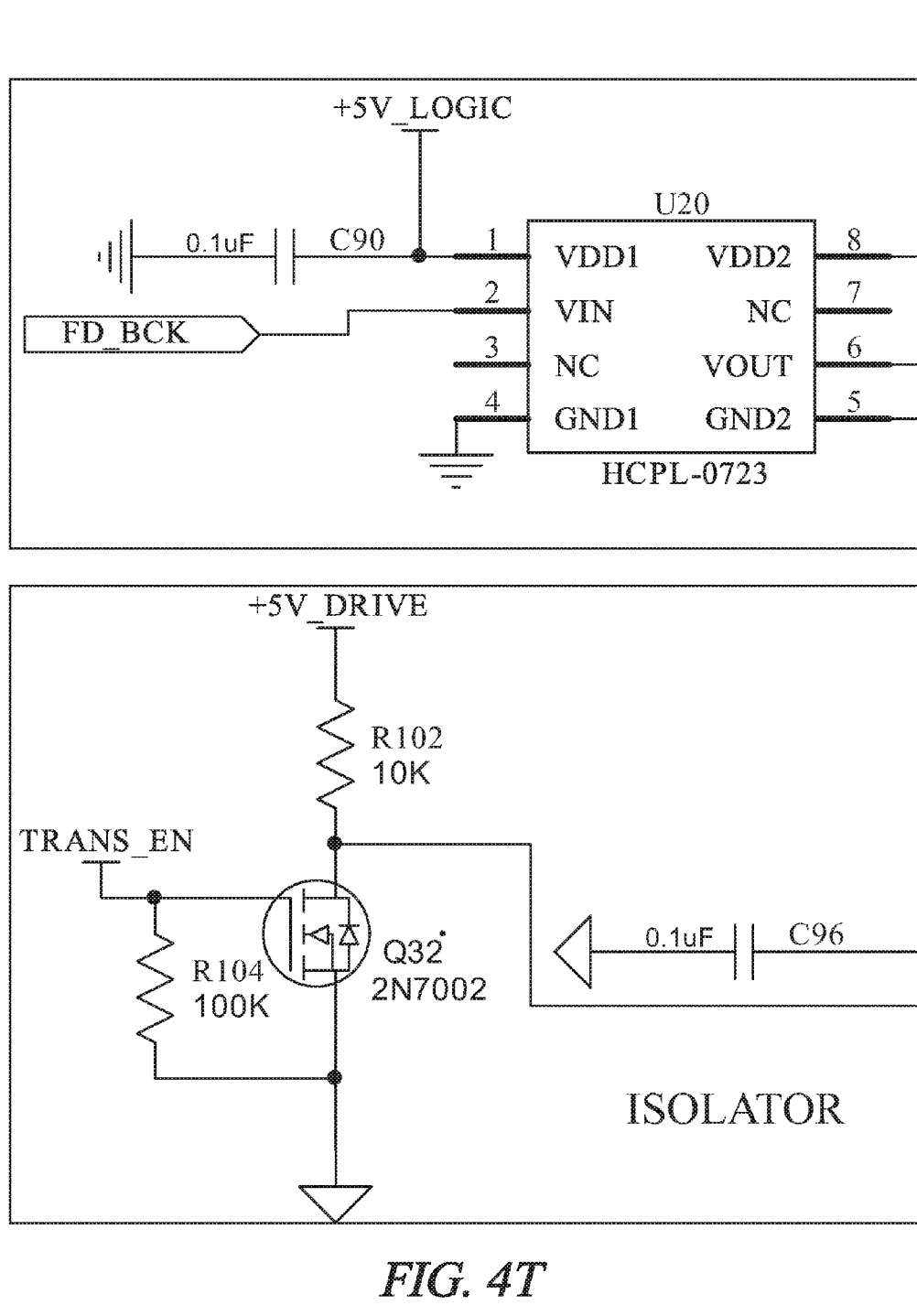
FIG. 4T is a partial schematic diagram of the bidirectional power converter of FIG. 4.
Figure 4U:
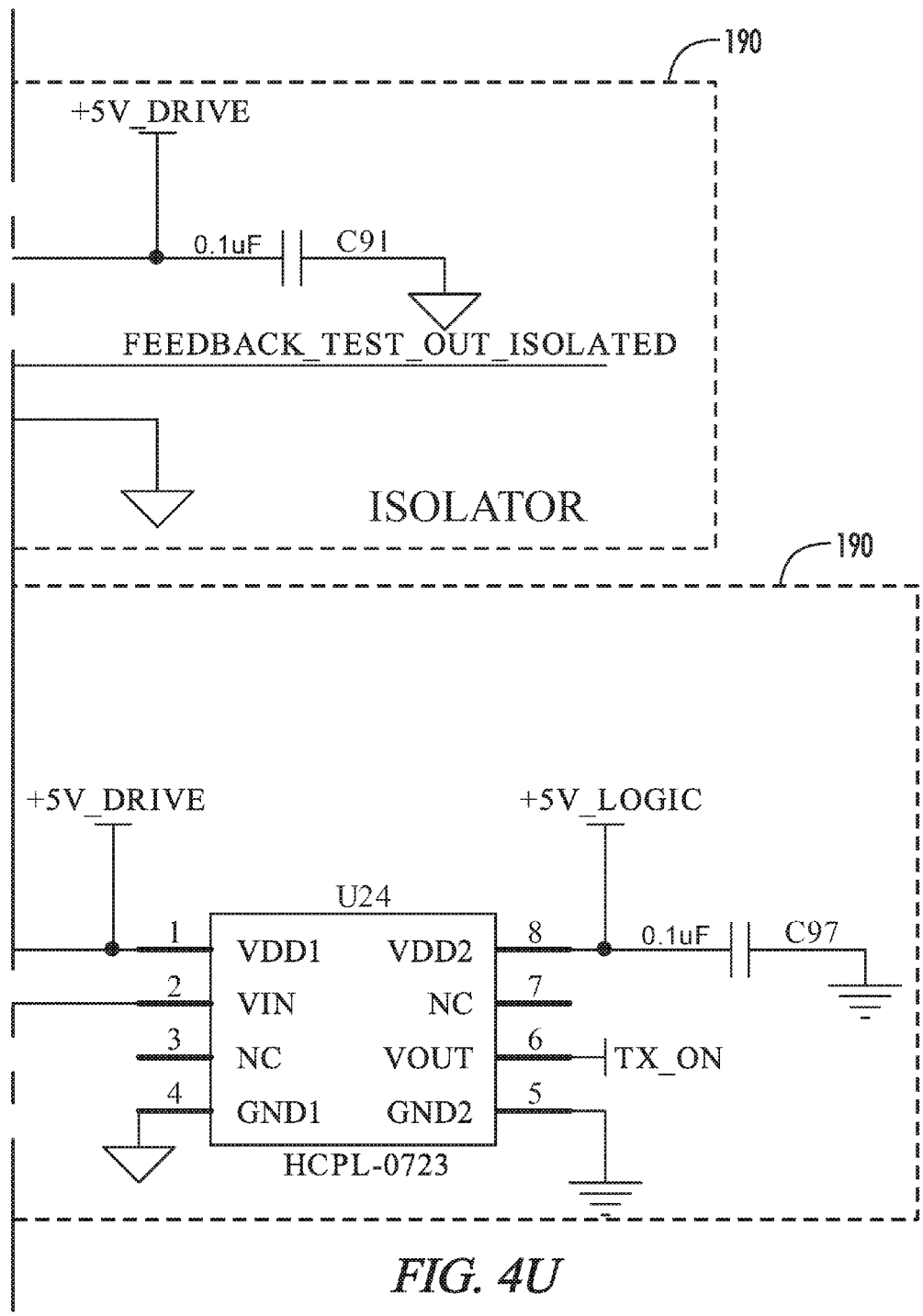
FIG. 4U is a partial schematic diagram of the bidirectional power converter of FIG. 4.
Figure 4V:
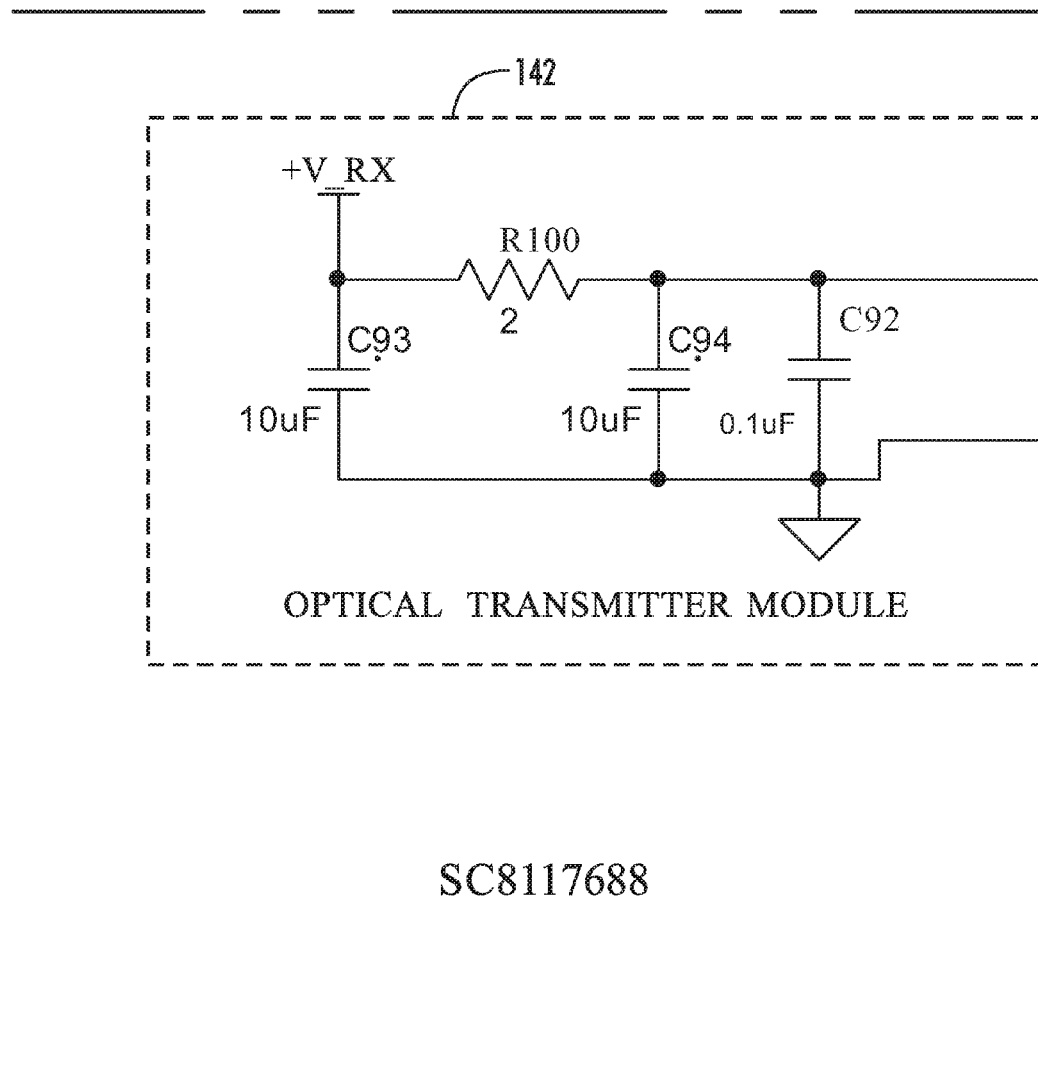
FIG. 4V is a partial schematic diagram of the bidirectional power converter of FIG. 4.
Figure 4W:
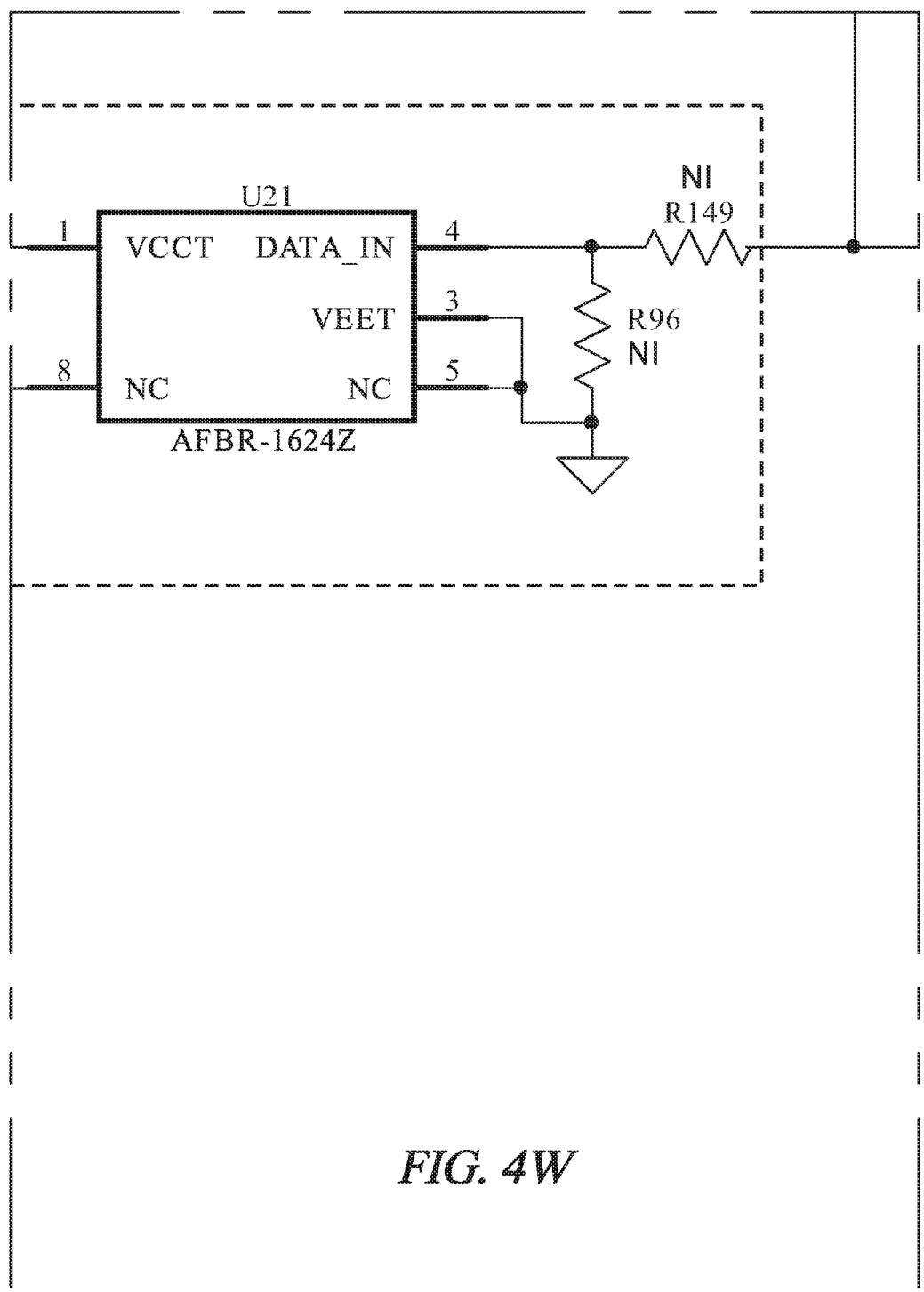
FIG. 4W is a partial schematic diagram of the bidirectional power converter of FIG. 4.
Figure 4X:
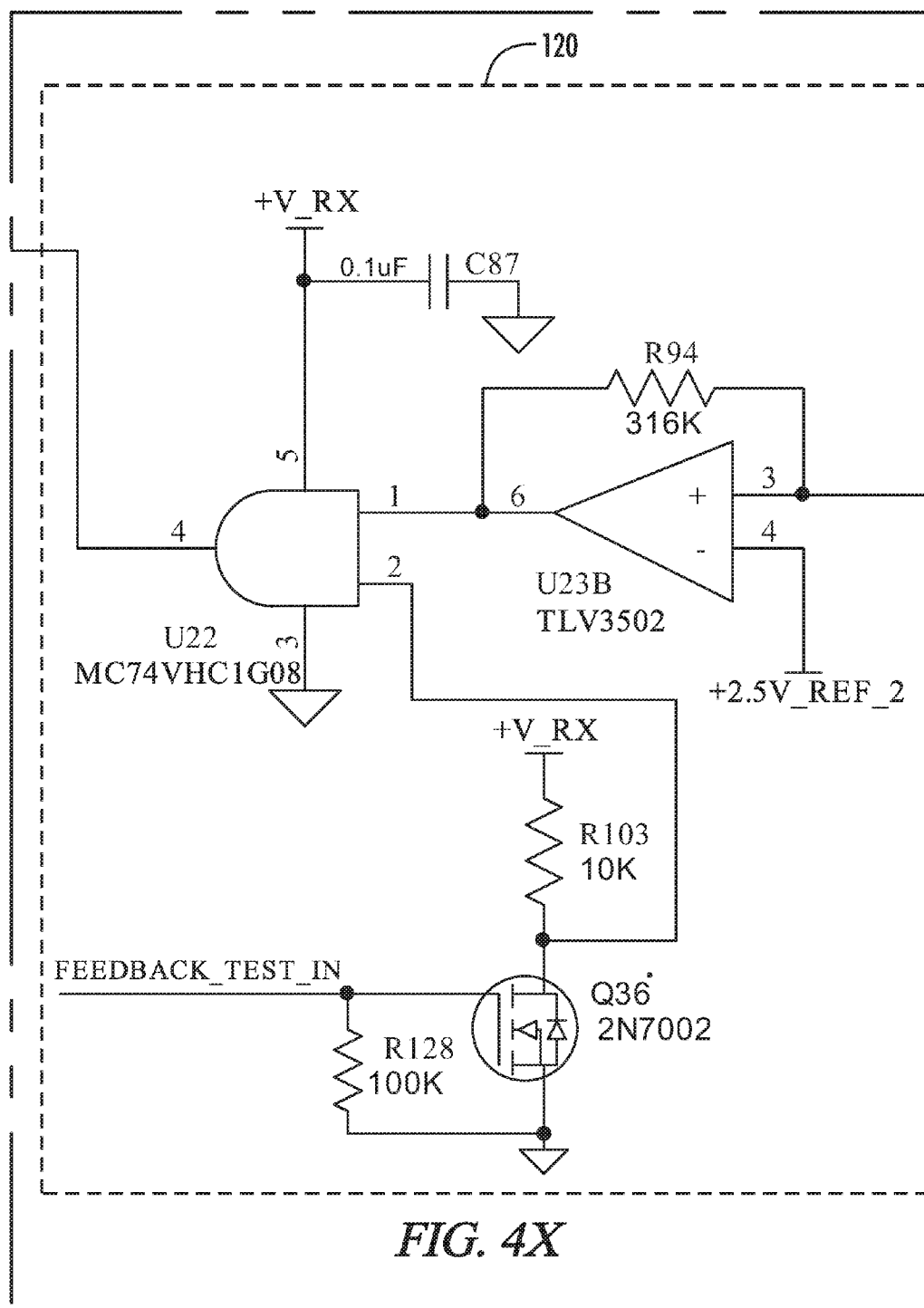
FIG. 4X is a partial schematic diagram of the bidirectional power converter of FIG. 4.
Figure 4Y:
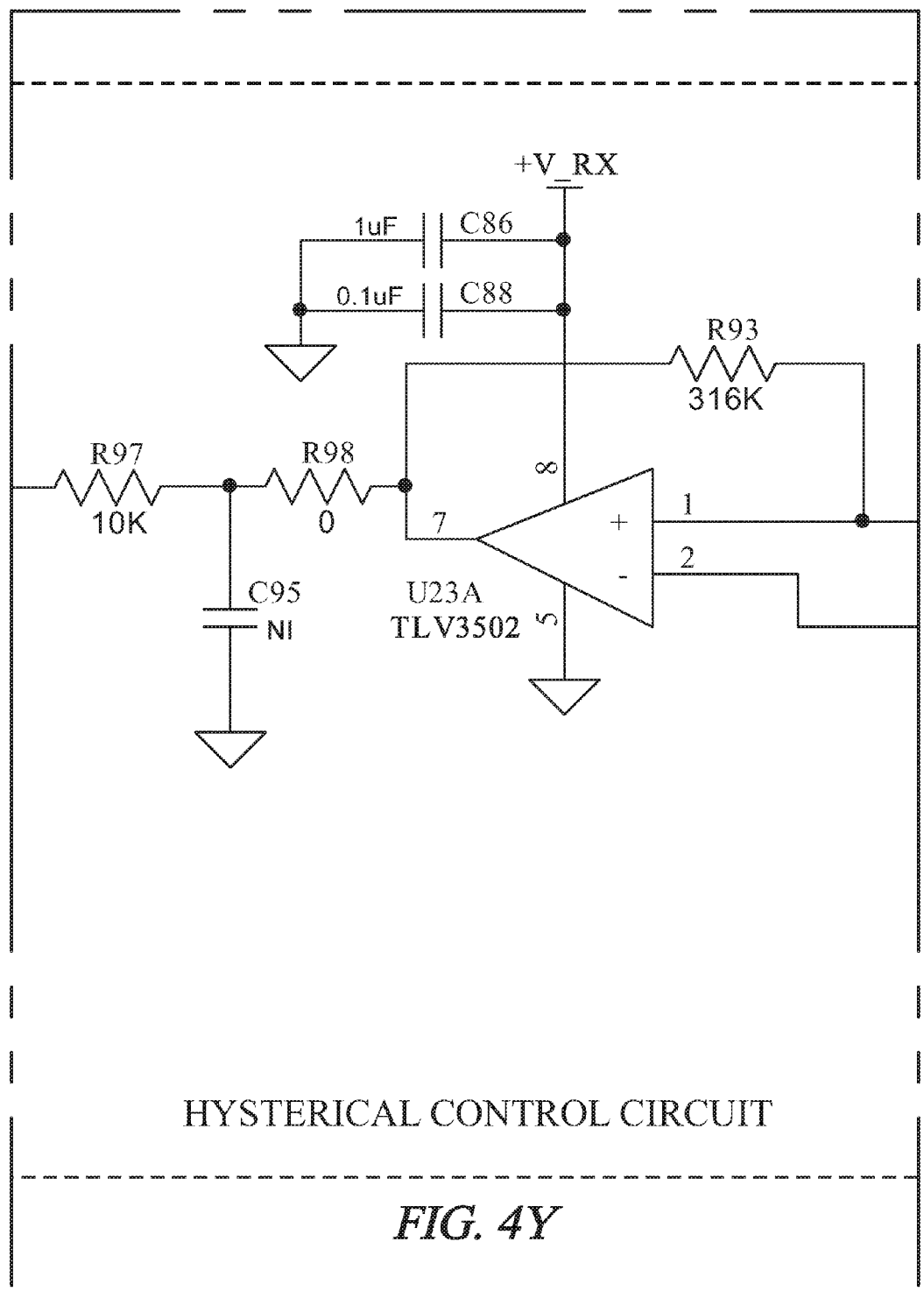
FIG. 4Y is a partial schematic diagram of the bidirectional power converter of FIG. 4.
Figure 4Z:
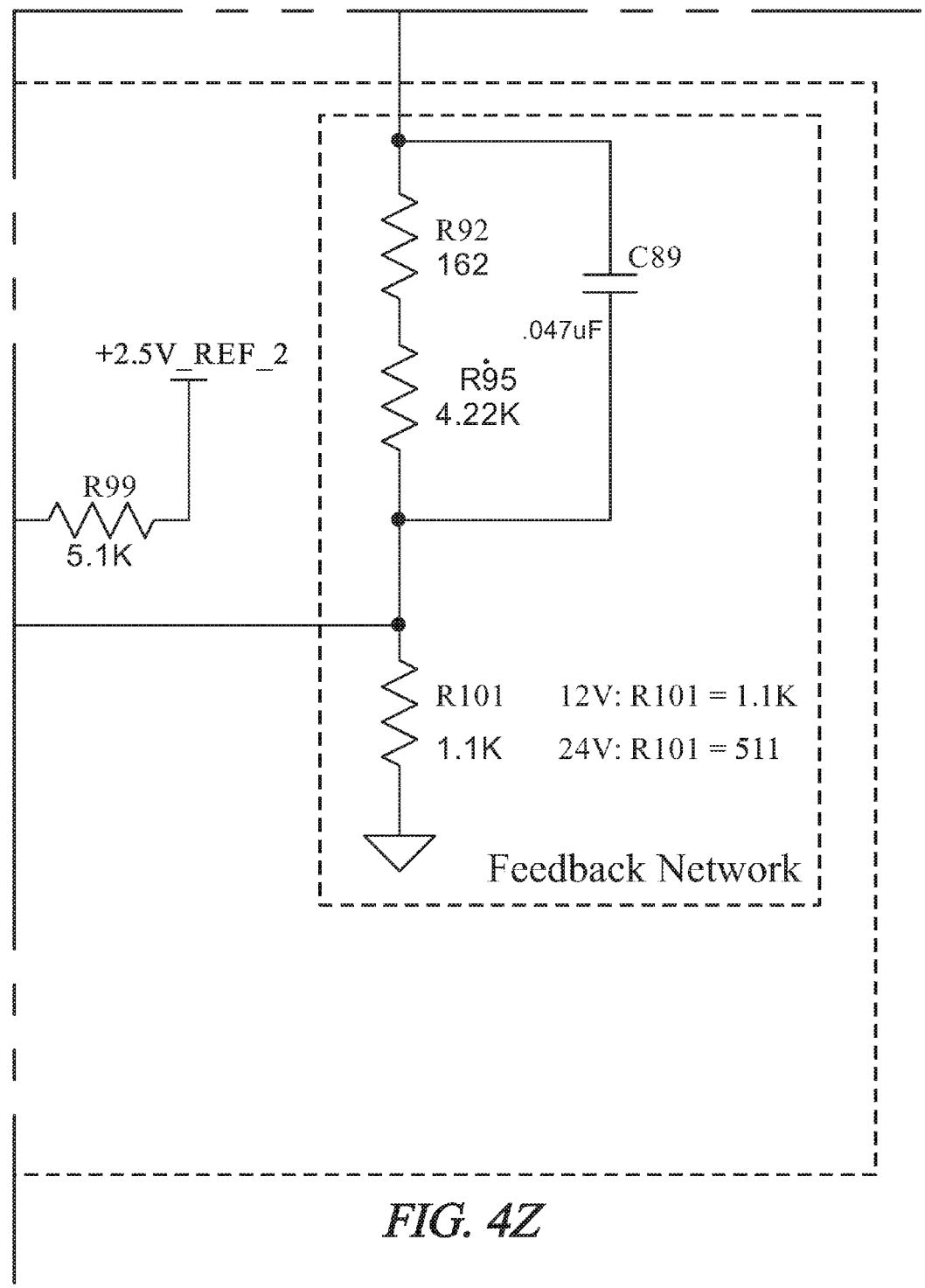
FIG. 4Z is a partial schematic diagram of the bidirectional power converter of FIG. 4.
Figure 5A:
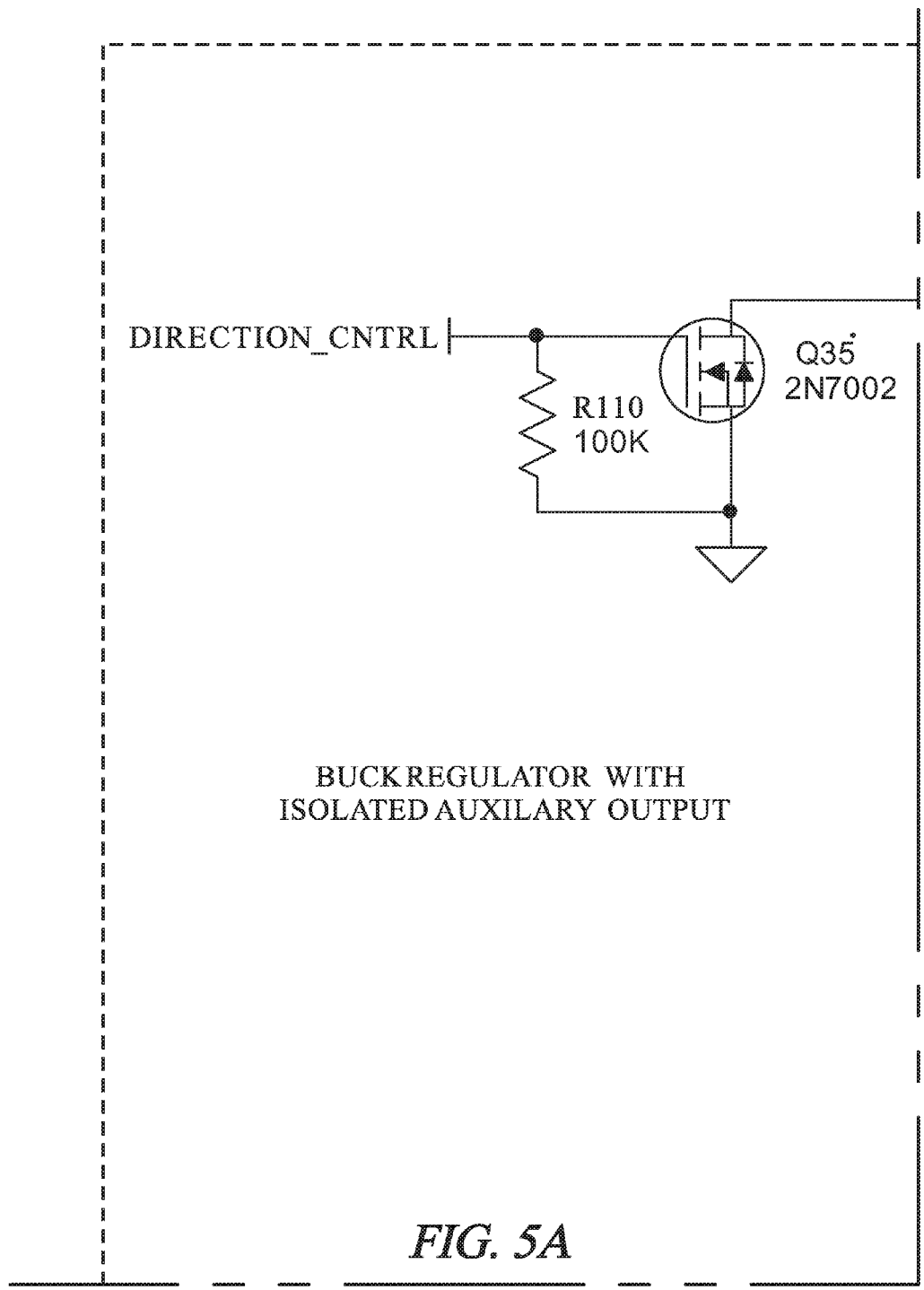
FIG. 5A is a partial schematic diagram of the bidirectional power converter of FIG. 5.
Figure 5B:
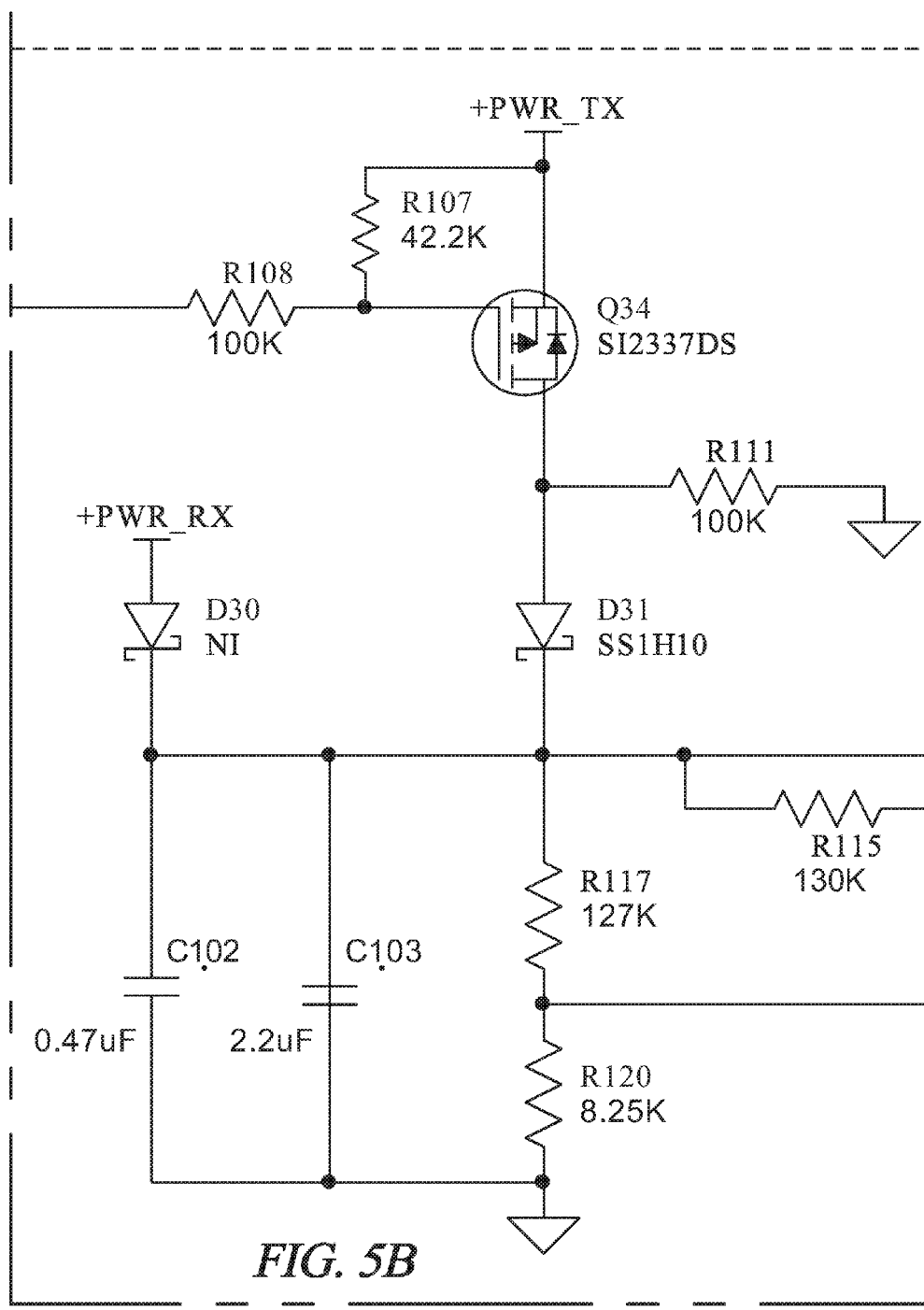
FIG. 5B is a partial schematic diagram of the bidirectional power converter of FIG. 5.
Figure 5C:
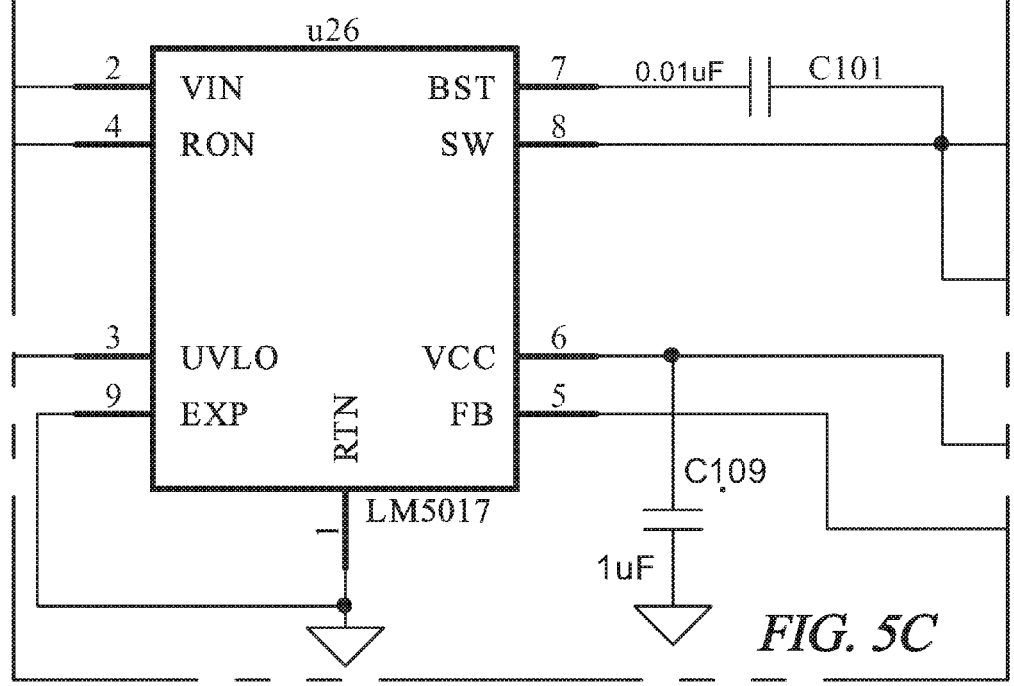
FIG. 5C is a partial schematic diagram of the bidirectional power converter of FIG. 5.
Figure 5D:
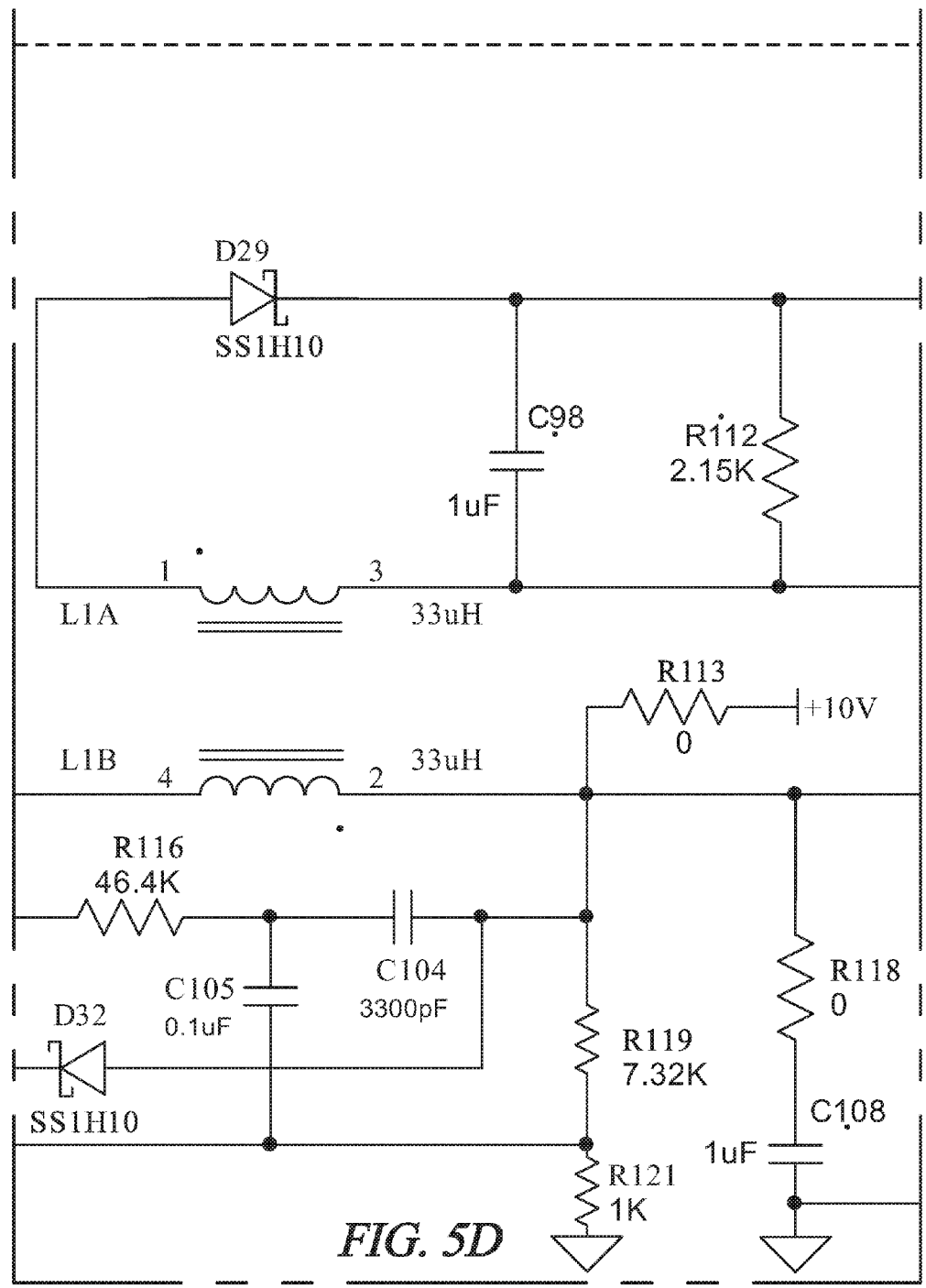
FIG. 5D is a partial schematic diagram of the bidirectional power converter of FIG. 5.
Figure 5E:
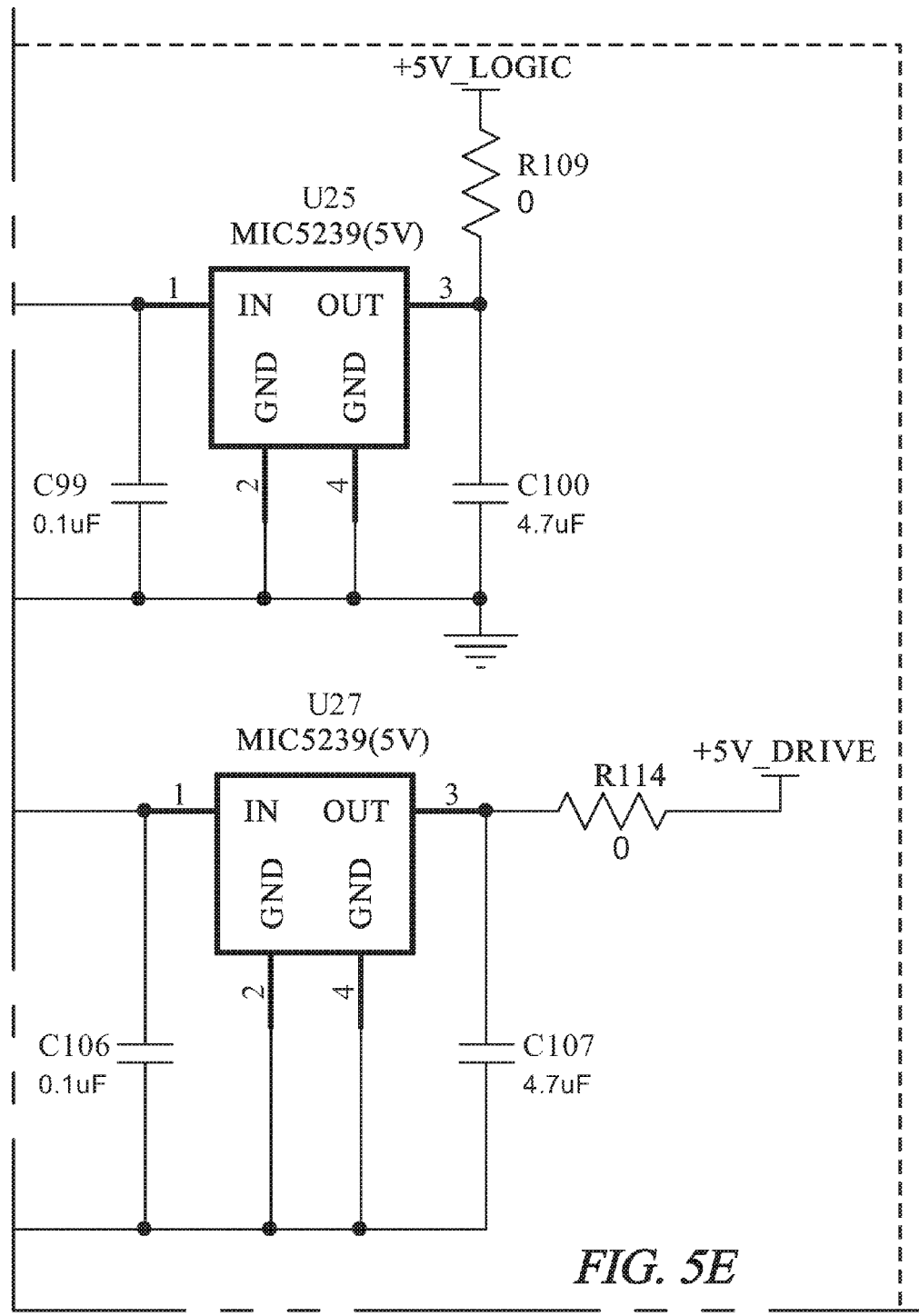
FIG. 5E is a partial schematic diagram of the bidirectional power converter of FIG. 5.
Figure 5F:
FIG. 5F is a partial schematic diagram of the bidirectional power converter of FIG. 5.
Figure 5G:
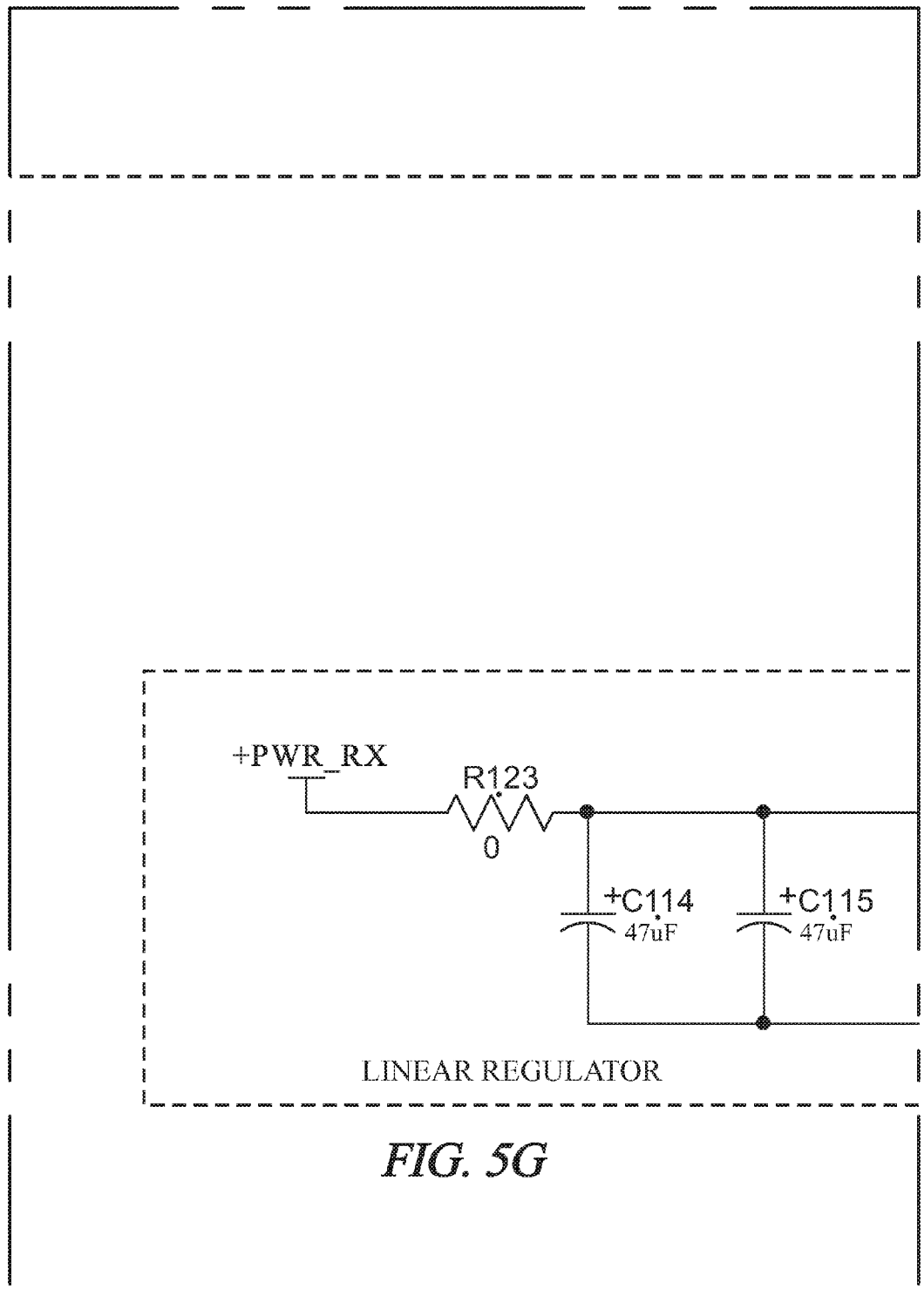
FIG. 5G is a partial schematic diagram of the bidirectional power converter of FIG. 5.
Figure 5H:
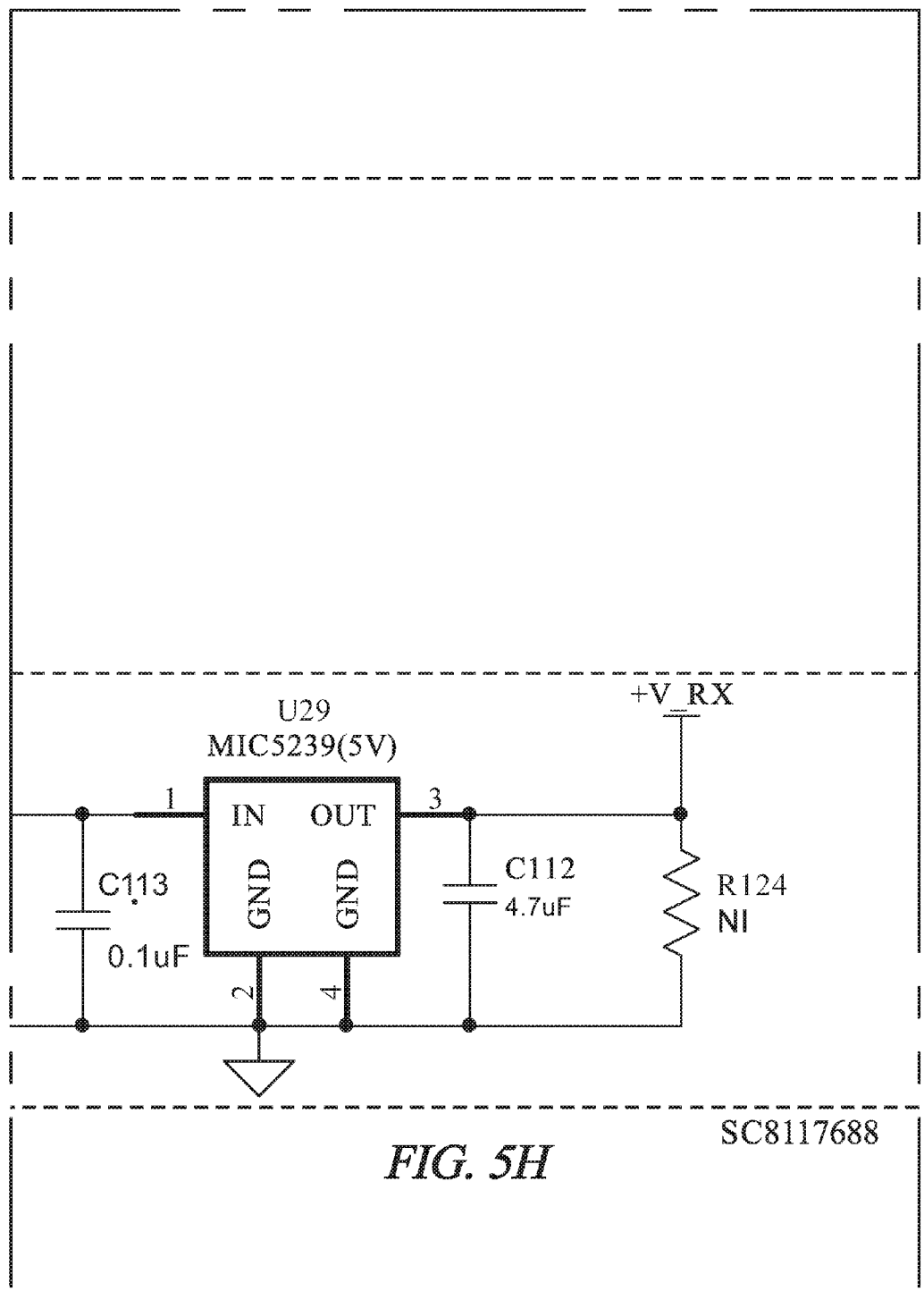
FIG. 5H is a partial schematic diagram of the bidirectional power converter of FIG. 5.
Figure 5I:
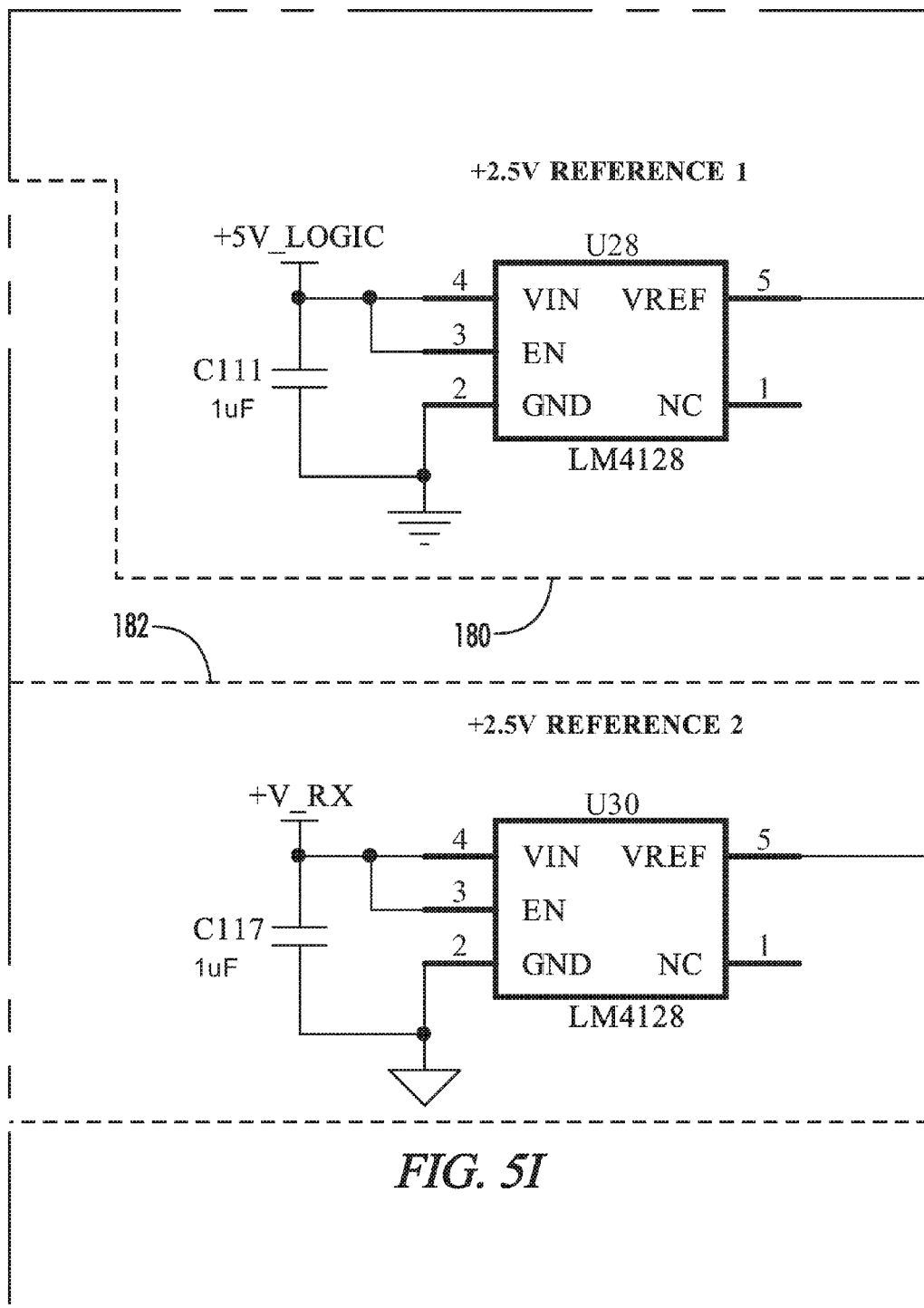
FIG. 5I is a partial schematic diagram of the bidirectional power converter of FIG. 5.
Figure 5J:
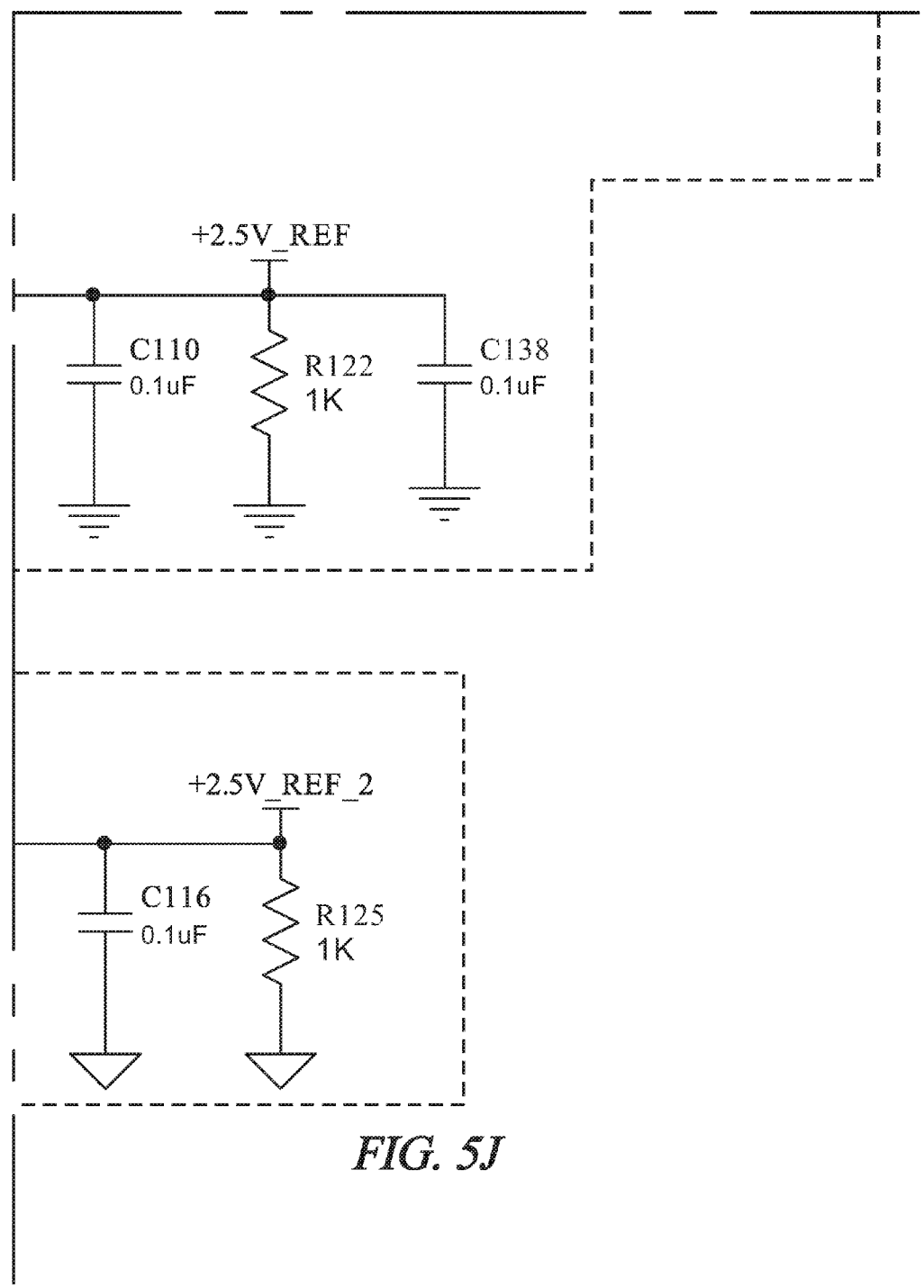
FIG. 5J is a partial schematic diagram of the bidirectional power converter of FIG. 5.

Referring now to FIGS. 1-5, in one embodiment, a bidirectional power converter 100 is operable to provide AC power to an AC terminal 102 of the bidirectional power converter 100 in a transmit mode of the bidirectional power converter 100. The bidirectional power converter 100 is further operable to provide DC power at a DC output terminal 104 of the bidirectional power converter 100 in a receive mode of the bidirectional power converter 100. In one embodiment, bidirectional power converter 100 includes an oscillator 106, an amplifier 108, a modulator 110, a hysteretic receiver circuit 112, a transmit relay 114, a rectifier 116 a receive relay 118, and a hysteretic control circuit 120. In one embodiment, the bidirectional power converter 100 includes two generally independent sections, a transmitter section and a receiver section. The transmitter section and the receiver section are selectively connected to the DC output terminal 104 and AC terminal 102 by a set of solid state relays (e.g., transmit relay 114 and receive relay 118).

The oscillator 106 is configured to provide a drive signal at a base frequency when the bidirectional power converter 100 is operating in the transmit mode. In one embodiment, the base frequency of the oscillator 106 is approximately 100 kHz. In one embodiment, the oscillator 106 generates the carrier frequency at which power is transmitted by the bidirectional power converter transmitter section. In one embodiment, micro U17 of oscillator 106 is an industry standard 556 timer which contains two 555 timers. One timer of micro U17 is configured as a one shot timer, and the other timer is a free running oscillator, oscillating at 100 KHz. The one shot timer of micro U17 guarantees a 50% duty cycle for the modulator 110 during startup of the transmitter section. Resistors R65 and R70 as well as capacitors C47 and C49 set the free running frequency of 100 kHz (or some other base frequency). Resistors R67 and R68 and capacitor C44 set the one shot timer for a precise 50% duty cycle out of pin 9 of the micro U17.

The amplifier 108 is configured to receive power from a power source via DC input terminal 122 of the bidirectional power converter 100 and provide an AC output signal to the AC terminal 102 of the bidirectional power converter 100 in response to receiving the drive signal when the bidirectional power converter 100 is operating in the transmit mode. In one embodiment, the amplifier 108 is a full bridge amplifier. In one embodiment, the amplifier 108 provides a differential output capable of up to 500 W RMS. Power MOSFETS Q1/Q4 and Q5/Q6 (see FIG. 2) are driven by a first micro U1 to form a first half bridge power amplifier HBPA1, and power MOSFETS Q9/Q12 and Q13/Q14 are driven by a second micro U10 to form a second half bridge power amplifier HBPA2. The outputs of the first half bridge power amplifier HBPA1 and the second half bridge power amplifier HBPA2 combine at the load (i.e., at the AC output 102) at 180 degrees out of phase to provide power drive at the load. Micros U1 and U10 provide fast turn on/off drive to their respective power MOSFETS to assure efficient switching operation. Micros U1 and U10 also provide galvanic isolation electrically isolating the input/output grounds. Micros U3 and U4 cooperate to provide dead-time control for power MOSFETS Q1/Q4 and Q5/Q6 assuring that they are never on at the same time causing a dead short for the power supply +PWR_TX. Micros U11 and U12 provide the same functionality as micros U3 and U4 for Q9/Q12 and Q13/Q14. Micros U2, U9, U5, and U33 convert the four inputs to the full bridge amplifier to the necessary drive to derive a differential AC output voltage at the load (i.e., AC output terminal 102). This part of the amplifier ensures that the output of each HBPA in the disable state is ground, essentially keeping power MOSFETS Q5/Q6 for the first half bridge power amplifier HBPA1 and power MOSFETS Q13/Q14 for the second half bridge power amplifier HBPA2 in the on state.

The modulator 110 is configured to selectively provide the drive signal from the oscillator 106 to the amplifier 108 as a function of a hysteretic control signal when the bidirectional power converter 100 is operating in the transmit mode. In one embodiment, the modulator 110 is an amplitude shift keyed modulator. The Amplitude Shift Keying Modulator 110 provides a digitized version of AM (Amplitude Modulation) to the full bridge amplifier 108, effectively keying on/off the full bridge amplifier 108 dependent on the logic state of the feedback signal (i.e., hysteresis control signal) received from a second bidirectional power converter configured as a receiver (i.e., in the receive mode). The AMOD 110 effect is to keep the voltage generated at the DC output terminal of the second bidirectional power converter assembly output constant. The AMOD 110 accepts four inputs FD_BCK (i.e., hysteretic control signal), 100 KHz_OSC (i.e., drive signal) from the oscillator 106, ONE_SHOT (i.e., one shot signal) from the one shot timer 170, and SSL (i.e., the pulse width modulated signal) from the slow start logic circuit 172. The AMOD 110 generates four outputs (i.e., two sets of differential outputs) to the full bridge amplifier 108: 100 KHz_OUT_MODULATED, 100 KHz_OUT_MODULATED_N, TX_EN, TX_EN_N. The modulator enable signal (MODULATOR_EN) enables/disables the AMOD (modulator) 110. Once the AMOD 110 is enabled, the drive signal from the oscillator 106 (100 KHz_OSC) drives CLK pins of micro U15 and micro U38, sequentially clocking the logic state of the hysteresis control signal (FD_BCK), once the one shot signal (ONE_SHOT) has settled to a logic 0 and the slow start circuit 172 pulse width modulated signal (SSL) has settled to a logic 1. A modulator internal signal 100 KHz_OUT_MODULATED is derived from micro U38 and its inverted version from micro U35. The TX_EN and TX_EN_N signals are derived from the Q/Q_N pins of U15B. These outputs drive the full bridge amplifier 108 and contain the feedback information from the second bidirectional power converter 100 configured as a receiver. A logic 1 at D of micro U15A turns on the full bridge amplifier 108 continuously while a logic 0 at D of micro U15A turns off the full bridge amplifier 108 and turns on power MOSFETS Q5, Q6, Q13, and Q14 to keep each half bridge power amplifier (i.e., HBPA1 and HBPA2) output at ground potential.

The hysteretic receiver circuit 112 is configured to receive a transmitted control signal at the bidirectional power converter 100 and provide the hysteretic control signal to the modulator 110 as a function of the received, transmitted control signal when the bidirectional power converter 100 is operating in the transmit mode.

The transmit relay 114 is configured to electrically connect the amplifier 108 to the AC terminal 102 of the bidirectional power converter 100 when the bidirectional power converter 100 is operating in the transmit mode and electrically disconnect the amplifier 108 from the AC terminal 102 of the bidirectional power converter 100 when the bidirectional power converter 100 is operating in the receive mode.

The rectifier 116 is configured to receive an alternating current power signal from the AC terminal 102 of the bidirectional power converter 100 and provide a DC output to the DC output terminal 104 of the bidirectional power converter 100 when the bidirectional power converter 100 is operating in the receive mode. In one embodiment, the rectifier 116 is a full wave rectifier. The rectifier 116 converts the AC power received to pulsating DC at twice the incoming frequency. The rectifier 116 is capable of receiving up to a maximum of 500 W RMS. The rectifier is implemented via diodes D14 through D19 and D22 through D27 (see FIG. 4) connected in a full bridge rectifier configuration. A parallel diode combination allows for higher power while keeping the efficiency high. In one embodiment, the diodes D14 through D19 and D22 through D27 are of the Schottky type for high speed operation.

The receive relay 118 is configured to enable the rectifier 116 to provide the DC output to the DC output terminal 104 of the bidirectional power converter 100 when the bidirectional power converter 100 is operating in the receive mode and prevent the rectifier 116 from providing the DC output to the DC output terminal 104 when the bidirectional power converter 100 is operating the transmit mode. In one embodiment, the receive relay 118 is configured to enable the rectifier 116 to provide the DC output to the DC output terminal 104 when the bidirectional power converter 100 is operating in the receive mode by electrically connecting the rectifier 116 to the DC output terminal 104 of the bidirectional power converter 100 when the bidirectional power converter 100 is operating in the receive mode. The receive relay 118 is further configured to prevent the rectifier 116 from providing the DC output to the DC output terminal 104 when the bidirectional power converter 100 is operating in the transmit mode by electrically disconnecting the rectifier 116 from the AC terminal 102 of the bidirectional power converter 100 when the bidirectional power converter 100 is operating in the transmit mode. In another embodiment, the receive relay 118 is configured to prevent the rectifier 116 from providing the DC output to the DC output terminal 104 when the bidirectional power converter 100 is operating in the transmit mode by electrically disconnecting the rectifier 116 from the DC output terminal 104.

The hysteretic control circuit 120 is configured to monitor the DC output and transmit a control signal as a function of the monitored DC output when the bidirectional power converter 100 is operating in the receive mode. In one embodiment, the hysteretic control circuit 120 includes a hysteretic controller 132 and a transmitter. The hysteretic controller 132 is configured to provide a logic signal. The logic signal is a 1st binary value when a voltage of the DC output from the rectifier 116 is less than a predetermined threshold, and the logic signal is a 2nd binary value when the voltage of the DC output is more than the predetermined threshold. The 1st binary value is different than the 2nd binary value. The response time of the hysteretic controller 132 is almost instantaneous which gives the system (i.e., a pair of bidirectional power converters 100, one operating in the transmit mode and one operating in the receive mode) excellent transient response at the DC output terminal. The only delays involved in the control loop are the propagation delays of the transmitter and hysteretic receiver circuit 112 and other system blocks of the power network (i.e., modulator 116 and amplifier 108) which are very short. Another benefit of the hysteretic controller 132 and hysteretic receiver circuit 112 is that the system has an unconditional operation stability, requiring no feedback compensating components for stable operation. In one embodiment, the hysteretic controller 132 further includes a feedback network. The feedback network provides a reduced voltage representative of the DC output voltage of the rectifier 116, allowing for the output of the bidirectional power converter to be adjusted anywhere between 12 and 24 V DC as a function of the feedback network components (i.e., resistors). Resistors R92, R95, and R101 (see FIG. 4) and capacitor C89 provide the feedback network function. Resistors R92, R95, and R101 form a voltage divider that divides down the output voltage (i.e., the DC output voltage from the rectifier 116 and DC filter 186) to equal a reference voltage applied to the hysteretic controller 132 by the linear regulator 182. At any time the output is regulated between 12-24V, the voltage generated across R101 is always 2.5V which is equal to the reference voltage of micro U23A provided by the linear regulator 182. Capacitor C89 is used to pass some of the ripple of the DC output signal from the rectifier 116 and DC filter 186 to the input of the micro U23A to speed up the switching action of the hysteretic controller 132, increasing efficiency and stability of the bidirectional power converter. In a 1st embodiment of the hysteretic controller 132, the transmitter is a coil pulse driver 140 configured to receive the logic signal and generate a magnetic field via a magnetic coupling coil. The generated magnetic field is indicative of the logic signal. In the 1st embodiment, the hysteretic receiver circuit 112 includes a magnetic sensor configured to receive a magnetic field and provide hysteretic control signal to the modulator 110 as a function of the received magnetic field. In one version, a linear hall-effect sensor connects to jumper J3 of the bidirectional power converter 100. Micro U6A is configured as an AC coupled first-order low pass filter, for removing some noise picked up by the hall-effect sensor. Micro U6B and comparator U41A form a comparator circuit with a threshold set by micro U6B. When the output of micro U6A equals the threshold set by micro U6B, comparator U41A sets its output (i.e., the hysteresis control signal) to a logic 1, and the comparator U41A sets its output (i.e., the hysteresis control signal) to a logic zero when the output of micro U6A is less than the threshold set by micro U6B. In a 2nd embodiment, the transmitter is a radio frequency (RF) transmitter configured to receive the logic signal and transmit an RF signal via and antenna, wherein the transmitted RF signal is indicative of the logic signal. In the 2nd embodiment, hysteretic receiver circuit 112 includes an RF receiver configured to receive an RF signal and provide the hysteretic control signal to the modulator 110 as a function of the received RF signal. In a 3rd embodiment, the transmitter is an optical transmitter 142 configured to receive the logic signal and transmit an optical signal via an infrared emitter, wherein the transmitted optical signal is indicative of the logic signal. In the 3rd embodiment, the hysteretic receiver circuit 112 includes an infrared receiver 144 configured to receive an optical signal and provide the hysteretic control signal to the modulator 110 as a function of the received optical signal.

In one embodiment, the bidirectional power converter 100 further includes a direction control input 130 configured to receive a direction control signal. The direction control signal is provided to the transmit relay 114 and the receive relay 118 to set the bidirectional power converter 100 in either the transmit mode or the receive mode.

In one embodiment, the bidirectional power converter 100 further includes a coil 150 connected to the AC terminal 102 of the bidirectional power converter 100. The coil 150 is configured to receive the AC output signal from the amplifier 108 and emit a corresponding electromagnetic field when the bidirectional power converter 100 is operating in the transmit mode. The coil 150 is further operable to convert electromagnetic flux into an AC power signal when the bidirectional power converter 100 is operating in the receive mode. In one embodiment, the coil 150 includes a wire coil 152 and a tuning capacitor 154. The tuning capacitor 154 connects the wire coil 152 to the AC terminal 102 of the bidirectional power converter 100.

In one embodiment, the bidirectional power converter 100 further includes a DC charge control relay 160 (which can be external to other components) including a unified DC terminal 162. The DC control relay 160 is configured to connect to the DC input terminal 122 and the DC output terminal 104. The DC charge control relay 160 is configured to electrically isolate the DC input terminal 122 from the DC output terminal 104. The DC charge control relay 160 further electrically connects the DC input terminal 122 to the unified DC terminal 162 when the bidirectional power converter 100 is operating in the transmit mode and electrically connects the DC output terminal 104 to the unified DC terminal 162 when the bidirectional power converter 100 is operating in the receive mode.

In one embodiment, bidirectional converter 100 further includes a slow start circuit 172 and a one-shot timer 170. The slow start circuit 172 is configured to provide a pulse width modulated signal that increases from 0 to 100% duty cycle (i.e., "on" time) beginning when the bidirectional power converter 100 begins operating in the transmit mode. The rate of increase of the duty cycle of the pulse width modulated signal is generally linear. The effect of the pulse width modulated signal (SSL) from the slow start circuit 172 is to control the amount of time the amplifier 108 remains in the on-state. This function is only used initially when the bidirectional power converter 100 is enabled to transmit for the first time (i.e., at each startup of the bidirectional power converter 100 as a transmitter). The pulse width modulated signal (SSL) varies the on-time of the amplifier 108 from 0 (fully off) to 1 (fully on continuously) by controlling the on-time at the modulator 110, effectively ramping up the voltage received at a second bidirectional power converter 100 configured as a receiver until a set regulated voltage (i.e., a target output voltage) is reached. Once the set voltage is reached, the output of the SSL remains at a logic 1. In one embodiment, of the slow start circuit 172, micro U16B is configured as a saw-tooth oscillator. The output of micro U16B, taken across capacitors C41 and C42, is fed to PWM comparator U16A. A linear DC voltage is generated across a capacitor bank (i.e., capacitors C35, C36, C37, C38, and C39) by feeding the capacitor bank a constant current generated by switch Q18. This linear generated DC voltage is compared in PWM comparator U16A to the saw-tooth like ramp voltage generated by micro U16B and a pulse width modulated signal is generated by PWM comparator U16A to provide to the modulator 110.

The one-shot timer 170 is configured to provide a one-shot signal to the modulator 110 (and the one shot signal is "on") when the bidirectional power converter 100 begins operating in the transmit mode and for a predetermined period of time thereafter. Modulator 110 is further configured to provide the drive signal from the oscillator 106 to amplifier 108 when the pulse width modulated signal is on and at least one of the hysteretic control signal and one-shot signal are "on." In one embodiment, the one shot timer 170 provides a precise time controlled "momentary-on" enable signal to the AMOD (i.e., modulator 110) when the transmitter section is first enabled. If, in the time frame generated by the one shot timer 170, a feedback signal (i.e., hysteresis control signal) is not received by the bidirectional power converter 100, the one shot timer 170 terminates the transmission. That is, the modulator 110 ceases providing the drive signal from the oscillator 106 to the amplifier 108 because the modulator 110 is receiving neither the hysteresis control signal nor the one shot signal. In addition, this embodiment permits the transmit section to terminate operation in the event the feedback signal is interrupted, once it has been received. Micro U42 (see FIG. 3) is the one shot timer 170 designed utilizing a standard 555 timer. The on-time of the one shot signal is controlled by resistor R146 and capacitors C133 and C134. The modulator enable signal (MODULATOR_EN) provided by the control logic 176 triggers the one shot timer 170 via pin 2 of micro U42 (i.e., 555 timer) through switch Q37.

In one embodiment, the bidirectional power converter 100 further includes a temperature sensor 174 and control logic 176. The temperature sensor 174 is configured to monitor a temperature of the amplifier 108 and provide a temperature sensing signal indicative of the monitored temperature. The control logic 176 is configured to provide a modulator enable signal to the modulator 110 as a function of the temperature sensing signal and the direction signal such that the modulator enable signal is provided when the direction control signal sets the bidirectional power converter 100 in the transmit mode and the temperature sensing signal is indicative of a temperature less than a predetermined temperature. The modulator 110 does not provide the drive signal from the oscillator 106 to the amplifier 108 when the modulator 110 is not receiving a modulator enable signal. In one embodiment, the temperature sensor 174 monitors the full bridge amplifier 108 via thermal coupling of the temperature sensor 174 to the full bridge amplifier 108. When the temperature at the full bridge amplifier 108 reaches a threshold set by the temperature sensor 174, the temperature sensor 174 sets its output disabling the full bridge amplifier 108 via the modulator 110. When the temperature at the full bridge amplifier 108 drops to a safe value, the temperature sensor 174 re-enables the full bridge amplifier 108 via the modulator 110. The status of the temperature sensor 174 can be obtained from the signal connector at pin-6. In one embodiment, micro U14 is an integrated circuit manufactured by Maxim Integrated™ capable of +/−0.5 degree C. accuracy and a temperature range of −20 to 100 degree C. Resistors R51, R53, and R53 and switch Q17 set the two set points for micro U14. In one embodiment, the set points disable at 80 C and enable at 40 C. In one embodiment of the control logic 176, the control logic 176 takes in the signals from the temperature sensor 174 (TEMP_EN_DIS) and the TX_ON signal from signal connector pin-2 and generates a single enable/disable signal (MODULATOR_EN) for the modulator 110. Micros U39 and U40 provide the logic function needed for the control logic 176. When the output from the temperature sensor 174 (TEMP_EN_DIS) is logic 0 and transmitter enable signal from pin 2 of the signal connector (TRANS_EN) is logic 1, modulator enable signal (MODULATOR_EN) is a logic 1, enabling the transmit function of the bidirectional power converter 100.

In one embodiment, the bidirectional power converter 100 further includes a switching regulator 180. The switching regulator 180 is configured to generate bias voltages when the bidirectional power converter 100 is receiving power from the power source at the DC input terminal 122 of the bidirectional power converter 100. Switching regulator 180 provides at least one of the generated bias voltages to the oscillator 106, the amplifier 108, the modulator 110, the hysteretic receiver circuit 112, and the transmit relay 114, the slow start circuit 172, the one-shot timer 170, and the temperature sensor 174. In one embodiment, the switching regulator 180 implements a buck switching type regulator.

In one embodiment, the bidirectional power converter 100 further includes a linear regulator 182. The linear regulator 182 is configured to receive the DC output from the rectifier 116 and provide bias voltages to the hysteretic control circuit 120 when the bidirectional power converter 100 is operating in the receive mode.

In one embodiment, the bidirectional power converter 100 further includes a DC filter 186 configured to relay the DC output provided by the rectifier 116 to the DC output terminal 104. The DC filter 186 converts the pulsating DC output from the rectifier 116 to a fixed DC voltage with relatively low ripple. Capacitor bank C76 through C80 charge to the peak value of the rectified AC voltage (i.e., the pulsating DC output provided by the rectifier 116) and supply power to the load (i.e., the DC output terminal) during certain times (i.e., the troughs) of the pulsating DC output signal provided by the rectifier 116.

In one embodiment, the bidirectional power converter 100 further includes a plurality of isolators 190. The plurality of isolators 190 are configured to isolate the DC input terminal 122 from the AC terminal 102 and the AC terminal 102 from the DC output terminal 104 of the bidirectional power converter 100 such that the bidirectional power converter 100 is an isolated power source in both the transmit mode and the receive mode.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful BIDIRECTIONAL POWER CONVERTER it is not intended that such references be construed as limitations upon the scope of this invention except as set forth in the following claims.

What is claimed is:

1. A bidirectional power converter operable to provide alternating current (AC) power at an AC terminal of the bidirectional power converter in a transmit mode of the bidirectional power converter and provide direct current (DC) power at a DC output terminal of the bidirectional power converter in a receive mode, said bidirectional power converter comprising:

an oscillator configured to provide a drive signal at a base frequency when the bidirectional power converter is operating in the transmit mode;

an amplifier configured to receive power from a power source via a DC input terminal of the bidirectional power converter and provide an AC output signal to the AC terminal of the bidirectional power converter in response to receiving the drive signal when the bidirectional power converter is operating in the transmit mode;

a modulator configured to selectively provide the drive signal from the oscillator to the amplifier as a function of a hysteretic control signal when the bidirectional power converter is operating in the transmit mode;

a hysteretic receiver circuit configured to receive a transmitted control signal at the bidirectional power converter and provide the hysteretic control signal to the modulator as a function of the received, transmitted control signal when the bidirectional power converter is operating in the transmit mode;

a transmit relay configured to electrically connect the amplifier to the AC terminal of the bidirectional power converter when the bidirectional power converter is operating in the transmit mode and electrically disconnect the amplifier from the AC terminal of the bidirectional power converter when the bidirectional power converter is operating in the receive mode;

a rectifier configured to receive an alternating current power signal from the AC terminal of the bidirectional power converter and provide a DC output to the DC output terminal of the bidirectional power converter when the bidirectional power converter is operating in the receive mode;

a receive relay configured to enable the rectifier to provide the DC output to the DC output terminal of the bidirectional power converter when the bidirectional power converter is operating in the receive mode and prevent the rectifier from providing the DC output to the DC output terminal when the bidirectional power converter is operating in the transmit mode; and a hysteretic control circuit configured to monitor the DC output and transmit a control signal as a function of the monitored DC output when the bidirectional power converter is operating in the receive mode.

2. The bidirectional power converter of claim 1, further comprising a direction control input configured to receive a direction control signal, wherein the direction control signal is provided to the transmit relay and the receive relay to set the bidirectional power converter in either the transmit mode or the receive mode.

3. The bidirectional power converter of claim 1, wherein the hysteretic control circuit comprises:

a hysteretic controller configured to provide a logic signal, wherein the logic signal is a first binary value when a voltage of the DC output is less than a predetermined threshold and the logic signal is a second binary value when the voltage of the DC output is more than the predetermined threshold and wherein the first binary value is different than the second binary value; and a coil pulse driver configured to receive the logic signal and generate a magnetic field via a magnetic coupling coil, wherein the generated magnetic field is indicative of the logic signal; and the hysteretic receiver circuit comprises a magnetic sensor configured to receive a magnetic field and provide the hysteretic control signal to the modulator as a function of the received magnetic field.

4. The bidirectional power converter of claim 1, wherein the hysteretic control circuit comprises:

a hysteretic controller configured to provide a logic signal, wherein the logic signal is a first binary value when a voltage of the DC output is less than a predetermined threshold and the logic signal is a second binary value when the voltage of the DC output is more than the predetermined threshold and wherein the first binary value is different than the second binary value; and a radio frequency (RF) transmitter configured to receive the logic signal and transmit an RF signal via an antenna, wherein the transmitted RF signal is indicative of the logic signal; and the hysteretic receiver circuit comprises an RF receiver configured to receive an RF signal and provide the hysteretic control signal to the modulator as a function of the received RF signal.

5. The bidirectional power converter of claim 1, wherein the hysteretic control circuit comprises:

a hysteretic controller configured to provide a logic signal, wherein the logic signal is a first binary value when a voltage of the DC output is less than a predetermined threshold and the logic signal is a second binary value when the voltage of the DC output is more than the predetermined threshold and wherein the first binary value is different than the second binary value; and an optical transmitter configured to receive the logic signal and transmit an optical signal via an infrared (IR) emitter, wherein the transmitted optical signal is indicative of the logic signal; and the hysteretic receiver circuit comprises an IR receiver configured to receive an optical signal and provide the hysteretic control signal to the modulator as a function of the received optical signal.

6. The bidirectional power converter of claim 1, further comprising:

a coil connected to the AC terminal of bidirectional power converter, wherein the coil is configured to:

receive the AC output signal from the amplifier and emit a corresponding electromagnetic field when the bidirectional power converter is operating in the transmit mode; and convert electromagnetic flux into an AC power signal when the bidirectional power converter is operating in the receive mode.

7. The bidirectional power converter of claim 6, wherein the coil comprises:

a wire coil, and a tuning capacitor connecting the wire coil to the AC terminal of the bidirectional power converter.

8. The bidirectional power converter of claim 1, wherein the receive relay is configured to:

enable the rectifier to provide the DC output to the DC output terminal when the bidirectional power converter is operating in the receive mode by electrically connecting the rectifier to the DC output terminal of the bidirectional power converter when the bidirectional power converter is operating in the receive mode; and prevent the rectifier from providing the DC output to the DC output terminal when the bidirectional power converter is operating in the transmit mode by electrically disconnecting the rectifier from the AC terminal of the bidirectional power converter when the bidirectional power converter is operating in the transmit mode.

9. The bidirectional power converter of claim 1, further comprising:

a DC charge control relay comprising a unified DC terminal, wherein the DC control relay is configured to:
  connect to the DC input terminal and the DC output terminal;
  electrically isolate the DC input terminal from the DC output terminal;
  electrically connect the DC input terminal to the unified DC terminal when the bidirectional power converter is operating in the transmit mode; and
  electrically connect the DC output terminal to the unified DC terminal when the bidirectional power converter is operating in the receive mode.

10. The bidirectional power converter of claim 1, wherein the modulator is an amplitude shift keyed modulator.

11. The bidirectional power converter of claim 1, wherein the amplifier is a full bridge amplifier.

12. The bidirectional power converter of claim 1, wherein the rectifier is a full wave rectifier.

13. The bidirectional power converter of claim 1, wherein the base frequency of the oscillator is approximately 100 kHz.

14. The bidirectional power converter of claim 1, further comprising:
  a slow start circuit configured to provide a pulse width modulated signal that increases from zero to one hundred percent duty cycle beginning when the bidirectional power converter begins operating in the transmit mode, wherein the rate of increase is generally linear; and
  a one shot timer configured to provide a one shot signal to the modulator when the bidirectional power converter begins operating in the transmit mode and for a predetermined period of time thereafter, wherein:
  the modulator is further configured to provide the drive signal from the oscillator to the amplifier when the pulse width modulated signal is on and at least one of the hysteretic control signal and one shot signal are on.

15. The bidirectional power converter of claim 1, further comprising:
  a switching regulator configured to generate bias voltages when the bidirectional power converter is receiving power from the power source at the DC input terminal of the bidirectional power converter, wherein the switching regulator provides at least one of the generated bias voltages to: the oscillator, the amplifier, the modulator, the hysteretic receiver circuit, and the transmit relay, and a slow start circuit, a one shot timer, and a temperature sensor of the bidirectional power converter.

16. The bidirectional power converter of claim 1, further comprising:
  a temperature sensor configured to monitor a temperature of the amplifier and provide a temperature sensing signal; and
  a control logic configured to provide a modulator enable signal to the modulator as a function of the temperature sensing signal and a direction control signal such that the modulator enable signal is provided when the direction control signal sets the bidirectional power converter in the transmit mode and the temperature sensing signal is indicative of a temperature less than a predetermined temperature, wherein the modulator does not provide the drive signal from the oscillator to the amplifier when the modulator is not receiving the modulator enable signal.

17. The bidirectional power converter of claim 1, further comprising:
  a linear regulator configured to receive the DC output from the rectifier and provide bias voltages to the hysteretic control circuit when the bidirectional power converter is operating in the receive mode.

18. The bidirectional power converter of claim 1, further comprising:
  a DC filter configured to smooth the DC output provided by the rectifier to the DC output terminal.

19. The bidirectional power converter of claim 1, further comprising:
  a plurality of isolators configured to isolate the DC input terminal from the AC terminal and the AC terminal from the DC output terminal of the bidirectional power converter such that the bidirectional power converter is an isolated power source in both the transmit mode and the receive mode.

* * * * *